US012553184B2

(12) United States Patent
Tyagi et al.

(10) Patent No.: US 12,553,184 B2
(45) Date of Patent: Feb. 17, 2026

(54) HEMP PAPER PACKAGING MATERIAL FOR FOODSTUFF

(71) Applicants: Wm. Wrigley Jr. Company, Chicago, IL (US); North Carolina State University, Raleigh, NC (US)

(72) Inventors: Preeti Tyagi, Chicago, IL (US); Norman Lisson, Chicago, IL (US); Lokendra Pal, Raleigh, NC (US); Mrittika Debnath, Raleigh, NC (US); Roman Sarder, Raleigh, NC (US)

(73) Assignee: Wm. Wrigley Jr. Company, Chicago, IL (US)

( * ) Notice: Subject to any disclaimer, the term of this patent is extended or adjusted under 35 U.S.C. 154(b) by 151 days.

(21) Appl. No.: 18/572,561

(22) PCT Filed: Jun. 20, 2022

(86) PCT No.: PCT/US2022/034156
§ 371 (c)(1),
(2) Date: Dec. 20, 2023

(87) PCT Pub. No.: WO2022/271587
PCT Pub. Date: Dec. 29, 2022

(65) Prior Publication Data
US 2024/0337069 A1 Oct. 10, 2024

Related U.S. Application Data

(60) Provisional application No. 63/214,318, filed on Jun. 24, 2021.

(51) Int. Cl.
*D21H 11/12* (2006.01)
*D21C 3/02* (2006.01)
(Continued)

(52) U.S. Cl.
CPC ............ *D21H 11/12* (2013.01); *D21C 3/022* (2013.01); *D21C 9/14* (2013.01); *D21C 9/163* (2013.01);
(Continued)

(58) Field of Classification Search
CPC ........ D21H 11/12; D21H 27/10; D21H 11/14; Y02W 90/10
See application file for complete search history.

(56) References Cited

U.S. PATENT DOCUMENTS

| 6,787,245 B1 | 9/2004 | Hayes | |
| 2008/0193687 A1* | 8/2008 | Asayama | ............... D21H 27/30 428/340 |

(Continued)

FOREIGN PATENT DOCUMENTS

| AU | 2017222026 A1 * | 8/2018 | ............. D21H 11/12 |
| EP | 0644293 A1 * | 3/1995 | ............. A23K 10/37 |

(Continued)

OTHER PUBLICATIONS

Smook, Handbook for Pulp and Paper Technologists, 1992, Angus Wilde Publications, 2nd edition, chapters 4, 13, and 15. (Year: 1992).*

(Continued)

Primary Examiner — Anthony Calandra
(74) Attorney, Agent, or Firm — Bookoff McAndrews, PLLC

(57) ABSTRACT

Sustainable paper-based packaging materials, e.g., paper-based food packaging materials, are described. The packaging materials are based on paper formed from fiber derived from waste biomass, such as hemp hurds, mixes containing hemp hurds and hemp bast fibers, bagasse, and cocoa pod husks. Also described are methods of making the (Continued)

packaging materials. The methods can include environmentally friendly pulping and/or bleaching processes.

15 Claims, 31 Drawing Sheets

(51) Int. Cl.
  D21C 9/14   (2006.01)
  D21C 9/16   (2006.01)
  D21D 1/30   (2006.01)
  D21F 11/02  (2006.01)
  D21H 11/04  (2006.01)
  D21H 17/00  (2006.01)
  D21H 17/15  (2006.01)
  D21H 17/17  (2006.01)
  D21H 17/26  (2006.01)
  D21H 17/29  (2006.01)
  D21H 27/10  (2006.01)

(52) U.S. Cl.
  CPC ............... D21D 1/30 (2013.01); D21F 11/02 (2013.01); D21H 11/04 (2013.01); D21H 17/15 (2013.01); D21H 17/17 (2013.01); D21H 17/26 (2013.01); D21H 17/29 (2013.01); D21H 17/72 (2013.01); D21H 27/10 (2013.01)

(56) References Cited

U.S. PATENT DOCUMENTS

| | | | |
|---|---|---|---|
| 2017/0174404 A1* | 6/2017 | Ragot | D21H 17/02 |
| 2020/0377732 A1 | 12/2020 | Pal et al. | |
| 2021/0148046 A1 | 5/2021 | Pauwels et al. | |

FOREIGN PATENT DOCUMENTS

| | | | |
|---|---|---|---|
| WO | 2016130006 A1 | 8/2016 | |
| WO | 2019210221 A1 | 10/2019 | |

OTHER PUBLICATIONS

Merrill Jason, The manufacture of paper from hemp hurds, Oct. 14, 1916 [downloaded online Sep. 14, 2020 from gutenberg.org], United States Department of Agriculture, bulletein No. 404, whole document. (Year: 1916).*

JIS P 8117:2009 cover page, Jan. 20, 2009 (Year: 2009).*

Abdul KA, et al.: Efficacy of cocoa pod extract as antiwrinkle gel on human skin surface. J Cosmet Dermatol 2016, 15: 283-295, retrieved from https://onlinelibrary.wiley.com/doi/abs/10.1111/jocd.12218 (13 pages).

Abdul Khalil HPS, Davoudpour Y, Saurabh CK, Hossain MS, Adnan AS, Dungani R, Paridah MT, Mohamed ZIS, Fazita MRN, Syakir MI, Haafiz MKM (2016), A review on nanocellulosic fibres as new material for sustainablepackaging: Process and applications, Renewable and Sustainable Energy Reviews, 64:823-836, retrieved from https://www.lppm.itb.ac.id/wp-content/uploads/sites/169/2017/02/A-review-on-nanocellulosic-fibres-as-new-material-for-sustainable-packaging-Process-and-applications.pdf (14 pages).

Barta, Z., et al., Refining Hemp Hurds into Fermentable Sugars or Ethanol, Chemical and Biochemical Engineering Quarterly, 2010. 24: p. 331-339, retrieved from https://hrcak.srce.hr/file/89119 (10 pages).

Chang CH, Yu ST, Perng YS (2018) Effects of furnish and refining on properties of household paper. Cellulose Chemistry and Technology, 52(5-6):433-440, retrieved from https://www.cellulosechemtechnol.ro/pdf/CCT5-6(2018)/ p. 433-440.pdf (8 pages).

Cherney, J. and E. Small, Industrial Hemp in North America: Production, Politics and Potential. Agronomy, 2016. 6: p. 58, retrieved from https://www.mdpi.com/2073-4395/6/4/58 (24 pages).

Cruz, G., M. Pirilä, M. Huuhtanen, L.Carrión, E. Alvarenga and R.L. Keiski, 2012. Production of Activated Carbon from Cocoa (*Theobroma cacao*) Pod Husk. Journal Civil and Environmental Engineering, 2(2): 1-6, retrieved from https://www.researchgate.net/profile/Emilio-Alvarenga-2/publication/266327448_Production_of_Activated_Carbon_from_Cocoa_Theobroma_cacao_Pod_Husk/links/578cc2fb08ae5c86c9a63c87/Production-of-Activated-Carbon-from-Cocoa-Theobroma-cacao-Pod-Husk.pdf (6.

Duker E, Lindström T (2008) On the mechanisms behind the ability of CMC to enhance paper strength. Nordic Pulp and Paper Research Journal, 23(1): 57-64. DOI: 10.3183/npprj-2008-23-01-p057-064, retrieved from https://www.degruyter.com/document/doi/10.3183/npprj-2008-23-01-p057-064/html (2 pages).

E. de Jong, R. J. A. Gosselink, Lignocellulose-Based Chemical Products, Bioenergy Research: Advances and Applications (Eds: V. K. Gupta, M. G. Tuohy, C. P. Kubicek, J. Saddler, F. Xu), Elsevier, Amsterdam 2014, pp. 277-313, retrieved from https://www.sciencedirect.com/science/article/abs/pii/B9780444595614000176 (1 page).

Edyta M, Piotr P, Marcin D, Kamila B (2015). Comparison of papermaking potential of wood and hemp cellulose pulps. Annals of Warsaw University of Life Sciences-SGGW. Forestry and Wood Technology, 91:134-137, retrieved from https://agro.icm.edu.pl/agro/element/bwmeta1.element.agro-c9eb2861-1d46-4802-9aad-f24e907d5666 (4 pages).

Environment ECD-G (2011) Plastic waste: ecological and human health impacts. Sci Environ Policy, published in 2011, retrieved from https://www.yumpu.com/en/document/view/31376815/plastic-waste-ecological-and-human-health-impacts-eu-2011 (1 page).

G. Brodeur, E. Yau, K. Badal, J. Collier, K. B. Ramachandran, S. Ramakrishnan, Chemical and Physicochemical Pretreatment of Lignocellulosic Biomass: A Review, Sage—Hindawi Access to Research (2011), retrieved from www.hindawi.com/journals/er/2011/787532/abs (17 pages).

Gharehkhani S, Sadeghinezhad E, Kazi SN, Yarmand H, Badarudin A, Safaei MR, Zubir MNM (2015) Basic effects of pulp refining on fiber properties—A review. Carbohydrate Polymers, 115:785-803. DOI: 0.1016/j.carbpol.2014.08.047, retrieved from https://eprints.um.edu.my/13930/1/Basic_effects_of_pulp_refining_on_fiber_properties.pdf (5 pages).

Ginebreda A, Guillén D, Barceló D, Darbra RM (2012) Additives in the Paper Industry. Handbook of Environmental Chemistry, (Jun. 18, 2011):11-34. DOI: 10.1007/698_2011_109, retrieved from http://ndl.ethernet.edu.et/bitstream/123456789/72791/1/Bernd%20Bilitewski.pdf#page=25 (24 pages).

Gominho J, Fernandez J, Pereira H (2001) *Cynara cardunculus* L.—A new fibre crop for pulp and paper production. Industrial Crops and Products, 13(1):1-10. DOI: 10.1016/S0926-6690(00)00044-3, retrieved from https://d1wqtxts1xzle7.cloudfront.net/44564484/Cynara_cardunculus_L_.A_new_fibre_crop20160409-31753-1391so0-libre.pdf (10 pages).

Groot B De, Dam JEG van, Der ZRP van, Riet K V. (2009) Simplified Kinetic Modelling of Alkaline Delignification of Hemp Woody Core. Holzforschung—International Journal of the Biology, Chemistry, Physics and Technology of Wood, 48(3):207-214. DOI: 10.1515/hfsg.1994.48.3.207, retrieved from https://www.degruyter.com/document/doi/10.1515/hfsg.1994.48.3.207/html (2 pages).

Gutta R, Wan H Da, Kuriger G (2013) Packaging materials selection tool considering environmental sustainability. IIE Annual Conference and Expo 2013, 3706-3715, retrieved from https://www.proquest.com/openview/cb9996da276ad41397b7e20c3cb52fd4/1?pq-origsite=gscholar&cbl=51908 (1 page).

H. Zhang, C. Zhao, Z. Li, J. Li, The fiber charge measurement depending on the poly-Dadmac accessibility to cellulose fibers, Cellulose 2016, 23, 163, retrieved from https://www.researchgate.net/profile/Chengke-Zhao/publication/284064781_The_fiber_charge_measurement_depending_on_the_poly-DADMAC_accessibility_to_cellulose_fibers/links/586dae0308ae329d62139644/The-fiber-charge-measurement-depending-on-the-poly-DADMAC-accessibility-to-cellulose-fibers.pdf (11 pages).

(56) References Cited

OTHER PUBLICATIONS

Jambeck JR, Geyer R, Wilcox C, Siegler TR, Perryman M, Andrady A, Narayan R, Law KL (2015). Plastic waste inputs from land into the ocean. Science, 347(6223):768-771, retrieved from https://www.science.org/doi/abs/10.1126/science.1260352 (1 page).

Johansson A (2011) Correlations between fibre properties and paper properties. Mater thesis in Pulp Technology, retrieved from https://www.diva-portal.org/smash/get/diva2:460467/FULLTEXT01.pdf (49 pages).

K. Lyytikäinen, E. Saukkonen, I. Kajanto, J. Kayhko, The effect of hemicellulose extraction on fiber charge properties and retention behavior of kraft pulp fibers, BioResources 2011, 6, 219, retrieved from https://jtatm.textiles.ncsu.edu/index.php/BioRes/article/view/BioRes_06_1_0219_Lyytikainen_SKK_Hemicel_Extrac_Fiber_Charge_Reten_Kraft (1 page).

Kartovaara I, Rajala R, Lüukkala M V, Sipi K (1985) Conduction of heat in paper, retrieved from https://bioresources.cnr.ncsu.edu/wp-content/uploads/2021/12/1985.1.pdf (36 pages).

Kjellgren H (2005) Barrier properties of greaseproof paper Barrier properties of greaseproof paper. Thesis, Karlstad University, retrieved from https://www.diva-portal.org/smash/get/diva2:5289/FULLTEXT01.pdfDivision (94 pages).

Kullander J, Nilsson L, Barbier C (2012) Evaluation of furnishes for tissue manufacturing; wet pressing. Nordic Pulp & Paper Research Journal, 27(5), 947-951. DOI: 10.3183/npprj-2012-27-05-p947-951, retrieved from https://www.diva-portal.org/smash/record.jsf?pid=diva2%3A545862&dswid=-7660 (1 page).

Kumar S, Chauhan VS, Chakrabarti SK (2016) Separation and analysis techniques for bound and unbound alkyl ketene dimer (AKD) in paper: A review. Arabian Journal of Chemistry, 9:S1636-S1642. DOI: 10.1016/j.arabjc.2012.04.019, retrieved from https://core.ac.uk/download/pdf/82346118.pdf (7 pages).

Liang M, He B, Zhao L (2014) Hydrophobicity of lime sludge filled paper assisted by a cationic starch/CPAM/bentonite retention aids system. BioResources, 9(4):6440-6452. DOI: 10.15376/biores.9.4.6440-6452, retrieved from https://jtatm.textiles.ncsu.edu/index.php/BioRes/article/viewFile/BioRes_09_4_Liang_Hydrophobicity_Lime_Sludge/3041 (13 pages).

Lindström T, Larsson PT (2008) Alkyl ketene dimer (AKD) sizing—A review. Nordic Pulp and Paper Research Journal, 23(2):202-209. DOI: 10.3183/npprj-2008-23-02-p202-209, retrieved from https://www.degruyter.com/document/doi/10.3183/npprj-2008-23-02-p202-209/html (2 pages).

Ma X, Soh AK, Wang B (2004) A design database for moulded pulp packaging structure. Packaging Technology and Science, 17(4):193-204. DOI: 10.1002/pts.658, retrieved from https://onlinelibrary.wiley.com/doi/abs/10.1002/pts.658 (1 page).

MacArthur D., Waugray D, Stutchey M. (2016) The new plastics economy, rethinking the future of plastics. World Economic Forum, retrieved from https://www.greenpeace.org/static/planet4-philippines-stateless-release/2019/05/b1e5a437-b1e5a437-wef_the_new_plastics_economy.pdf (36 pages).

Mali KK, Dhawale SC, Dias RJ, Dhane NS, Ghorpade VS (2018) Citric acid crosslinked carboxymethyl cellulose-based composite hydrogel films for drug delivery. Indian Journal of Pharmaceutical Sciences, 80(4):657-667. DOI: 10.4172/pharmaceutical-sciences.1000405, retrieved from https://www.researchgate.net/publication/326424027_Citric_Acid_Crosslinked_Carboxymethyl_Cellulose-based_Composite_Hydrogel_Films_for_Drug_Delivery (11 pages).

Maloney TC, Paulapuro H (1999) The Formation of Pores in the Cell Wall. Journal of Pulp and Paper Science, 25 (12):430-436, retrieved from https://www.researchgate.net/profile/Thaddeus-Maloney/publication/260133600_The_Formation_of_Pores_in_the_Cell_Wall/links/54ae34e70cf2828b29fcbfd3/The-Formation-of-Pores-in-the-Cell-Wall.pdf (7 pages).

Mohlin U, Miller J, Mohlin U (1995) Industrial refining-effects of refining conditions on fibre properties. Proceedings of the 3rd international refining conference, 4:19-22.

Monga S, Thapliyal BP, Tyagi S, Naithani S (2017) Relationship between Strength Properties and Fiber Morphological Characteristics of E. tereticornis. International Journal of Science and Research (IJSR), 6(1):1557-1564. DOI: 10.21275/art20164485, retrieved from https://www.ijsr.net/archive/v6i1/ART20164485.pdf (8 pages).

Nachtergaele W (1989) The Benefits of Cationic Starches for the Paper Industry. Starch—Stärke, 41(1):27-31. DOI: 10.1002/star.19890410108, retrieved from https://onlinelibrary.wiley.com/doi/abs/10.1002/star.19890410108 (1 page).

O. Joutsimo, R. Wathén, T. Tamminen, Effects of fiber deformations on pulp sheet properties and fiber strength, Paperi ja puu 2005, 87, 392, retrieved from https://d1wqtxts1xzle7.cloudfront.net/41564195/Article_5_Joutsimo-libre.pdf (16 pages).

R. R. Gustafson, C. A. Sleicher, W. T. McKean, B. A. Finlayso, Theoretical model of the kraft pulping process. Ind. Eng. Chem. Process Des. Dev. 1983, 22, 87, retrieved from http://faculty.washington.edu/finlayso/Gustafson.pdf (10 pages).

Rinaldo E (2020) Non-wood fibers for strength enhancement of paper. Thesis, Department of Engineering and Chemical Science, Karlstad University, retrieved from http://www.diva-portal.org/smash/get/diva2:1445936/FULLTEXT01.pdf (82 pages).

Risberg E (2017) Well functioning wet-end starch—a prerequisite for capacity increase at Smurfit Kappa Piteå, retrieved from https://www.diva-portal.org/smash/get/diva2:1147757/FULLTEXT01.pdf (52 pages).

Salem, K.S., et al., Lignocellulosic Fibers from Renewable Resources Using Green Chemistry for a Circular Economy, Global Challenges, 2020. n/a(n/a): p. 2000065, retrieved from https://onlinelibrary.wiley.com/doi/pdf/10.1002/gch2.202000065 (10 pages).

Santos RB, Jameel H, Chang HM, Hart PW (2013) Impact of lignin and carbohydrate chemical structures on kraft pulping processes and biofuel production. Tappi Journal, 12(7):23-31. DOI: 10.32964/tj12.7.23, retrieved from https://www.researchgate.net/profile/Peter-Hart-2/publication/287232290_Impact_of_lignin_and_carbohydrate_chemical_structures_on_kraft_pulping_processes_and_biofuel_production/links/567eb37208ae1975838988ea/Impact-of-lignin-and-carbohydrate-chemical-structures-on-kraft-.

Sanyang, M.L., S.M. Sapuan, and M. Haron,. Effect of cocoa pod husk filler loading on tensile properties of cocoa pod husk/polylactic acid green biocomposite films. AIP Conference Proceedings, 2017. 1891(1): p. 020126, retrieved from https://pubs.aip.org/aip/acp/article/1891/1/020126/886824/Effect-of-cocoa-pod-husk-filler-loading-on-tensile (6 pages).

Sezgi, U., et al., Effects of alkali charge and white liquor sulfidity on rapid displacement heating (RDH) kraft pulping. 1999. 15: p. 3-12, retrieved from https://www.researchgate.net/publication/298022980_Effects_of_alkali_charge_and_white_liquor_sulfidity_on_rapid_displacement_heating_RDH_kraft_pulping (1 page).

Smithers (2018) Market Value Estimations for Packaging in 2018 and Beyond, retrieved from https://www.smithers.com/resources/2018/jan/market-value-estimations-for-packaging-beyond-2018 (2 pages).

Strand A, Sundberg A, Retulainen E, Salminen K, Oksanen A, Kouko J, Ketola A, Khakalo A, Rojas O (2017) The effect of chemical additives on the strength, stiffness and elongation potential of paper. Nordic Pulp & Paper Research Journal, 32(3):324-335. DOI: 10.3183/npprj-2017-32-03-p324-335, retrieved from https://www.degruyter.com/document/doi/10.3183/npprj-2017-32-03-p324-335/html?lang=en (2 pages).

Tajik M, Torshizi HJ, Resalati H, Hamzeh Y (2018) Effects of cationic starch in the presence of cellulose nanofibrils on structural, optical and strength properties of paper from soda bagasse pulp. Carbohydrate Polymers, 194(Sep. 2017):1-8. DOI: 10.1016/j.carbpol.2018.04.026, retrieved from https://pubmed.ncbi.nlm.nih.gov/29801816/ (1 page).

V. B. Agbor, N. Cicek, R. Sparling, A. Berlin, D. B. Levin, Biomass pretreatment: Fundamentals toward application, Biotechnol. Adv. 2011, 29, 675, retrieved from https://d1wqtxts1xzle7.cloudfront.net/42953663/Biomass_pretreatment_fundamentals_toward20160222-5848-00z0zm-libre.pdf (11 pages).

V. Naithani, P. Tyagi, H. Jameel, L. A. Lucia, L. Pal, Ecofriendly and Innovative Processing of HempHurds Fibers for Tissue and Towel Paper, BioResources, 2020, 15, 706, retrieved from https://jtatm.textiles.ncsu.edu/index.php/BioRes/article/view/BioRes_15_1_706_Naithani_Processing_Hemp_Fibers_Tissue (1 page).

(56) References Cited

OTHER PUBLICATIONS

Vieira MGA, Silva MA Da, Santos LO Dos, Beppu MM (2011) Natural-based plasticizers and biopolymer films: A review. European Polymer Journal, 47(3):254-263. DOI: /10.1016/j.eurpolymj. 2010.12.011, retrieved from https://core.ac.uk/download/pdf/81119243. pdf (10 pages).

Weinstock IA, Atalla RH, Reiner RS, Moen MA, Hammel KE, Houtman CJ, Hill CL (1996) A new environmentally benign technology and approach to bleaching kraft pulp. Polyoxometalates for selective delignification and waste mineralization. New Journal of Chemistry, 20(2):269-275, retrieved from https://www.fpl.fs.usda. gov/documnts/pdf1996/weins96a.pdf (7 pages).

Wojciechowska P (2012) The Effect of Concentration and Type of Plasticizer on the Mechanical Properties of Cellulose Acetate Butyrate Organic-Inorganic Hybrids. Recent Advances in Plasticizers, (May). DOI: 10.5772/35350, retrieved from https://www.researchgate.net/profile/Patrycja-Wojciechowska-2/publication/221929435_The_Effect_of_Concentration_and_Type_of_Plasticizer_on_the_Mechanical_Properties_of_Cellulose_Acetate_Butyrate_Organic-Inorganic_Hybrids/links/0912f50fea6a17776b000000/The-Effect-of-Concentration-.

X. Zhang, M. Tu, M. G. Paic, Routes to Potential Bioproducts from Lignocellulosic Biomass Lignin and Hemicelluloses. BioEnergy Res. 2011, 4, 246, retrieved from https://link.springer.com/article/10.1007/s12155-011-9147-1 (2 pages).

Y. Yamashita, M. Shono, C. Sasaki, Y. Nakamur, Alkaline peroxide pretreatment for efficient enzymatic saccharification of bamboo, Carbohydr. Polym. 2010, 79, 914, retrieved from https://www.sciencedirect.com/science/article/abs/pii/S014486170900561X (3 pages).

Z. Dang, T. Elder, A. J. Ragauska, Influence of Kraft Pulping on Carboxylate Content of Softwood Kraft Pulps, Ind. Eng. Chem. Res. 2006, 45, 4509, retrieved from https://www.srs.fs.usda.gov/pubs/ja/ja_dang001.pdf (8 pages).

* cited by examiner

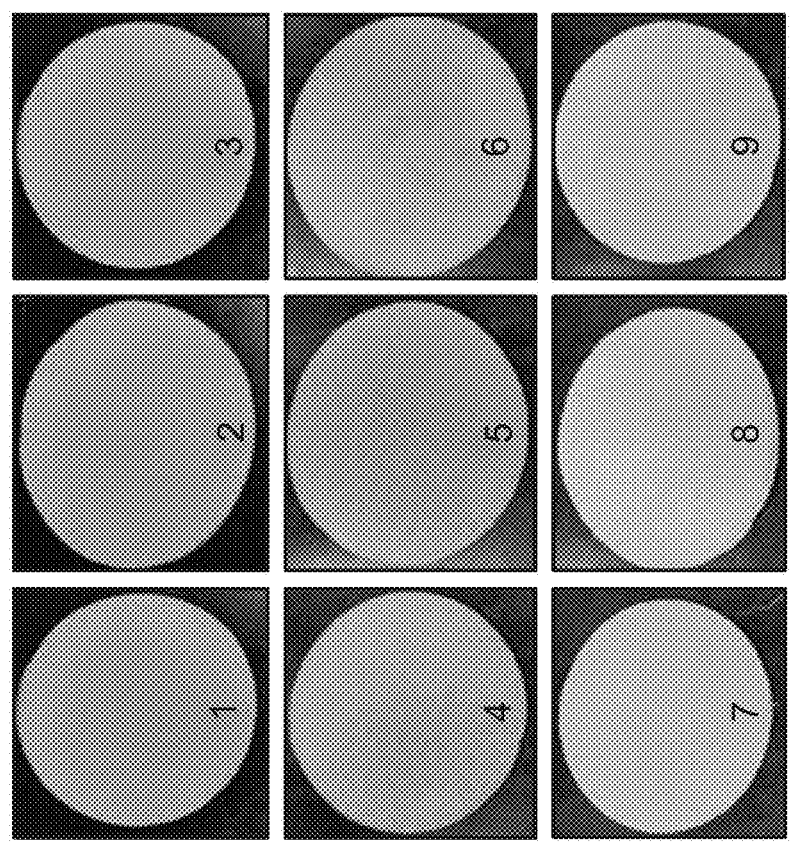
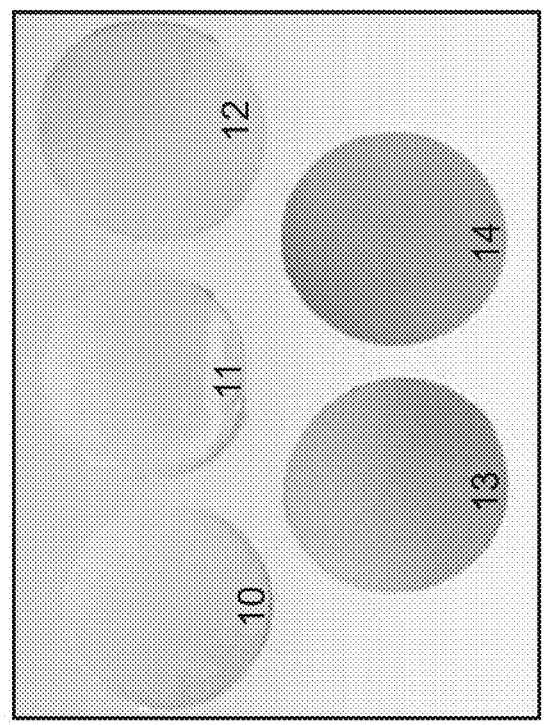
FIG. 10A
FIG. 10B

HEMP PAPER PACKAGING MATERIAL FOR FOODSTUFF

CROSS-REFERENCE TO RELATED APPLICATION(S)

This is a National Stage Application under 35 U.S.C. § 371 of International Application No. PCT/US2022/034156, filed on Jun. 20, 2022, which claims priority to U.S. Provisional Application No. 63/214,318, filed on Jun. 24, 2021, the entireties of which are incorporated herein by reference.

TECHNICAL FIELD

The presently disclosed subject matter relates to paper packaging materials for packaging food items where the packaging materials comprise fibers derived from waste biomass feedstocks, such as hemp hurds and cocoa pod husks. The presently disclosed subject matter further relates to a method of making packaging materials from waste biomass feedstocks. The methods can comprise pulping, refining, and bleaching the waste biomass feedstocks using modified pulping and/or bleaching conditions to improve sustainability and increase environmental friendliness.

BACKGROUND

Food packaging plays a significant role in daily life and in the current economy. Food packaging can help to promote a food's value, to reduce food waste, and to reduce food chemical contamination by preserving food quality during storage, transport, and delivery, as well as through other useful features [1].

According to a recent study, the global packaging market is set to reach over $1 trillion by 2021 [2]. However, packaging has also raised concerns about environmental sustainability. Every year, a large amount of packaging materials are used with the intention of "use and throw," although a large portion of these materials are also made of non-biodegradable and non-renewable materials such as plastics, glass, and metals. Plastic polymers used in food packaging can have adverse effects on both human health and the environment. These single and short use plastic polymers are thrown away as solid waste, which ends up in landfills and ultimately ends in the soil and ocean waterways [3] [4]. It has been estimated that, by 2050, there will be more plastic than fish in the ocean if the production and use of plastic polymers continue at the current pace and no drastic measures are taken [3]. The soil and marine plastic waste can degrade into micro and nano-sized particles that can enter the food chain, all the way to humans, with long-term adverse effects [5]. Incineration methods for plastic polymers can affect the environment, as well.

Consumer demand for sustainability and recent changes in government policies and regulations, such as the initiatives to ban or reduce the use of single-use plastics, have led businesses to consider alternative solutions. Further, the increasing preference from consumers for convenience, small package sizes, and for minimally processed, fresh, and healthy foods has resulted in a desire for highly functional and sustainable food packaging. Thus, there is an interest in paper-based flexible packaging in a number of markets, including in the food and beverage industry, to overcome the challenges of functionality, environmental stewardship, and cost, while maintaining an acceptable biodegradation profile.

Accordingly, there is an ongoing need for new sustainable food packaging materials and methods of preparing papermaking fibers and related food packaging materials from sustainable source materials, including biomass materials that are currently considered to be low-value and/or waste.

SUMMARY

The presently disclosed subject matter now will be described more fully hereinafter, in which some, but not all embodiments of the presently disclosed subject matter are described. Indeed, the presently disclosed subject matter can be embodied in many different forms and should not be construed as limited to the embodiments set forth herein; rather, these embodiments are provided so that this disclosure will satisfy applicable legal requirements.

In some embodiments, the presently disclosed subject matter provides a food packaging material comprising a sheet or web comprising papermaking fibers derived from a waste biomass, wherein the sheet or web has an air resistance of at least about 100 Gurley seconds (Gs) and basis weight of less than 300 grams per square meter (g/m$^2$). In some embodiments, the waste biomass is selected from the group comprising hemp hurds, a mixture of hemp hurds and hemp bast, bagasse, cocoa pod husks, and other agricultural residues.

In some embodiments, at least 50% of the papermaking fibers in the sheet or web are derived from waste biomass. In some embodiments, the papermaking fibers comprise kraft fibers, soda fibers and/or autohydrolyzed fibers. In some embodiments, the papermaking fibers are unbleached and/or bleached fibers.

In some embodiments, at least about 70% of the papermaking fibers in the sheet or web are hemp hurds fibers. In some embodiments, the hemp hurds fibers are kraft fibers. In some embodiments, the hemp hurds fibers have an average length of less than 1.2 mm.

In some embodiments, up to about 30% of the papermaking fibers are cocoa pod husk fibers or fibers pulped from a mixture of hemp hurds and hemp bast or a mixture of therein. In some embodiments, up to about 30% of the papermaking fibers are softwood and/or hardwood fibers or a mixture of therein.

In some embodiments, the sheet or web further comprises one or more additives. In some embodiments, the one or more additives are selected from a starch, a dicarboxylic acid, a cellulosic material, alkyl ketene dimer, and a citrate ester. In some embodiments, the one or more additives are selected from a cationic starch, citric acid, carboxymethyl cellulose, alkyl ketene dimer, and triethyl citrate.

In some embodiments, the sheet or web has an air resistance of at least about 200 Gs. In some embodiments, the sheet or web has a tensile index of about 25 N·m/g to 200 N·m/g.

In some embodiments, the presently disclosed subject matter provides a method of making a paper, the method comprising: (a) pulping waste biomass to provide waste biomass-derived papermaking fibers; (b) preparing a slurry comprising the waste biomass-derived papermaking fibers; and (c) forming a sheet or web of papermaking fibers from the slurry, wherein the sheet or web has a basis weight of at least about 40 grams per square meter (g/m$^2$). In some embodiments, the waste biomass-derived papermaking fibers comprise one or more of hemp hurds fibers, fibers derived from a mixture of hemp hurds and hemp bast, bagasse fibers, and cocoa pod husk fibers.

In some embodiments, prior to pulping, the waste biomass is classified according to size and/or thickness. In some embodiments, the pulping is performed via kraft pulping, soda pulping, or autohydrolysis. In some embodiments, the kraft pulping is performed using about 12% active alkali.

In some embodiments, the method further comprises bleaching the waste biomass-derived papermaking fibers prior to step (b). In some embodiments, the bleaching is performed using three step elemental chloride free (ECF) bleaching, wherein the first step of the ECF bleaching comprises contacting the waste biomass-derived papermaking fibers with chloride dioxide, the second step of the ECF bleaching comprises contacting the waste biomass-derived papermaking fibers with hydrogen peroxide and hydroxide, and the third step of the ECF bleaching comprises contacting the waste biomass-derived paper making fibers with chloride dioxide.

In some embodiments, the method further comprises refining the waste biomass-derived papermaking fibers prior to step (b). In some embodiments, the refining is performed via disc refining.

In some embodiments, at least about 70% of the waste biomass-derived papermaking fibers in the slurry are hemp hurds fibers. In some embodiments, the hemp hurds fibers are kraft fibers. In some embodiments, the slurry further comprises cocoa pod husk fibers, softwood fibers, hardwood fibers, or fibers from a mix of hemp hurds and hemp bast.

In some embodiments, the slurry further comprises one or more additives. In some embodiments, the one or more additives are selected from the group comprising a starch, alkyl ketene dimer (AKD), carboxymethyl cellulose, citric acid, and a citric acid ester.

In some embodiments, the paper is converted to or configured for use as a food packaging material.

In some embodiments, step (c) is performed using a Fourdrinier paper machine, with or without a surface sizing. In some embodiments, the method further comprises calendering. In some embodiments, the method comprises forming a packaging material.

Accordingly, it is an object of the presently disclosed subject matter to provide a packaging material (e.g., a food packaging material) comprising a sheet or web comprising papermaking fibers derived from a waste biomass (e.g., hemp hurds) and to related methods. This and other objects are achieved in whole or in part by the presently disclosed subject matter.

An object of the presently disclosed subject matter having been stated above, other objects and advantages of the presently disclosed subject matter will become apparent to those of ordinary skill in the art after a study of the following description of the presently disclosed subject matter and non-limiting Figures.

BRIEF DESCRIPTION OF THE DRAWINGS

FIG. 8A is a schematic diagram showing a reaction of alkyl ketene dimer (AKD) with cellulose to form a β-keto ester. The diagram is reproduced from reference [44]. FIG. 8B is a schematic diagram showing a quaternary ammonium cationic starch prepared by treatment with 2,3-epoxy propyl trimethyl ammonium chloride. The diagram reproduced from reference [45].

FIGS. 10A-10E are a series of photographic images showing exemplary handsheets of the presently disclosed subject matter. FIG. 10A shows a photographic image of handsheets from "Trial 1" where samples 1-3 (top row) were prepared from pulp obtained by kraft pulping and conventional bleaching of hemp hurds from the United States of America (HKC-HH-US); where samples 4-6 (middle row) were prepared from pulp obtained by autohydrolysis and conventional bleaching of hemp hurds from the Netherlands (AHC-HH-NL); and where samples 7-9 (bottom row) were prepared from wood fiber pulp as controls. FIG. 10B is a photographic image of handsheets from "Trial 2" where sample 10 (top left) was prepared from HKC-HH-US pulp; sample 11 (top middle) was prepared from pulp obtained by kraft pulping and conventional bleaching of hemp hurds from the Netherlands (HKC-HH-NL); sample 12 (top right) was prepared from control wood fiber pulp; sample 13 (bottom left) was prepared from AHC-HH-NL pulp; and sample 14 (bottom right) was prepared from pulp obtained by autohydrolysis and peroxide bleaching of hemp hurds from the Netherlands (AHP-HH-NL). FIG. 10C is a photographic image of handsheets from "Trial 3", where sample 15 (top left) was prepared from a mix of 70% HKC-HH-NL pulp and 30% pulp obtained by kraft pulping and conventional bleaching of hemp mix from the United States of America (HCK-HM-US); sample 16 (bottom left) was prepared from the same pulp mix as sample 15 (i.e., HKC-HH-HL:HKC-HM-US (70:30)) only with additive (1% cationic starch and 1% alkyl ketene dimer (AKD); sample 17 (top right) was prepared from a mix of 70% hardwood (HW) pulp and 20% softwood (SW) pulp with 10% pulp from cocoa pod husks (CPH) and no additive; and sample 18 (bottom right) was prepared from the same pulp mix as sample 17 (HW:SW:CPH (70:20:20)) only with additive (1% cationic starch and 1% AKD). FIG. 10D is a photographic image of handsheets from "Trial 4", where sample 19 (top left) was prepared from 100% HKC-HH-NL pulp; sample 20 (top middle) was prepared from a mix of 90% HKC-HH-NL pulp and 10% HKC-HM-US pulp; sample 21 (top right) was prepared from a mix of 80% HKC-HH-NL pulp and 20% HKC-HM-US pulp; sample 22 (bottom left) was prepared from a mix of 70% HKC-HH-NL pulp and 30% HKC-HM-US pulp; and sample 23 (bottom right) was prepared from a mix of 70% HW pulp and 30% SW pulp. FIG. 10E is a photographic image of handsheets from "Trial 5", where sample 24 (top left) was prepared from 100% HKC-HH-NL pulp; sample 25 (top, second from left) was prepared from a mix of 70% HKC-HH-NL pulp and 30% HKC-HM-US pulp refined at 2,500 revolutions (2.5 k); sample 26 (top, third from left) was prepared from a mix of 70% HKC-HH-NL and 30% HKC-HM-US pulp refined at 5,000 revolutions (5 k); sample 27 (bottom left) was prepared from 100% HW pulp; sample 28 (bottom, second from left) was prepared from a mix of 70% HW pulp refined at 2.5 k and 30% SW pulp refined at 2.5 k; sample 29 (top, third from right) was prepared from a mix of 70% HKC-HH-NL pulp and 30% HKC-HM-US pulp; sample 30 (top, second from right) was prepared from a mix of 70% HKC-HH-NL pulp and 30% hemp mix rejects (HKC-HMR-US) pulp; sample 31 (top right) was prepared from a mix of 70% HKC-HH-NL and 30% SW pulp refined at 2.5 k; sample 32 (bottom, second from right) was prepared from a mix to 70% HKC-HH-NL pulp and 30% SW pulp refined at 5 k; and sample 33 (bottom right) was prepared from a wood fiber pulp mix with 70% HW pulp refined at 2.5 k and 30% SW pulp refined at 5 k.

FIG. 11A is a graph of "Trial 1" handsheets prepared from pulp obtained by kraft pulping and conventional bleaching of hemp hurds from the United States of America (HKC-HH-US), fibers obtained by autohydrolysis and conventional bleaching of hemp hurds from the Netherlands (AHC-HH-NL); or wood fibers showing the effect of different combinations of additives selected from cationic starch (ST), alkyl ketene dimer (AKD), citric acid (CA), carboxymethyl cellulose (CMC) and triethyl citrate (TEC). FIG. 11B is a graph of "Trial 2" handsheets showing the effect of different pulp (i.e., HKC-HH-US, pulp obtained by kraft pulping and conventional bleaching of hemp hurds from the Netherlands (HKC-HH-NL), ACH-HH-NL, pulp obtained by autohydrolysis and peroxide bleaching of hemp hurds from the Netherlands (AHP-HH-NL), or wood pulp) with 5% ST+1% AKD as additives. FIG. 11C is a graph of "Trial 3" handsheets showing the effect of 1% ST+1% AKD as additives on different pulp furnish: a mix of 90% HKC-HH-NL and 10% kraft pulped and conventionally bleached hemp mix from the United States of America (HKC-HM-US) (i.e., HKC-HH-NL:HKC-HM-US (90:10)) or 70% hardwood (HW) pulp, 20% softwood (SW) pulp and 10% pulp from cocoa pod husks (CPH) (i.e., HW:SW:CPH (70:20:10)). Data is shown for the two different pulp furnishes with and without additive. FIG. 11D is a graph of "Trial 4" handsheets showing the effect of adding different amounts of HKC-HM-US to HKC-HH-NL along with 1% ST and 1% AKC as additives. The furnishes used include 100 HKC-HH-NL (HKC-HH-NL (100)), a mix of HKC-HH-NL with 10% HKC-HM-US (HKC-HH-NL: HKC-HM-US (90:10)), a mix of HKC-HH-NL with 20% HKC-HM-US (HKC-HH-NL:HKC-HM-US (80:20)), a mix of HKC-HH-NL with 30% HKC-NM-US (HKC-HH-NL: HKC-HM-US (70:30)), or wood fiber pulp control. FIG. 11E is a graph of "Trial 5" handsheets as described above for FIG. 10E showing the effect of refining kraft softwood (SW) pulp at 5000 revolutions (5K rev) or 2500 revolutions (2.5 krev), refining kraft, conventionally bleached hemp mix pulp (HKC-HM-US) at 2.5 k rev, or adding hemp mix rejects (HMR) to HKC-HH-NL pulp with 1% ST+1% AKD.

FIG. 12A is a graph of "Trial 1" handsheets prepared from pulp obtained by kraft pulping and conventional bleaching of hemp hurds from the United States of America (HKC-HH-US), fibers obtained by autohydrolysis and conventional bleaching of hemp hurds from the Netherlands (AHC-HH-NL); or wood fibers showing the effect of different combinations of additives selected from cationic starch (ST), alkyl ketene dimer (AKD), citric acid (CA), carboxymethyl cellulose (CMC) and triethyl citrate (TEC). FIG. 12B is a graph of "Trial 2" handsheets showing the effect of different pulp (HKC-HH-US, pulp obtained by kraft pulping and conventional bleaching of hemp hurds from the Netherlands (HKC-HH-NL), ACH-HH-NL, pulp obtained by autohydrolysis and peroxide bleaching of hemp hurds from the Netherlands (AHP-HH-NL) or wood pulp) with 5% ST+1% AKD as additives. FIG. 12C is a graph of "Trial 3" handsheets showing the effect of 1% ST+1% AKD as additives on different pulp furnish: a mix of 90% HKC-HH-NL and 10% kraft pulped and conventionally bleached hemp mix from the United States of America (HKC-HM-US) (i.e., HKC-HH-NL:HKC-HM-US (90:10)) or 70% hardwood (HW) pulp, 20% softwood (SW) pulp and 10% pulp from cocoa pod husks (CPH) (i.e., HW:SW:CPH (70:20:10)). Data is shown for the two different pulp furnishes with and without additive. FIG. 12D is a graph of "Trial 4: handsheets showing the effect of adding different amounts of HKC-HM-US to HKC-HH-NL along with 1% ST and 1% AKC as additives. The furnishes used include 100 HKC-HH-NL (HKC-HH-NL (100)), a mix of HKC-HH-NL with 10% HKC-HM-US (HKC-HH-NL:HKC-HM-US (90:10)), a mix of HKC-HH-NL with 20% HKC-HM-US (HKC-HH-NL: HKC-HM-US (80:20)), a mix of HKC-HH-NL with 30% HKC-NM-US (HKC-HH-NL:HKC-HM-US (70:30)), or wood fiber pulp control. FIG. 12E is a graph of "Trial 5" handsheets as described above for FIG. 10E showing the effect of refining kraft softwood (SW) pulp at 5000 revolutions (5K rev) or 2500 revolutions (2.5 k rev), refining kraft, conventionally bleached hemp mix pulp (HKC-HM-US) at 2.5 k rev, or adding hemp mix rejects (HMR) to HKC-HH-NL pulp with 1% ST+1% AKD.

FIG. 13A is a graph of "Trial 1" handsheets prepared from pulp obtained by kraft pulping and conventional bleaching of hemp hurds from the United States of America (HKC-HH-US), pulp obtained by autohydrolysis and conventional bleaching of hemp hurds from the Netherlands (AHC-HH-NL); or wood fiber pulp showing the effect of different combinations of additives selected from cationic starch (ST), alkyl ketene dimer (AKD), citric acid (CA), carboxymethyl cellulose (CMC) and triethyl citrate (TEC). FIG. 13B is a graph of "Trial 2" handsheets showing the effect of different pulp (HKC-HH-US, pulp obtained by kraft pulping and conventional bleaching of hemp hurds from the Netherlands (HKC-HH-NL), ACH-HH-NL, pulp obtained by autohydrolysis and peroxide bleaching of hemp hurds from the Netherlands (AHP-HH-NL) or wood pulp) with 5% ST+1% AKD as additives. FIG. 13C is a graph of "Trial 3" handsheets showing the effect of 1% ST+1% AKD as additives on different pulp furnish: a mix of 90% HKC-HH-NL and 10% kraft pulped and conventionally bleached hemp mix from the United States of America (HKC-HM-US) (i.e., HKC-HH-NL:HKC-HM-US (90:10)) or 70% hardwood (HW) pulp, 20% softwood (SW) pulp and 10% pulp from cocoa pod husks (CPH) (i.e., HW:SW:CPH (70:20:10)). Data is shown for the two different pulp furnishes with and without additive. FIG. 13D is a graph of "Trial 4" handsheets showing the effect of adding different amounts of HKC-HM-US to HKC-HH-NL along with 1% ST and 1% AKC as additives. The furnishes used include 100 HKC-HH-NL (HKC-HH-NL (100)), a mix of HKC-HH-NL with 10% HKC-HM-US (HKC-HH-NL:HKC-HM-US (90:10)), a mix of HKC-HH-NL with 20% HKC-HM-US (HKC-HH-NL:HKC-HM-US (80:20)), a mix of HKC-HH-NL with 30% HKC-NM-US (HKC-HH-NL:HKC-HM-US (70:30)), or wood fiber pulp control. FIG. 13E is a graph of "Trial 5" handsheets as described above for FIG. 10E showing the effect of refining kraft softwood (SW) pulp at 5000 revolutions (5K rev) or 2500 revolutions (2.5 k rev), refining kraft, conventionally bleached hemp mix pulp (HKC-HM-US) at 2.5 k rev, or adding hemp mix rejects (HMR) to HKC-HH-NL pulp with 1% ST+1% AKD.

FIG. 14A is a graph of "Trial 1" handsheets prepared from pulp obtained by kraft pulping and conventional bleaching of hemp hurds from the United States of America (HKC-HH-US), fibers obtained by autohydrolysis and conventional bleaching of hemp hurds from the Netherlands (AHC-HH-NL); or wood fibers showing the effect of different combinations of additives selected from cationic starch (ST), alkyl ketene dimer (AKD), citric acid (CA), carboxymethyl cellulose (CMC) and triethyl citrate (TEC). FIG. 14B is a graph of "Trial 2" handsheets showing the effect of different pulp (HKC-HH-US, pulp obtained by kraft pulping and conventional bleaching of hemp hurds from the Netherlands (HKC-HH-NL), ACH-HH-NL, pulp obtained by autohydrolysis and peroxide bleaching of hemp hurds from the Netherlands (AHP-HH-NL) or wood pulp) with 5% ST+1% AKD as additives. FIG. 14C is a graph of "Trial 3" handsheets showing the effect of 1% ST+1% AKD as additives on different pulp furnishes: a mix of 90% HKC-HH-NL and 10% kraft pulped and conventionally bleached hemp mix from the United States of America (HKC-HM-US) (i.e., HKC-HH-NL:HKC-HM-US (90:10)) or 70% hardwood (HW) pulp, 20% softwood (SW) pulp and 10% pulp from cocoa pod husks (CPH) (i.e., HW:SW:CPH (70:20:10)). Data is shown for the two different pulp furnishes with and without additive. FIG. 14D is a graph of "Trial 4" handsheets showing the effect of adding different amounts of HKC-HM-US to HKC-HH-NL along with 1% ST and 1% AKC as additives. The furnish used include 100 HKC-HH-NL (HKC-HH-NL (100)), a mix of HKC-HH-NL with 10% HKC-HM-US (HKC-HH-NL:HKC-HM-US (90:10)), a mix of HKC-HH-NL with 20% HKC-HM-US (HKC-HH-NL:HKC-HM-US (80:20)), a mix of HKC-HH-NL with 30% HKC-NM-US (HKC-HH-NL:HKC-HM-US (70:30)), or wood fiber pulp control. FIG. 14E is a graph of "Trial 5" handsheets as described above for FIG. 10E showing the effect of refining kraft softwood (SW) pulp at 5000 revolutions (5K rev) or 2500 revolutions (2.5 k rev), refining kraft, conventionally bleached hemp mix pulp (HKC-HM-US) at 2.5 k rev, or adding hemp mix rejects (HMR) to HKC-HH-NL pulp with 1% ST+1% AKD.

FIG. 15A is a graph of "Trial 1" handsheets prepared from pulp obtained by kraft pulping and conventional bleaching of hemp hurds from the United States of America (HKC-HH-US), fibers obtained by autohydrolysis and conventional bleaching of hemp hurds from the Netherlands (AHC-HH-NL); or wood fibers showing the effect of different combinations of additives selected from cationic starch (ST), alkyl ketene dimer (AKD), citric acid (CA), carboxymethyl cellulose (CMC) and triethyl citrate (TEC). FIG. 15B is a graph of "Trial 2" handsheets showing the effect of different pulp (HKC-HH-US, pulp obtained by kraft pulping and conventional bleaching of hemp hurds from the Netherlands (HKC-HH-NL), ACH-HH-NL, pulp obtained autohydrolysis and peroxide bleaching of hemp hurds from the Netherlands (AHP-HH-NL), or wood pulp) with 5% ST+1% AKD as additives. FIG. 15C is a graph of "Trial 3" handsheets showing the effect of 1% ST+1% AKD as additives on different pulp furnishes: a mix of 90% HKC-HH-NL and 10% kraft pulped and conventionally bleached hemp mix from the United States of America (HKC-HM-US) (i.e., HKC-HH-NL:HKC-HM-US (90:10)) or 70% hardwood (HW) pulp, 20% softwood (SW) pulp and 10% pulp from cocoa pod husks (CPH) (i.e., HW:SW:CPH (70:20:10)). Data is shown for the two different pulp furnishes with and without additive. FIG. 15D is a graph of "Trial 4" handsheets showing the effect of adding different amounts of HKC-HM-US to HKC-HH-NL along with 1% ST and 1% AKC as additives. The furnishes used include 100 HKC-HH-NL (HKC-HH-NL (100)), a mix of HKC-HH-NL with 10% HKC-HM-US (HKC-HH-NL:HKC-HM-US (90:10)), a mix of HKC-HH-NL with 20% HKC-HM-US (HKC-HH-NL:HKC-HM-US (80:20)), a mix of HKC-HH-NL with 30% HKC-NM-US (HKC-HH-NL:HKC-HM-US (70:30)), or wood fiber pulp control. FIG. 15E is a graph of "Trial 5" handsheets as described above for FIG. 10E showing the effect of refining kraft softwood (SW) pulp at 5000 revolutions (5K rev) or 2500 revolutions (2.5 k rev), refining kraft, conventionally bleached hemp mix pulp (HKC-HM-US) at 2.5 k rev, or adding hemp mix rejects (HMR) to HKC-HH-NL pulp with 1% ST+1% AKD.

FIG. 16A is a graph of "Trial 1" handsheets prepared from pulp obtained by kraft pulping and conventional bleaching of hemp hurds from the United States of America (HKC-HH-US), fibers obtained by autohydrolysis and conventional bleaching of hemp hurds from the Netherlands (AHC-HH-NL); or wood fibers showing the effect of different combinations of additives selected from cationic starch (ST), alkyl ketene dimer (AKD), citric acid (CA), carboxymethyl cellulose (CMC) and triethyl citrate (TEC). FIG. 16B is a graph of "Trial 2" handsheets showing the effect of different pulp (HKC-HH-US, pulp obtained by kraft pulping and conventional bleaching of hemp hurds from the Netherlands (HKC-HH-NL), ACH-HH-NL, pulp obtained by autohydrolysis and peroxide bleaching of hemp hurds from the Netherlands (AHP-HH-NL) or wood pulp) with 5% ST+1% AKD as additives. FIG. 16C is a graph of "Trial 3" handsheets showing the effect of 1% ST+1% AKD as additives on different pulp furnishes: a mix of 90% HKC-HH-NL and 10% kraft pulped and conventionally bleached hemp mix from the United States of America (HKC-HM-US) (i.e., HKC-HH-NL:HKC-HM-US (90:10)) or 70% hardwood (HW) pulp, 20% softwood (SW) pulp and 10% pulp from cocoa pod husks (CPH) (i.e., HW:SW:CPH (70:20:10)). Data is shown for the two different pulp furnishes with and without additive. FIG. 16D is a graph of "Trial 4" handsheets showing the effect of adding different amounts of HKC-HM-US to HKC-HH-NL along with 1% ST and 1% AKC as additives. The furnishes used include 100 HKC-HH-NL (HKC-HH-NL (100)), a mix of HKC-HH-NL with 10% HKC-HM-US (HKC-HH-NL:HKC-HM-US (90:10)), a mix of HKC-HH-NL with 20% HKC-HM-US (HKC-HH-NL:HKC-HM-US (80:20)), a mix of HKC-HH-NL with 30% HKC-NM-US (HKC-HH-NL:HKC-HM-US (70:30)), or wood fiber pulp control. FIG. 16E is a graph of "Trial 5" handsheets as described above for FIG. 10E showing the effect of refining kraft softwood (SW) pulp at 5000 revolutions (5K rev) or 2500 revolutions (2.5 k rev), refining kraft, conventionally bleached hemp mix pulp (HKC-HM-US) at 2.5 k rev, or adding hemp mix rejects (HMR) to HKC-HH-NL pulp with 1% ST+1% AKD.

FIG. 17A shows results from the "Trial 2" handsheets as described for FIG. 10B with 5% cationic starch (ST) and 1% alkyl ketene dimer (AKD) as additives. Fibers included kraft pulped and conventionally bleached hemp hurds from the United States (HKC-HH-US) or the Netherlands (HKC-HH-NL), fibers obtained by autohydrolysis and conventional bleaching of hemp hurds from the Netherlands (AHC-HH-NL), fibers obtained by autohydrolysis and peroxide bleaching of hemp hurds from the Netherlands (AHP-HH-NL) and wood fiber control (Wood Fibers). FIG. 17B shows results for the "Trial 3" handsheets as described for FIG. 10C with 1% ST and 1% AKC as additives. Fiber types included a mix of 90% HKC-HH-NL and 10% fibers from kraft pulping and conventional bleaching of hemp mix (HKC-HM), i.e., HKC-HH-NL:HKC-HM (90:10), or a mix of 70% hardwood fibers, 20% softwood fibers, and 10% cocoa pod husk fibers, i.e., HW:SW:CPH (70:20:10). FIG. 17C shows results from the "Trial 4" handsheets as described for FIG. 10D and with 1% ST and 1% AKD as additives. Fibers used included 100% HKC-HH-NL (HKC-HH-NL (100)), a mix of 90% HKC-HH-NL and 10% HKC-HM (HKC-HH-NL:HKC-HM-US (90:10), a mix of a mix of 80% HKC-HH-NL and 20% HKC-HM (HKC-HH-NL:HKC-HM-US (80:20), a mix of 70% HKC-HH-NL and 30% HKC-HM (HKC-HH-NL:HKC-HM-US (70:30), and a mixture of 70% hardwood fibers refined at 2500 revolutions and 30% softwood fibers refined at 5000 revolutions (HW (2.5 k):SW (5K) (70:30). FIG. 17D is a graph of "Trial 5" handsheets as described above for FIG. 10E showing the effect of refining kraft softwood (SW) pulp at 5000 revolutions (5K rev) or 2500 revolutions (2.5 k rev), refining kraft, conventionally bleached hemp mix pulp (HKC-HM-US) at 2.5 k rev, or adding hemp mix rejects (HMR) to HKC-HH-NL pulp with 1% ST+1% AKD.

DETAILED DESCRIPTION

Figure 1A:
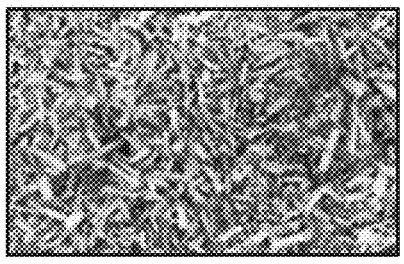
FIGS. 1A-1D are a series of photographic images of raw materials used to provide fibers according to the presently disclosed subject matter, including hemp hurds (FIG. 1A); mixtures of hemp hurds and hemp bast, referred to herein as "hemp mix" (FIG. 1B); small chunk cocoa pod husk (FIG. 1C) and large chunk cocoa pod husk (FIG. 1D).

The presently disclosed subject matter will now be described more fully hereinafter with reference to the accompanying Examples and Figures, in which representative embodiments are shown. The presently disclosed subject matter can, however, be embodied in different forms and should not be construed as limited to the embodiments set forth herein. Rather, these embodiments are provided so that this disclosure will be thorough and complete, and will fully convey the scope of the embodiments to those skilled in the art.

Unless otherwise defined, all technical and scientific terms used herein have the same meaning as commonly understood by one of ordinary skill in the art to which this presently described subject matter belongs. All publications, patent applications, patents, and other references mentioned herein are incorporated by reference in their entirety.

Throughout the specification and claims, a given chemical formula or name shall encompass all optical and stereoisomers, as well as racemic mixtures where such isomers and mixtures exist.

I. Definitions

While the following terms are believed to be well understood by one of ordinary skill in the art, the following definitions are set forth to facilitate explanation of the presently claimed subject matter.

Following long-standing patent law convention, the terms "a", "an", and "the" refer to "one or more" when used herein, including in the claims.

As used herein, the term "about", when referring to a value or an amount, for example, relative to another measure, is meant to encompass variations of in some embodiments ±20%, in some embodiments ±10%, in some embodiments ±5%, in some embodiments ±1%, and in some embodiments ±0.1% from the specified value or amount, as such variations are appropriate. The term "about" can be applied to all values set forth herein.

As used herein, the term "and/or" when used in the context of a listing of entities, refers to the entities being present singly or in combination. Thus, for example, the phrase "A, B, C, and/or D" includes A, B, C, and D individually, but also includes any and all combinations and sub-combinations of A, B, C, and D.

The term "comprising", which is synonymous with "including," "containing," or "characterized by" is inclusive or open-ended and does not exclude additional, unrecited elements or method steps. "Comprising" is a term of art used in claim language which means that the named elements are present, but other elements can be added and still form a construct or method within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, "significance" or "significant" relates to a statistical analysis of the probability that there is a non-random association between two or more entities. To determine whether or not a relationship is "significant" or has "significance", statistical manipulations of the data can be performed to calculate a probability, expressed in some embodiments as a "p-value". Those p-values that fall below a user-defined cutoff point are regarded as significant. In some embodiments, a p-value less than or equal to 0.05, in some embodiments less than 0.01, in some embodiments less than 0.005, and in some embodiments less than 0.001, are regarded as significant.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

"Paper," as used herein, refers to a material constructed of pressed together moist cellulosic and/or lignocellulosic fibers. For example, a paper can comprise a web of cellulosic and/or lignocellulosic fibers having a top side and a bottom side. In some embodiments, the paper is a planar sheet. In some embodiments, the sheet can have a thin (e.g., less than about 5 mm) edge. Alternatively, the paper can be molded to any desirable shape. In some embodiments, the paper can be bendable. In some embodiments, the paper can be unmalleable such that it retains its shape and structure during ordinary usage as a packaging material, such as a food packaging product.

The term "papermaking fibers" as used herein refers to cellulosic and/or lignocellulosic fibers and to fiber mixes comprising cellulosic and/or lignocellulosic fibers. Papermaking fibers include non-wood fibers, such as, but not limited to, cotton fibers or cotton derivatives, abaca, kenaf, sabai grass, flax, esparto grass, straw, jute, hemp, bagasse, milkweed floss, cocoa pod husk and pineapple leaf fibers, and wood fibers such as those obtained from deciduous and coniferous trees, including softwood fibers, such as northern and southern softwood kraft fibers, hardwood fibers, such as eucalyptus, maple, birch, aspen, or the like. In some embodiments, the papermaking fibers are fibers from an agricultural and/or industrial waste biomass, such as hemp hurds, mixes containing hemp hurds, and cocoa pod husks. Papermaking fibers can be liberated from their source material by chemical and/or mechanical pulping processes known in the art, such as, but not limited to, the kraft (sulfate) and sulfite chemical pulping processes, where most of the lignin and hemicellulose components are removed, organo-solvent pulping, semi-chemical pulping, enzymatic pulping, chemi-thermomechanical pulping (CTMP), thermomechanical pulping (TMP), hydrothermal pulping, autohydrolysis pulping, other alkaline (e.g., soda or carbonate) pulping, or any combination of chemical and/or mechanical treatments. Bleaching chemicals such as hydrogen peroxide, oxygen, enzymes, chlorine dioxide, hypochlorite, ozone, and/or other bleaching agents can be used to whiten the "cellulosic material."

The terms "pulping" and "defibration" refer to the process of liberating discrete fibers from a cellulosic or lignocellulosic feedstock.

"Furnishes" and like terminology refers to aqueous compositions including papermaking fibers and optionally additives, such as those typically used in papermaking, including dry strength additives, wet strength resins, and the like. The term "slurry" as used herein refers to an aqueous dispersion of papermaking fibers. In some embodiments, the terms "furnish" and "slurry" can be used interchangeably.

The term "biomass" as used herein refers to a renewable organic material from plants. The term "waste biomass" as used herein refers to biomass materials that are typically underutilized or not utilized and/or considered of low value. Typically, "waste biomass" is a byproduct from an agricultural or industrial process that involves harvesting or otherwise processing a parent biomass material. Thus, for example, waste biomass includes agricultural residues and byproducts of other plant processing.

The term "hemp hurds" as used herein refers to the inner core of the stem of the hemp plant (*Cannabis sativa*), comprising relatively short xylem fibers and stem pith. Hemp hurds can be separated from the stem by a process referred to as "retting" or via a decortication process. The term "hemp mix" as used herein refers to a mixture of hemp hurds and material from the outer ring of the hemp stem, which can include longer phloem (or "bast") fibers.

II. General Considerations

Due to increasing governmental regulations and social awareness against synthetic plastics, there is increased world-wide interest in bio-based and sustainable products, which could save up to $26 trillion by 2030 [1,2]. The impact of synthetic plastics on the environment and human health has pushed many industries to look to sustainable packaging from renewable wood and non-wood fibers [4,5]; and promoting bio-based packaging materials as alternatives to plastics has become an emerging trend [6] [1]. Yet, finding sustainable food packaging materials that are both eco-friendly and cost-effective remains challenging.

Paper and paperboards represent 31% of the global packaging market segment and are most widely used in food packaging for containment and protection of food products, convenience during storage or consumption, and for communication of relevant information to consumers. Paper-based materials can be 100% biodegradable, as they are based on natural fiber like cellulose, and thus can have a lower undesirable impact on the environment [26]. Wood is still the predominant resource of pulp production and 89% of world paper production is based on wood fiber pulps from coniferous (softwood) and/or deciduous (hardwood) trees, while only 11% is based on non-woody plants [7]. Softwood fibers tend to be longer than hardwood fibers and are comparatively stronger. Most papers are made from unique blends of softwood and hardwood fibers in order to achieve desired printing surface and strength properties [29].

Non-woods and agro-industrial waste biomass sources are receiving renewed attention due to concerns about increasing wood consumption and availability for the pulp industry in some regions [27]. For instance, industrial hemp (*Cannabis sativa*) is one emerging bioresource in light of recent legalization in the United States of America and other parts of the world. Hemp has been used as an important crop throughout human history for food, fiber, and medicine. Industrial hemp is composed of 50% to 77% of cellulosic fibers, among which 20% are long fibers, which are the among the strongest natural fibers in the world [9]. The long fibers, also known as bast fibers, are generally present in the outer layer of the hemp stem and are preferably used in composites, textiles, and specialty papers. Hemp biomass from hemp hurds waste for sustainable food packaging and other applications has been limited [9]. Hemp hurds are the low value core part of the hemp stem and are mainly used in animal bedding and hemp-crate construction materials. It has been estimated that the valorization of hemp hurds has the potential to meet 5% of the total global paper supply for tissue papers, fiberboards, and bioplastics [8, 9].

Besides hemp biomass, several other agricultural wastes and industrial byproducts like cocoa pod husks from cocoa fruits and bagasse from sugar cane are available in large quantities. Cocoa (*Theobroma cacao* L.) fruits are an important commodity for its seeds or beans to produce cocoa powder, butter, and chocolate. Cocoa processing generates byproducts referred to as "cocoa pod husk," which represents 70-75% of the whole cocoa fruit weight [8]. Cocoa pod husk (CPH) is typically either diverted for agriculture use or disposed to landfill. However, there is potential to convert cocoa byproducts to useful fibers and chemicals, especially for food packaging applications, thin films and as coating agents. For example, the use of 10% CPH fiber as a natural filler in polylactic acid (PLA) has been shown to increase tensile strength by 13% [11]. In addition, CPH includes a relatively higher number of phenolic compounds and pectin. The extracted phenolic compounds could be employed as a natural ingredient in high value products such as anti-wrinkle agents to improve skin hydration level [12].

In addition to finding a suitable biomass feedstock to provide fibers for sustainable, eco-friendly packaging, another challenge in the development of sustainable packaging is the development of environment-friendly, low-cost processes that can yield high quality fibers from biomass, which is naturally heterogeneous. For instance, the selection of defibration/pulping process can affect the environmental footprint while imparting different properties to the fibers. Pulping is generally performed mechanically or chemically, or by some combination thereof. Kraft pulping is the most widely used conventional chemical pulping process for woody fibers (hardwood and softwood). It uses chemicals such as sodium hydroxide and sodium sulfide to remove lignin and liberate cellulosic fibers from the wood matrix [29]. During pulping, the complex organic lignin molecule, which acts as a binder between fibers, is fragmented into smaller units and dissolves into the alkali, whereas cellulose and hemicellulose are liberated in a step-wise matter by polymer end reactions known as peeling [31]. In contrast, pulping by autohydrolysis employs water at elevated temperature and pressure to efficiently cleave acetyl groups in hemicellulose that bind lignin to the cell wall matrix and remove acetic acid as a side product and liberate cellulose [19].

Bleaching processes can be used to remove residual lignin to enhance pulp brightness, which can be desirable for some applications, e.g., to enhance printing and/or for aesthetic purposes. Ideally, bleaching should selectively remove lignin without damaging the cellulose. Most developed countries have moved away from traditional $Cl_2$-based delignification processes because of the potential environmental impact of chlorocarbon by-products. Thus, alternatives to $Cl_2$, such as Elemental Chlorine Free (ECF) bleaching, have been developed in recent years. Oxygen ($O_2$) and peroxide ($H_2O_2$) are also attractive alternatives to $Cl_2$ based technology, both with respect to environment and economy [32].

In addition to the fiber type (e.g., species, Kraft, mechanical, bleached or unbleached), furnish mix, refining, and chemical additives can play a role in developing paper properties [28] [29]. The term "refining" refers to mechanical treatment of pulp by using specialized equipment (e.g., disc or other types of refiners). In the refining process, the fibers are subjected to compression and shear forces, which cause several changes in fiber properties like internal and external fibrillation, shortening of fiber length, fines creation, and fiber deformation (e.g., curling or straightening of fiber), which can eventually affect the paper properties [33]. For example, the breakage of inner bonds during refining between the fibrils causes fiber swelling and thereby makes the fibers more flexible, which allows the fibers to come into close contact during the pressing and drying processes, and enhances their internal bonding, hence the strength of the resulting paper [35] [36].

Figures 8A, 8B:
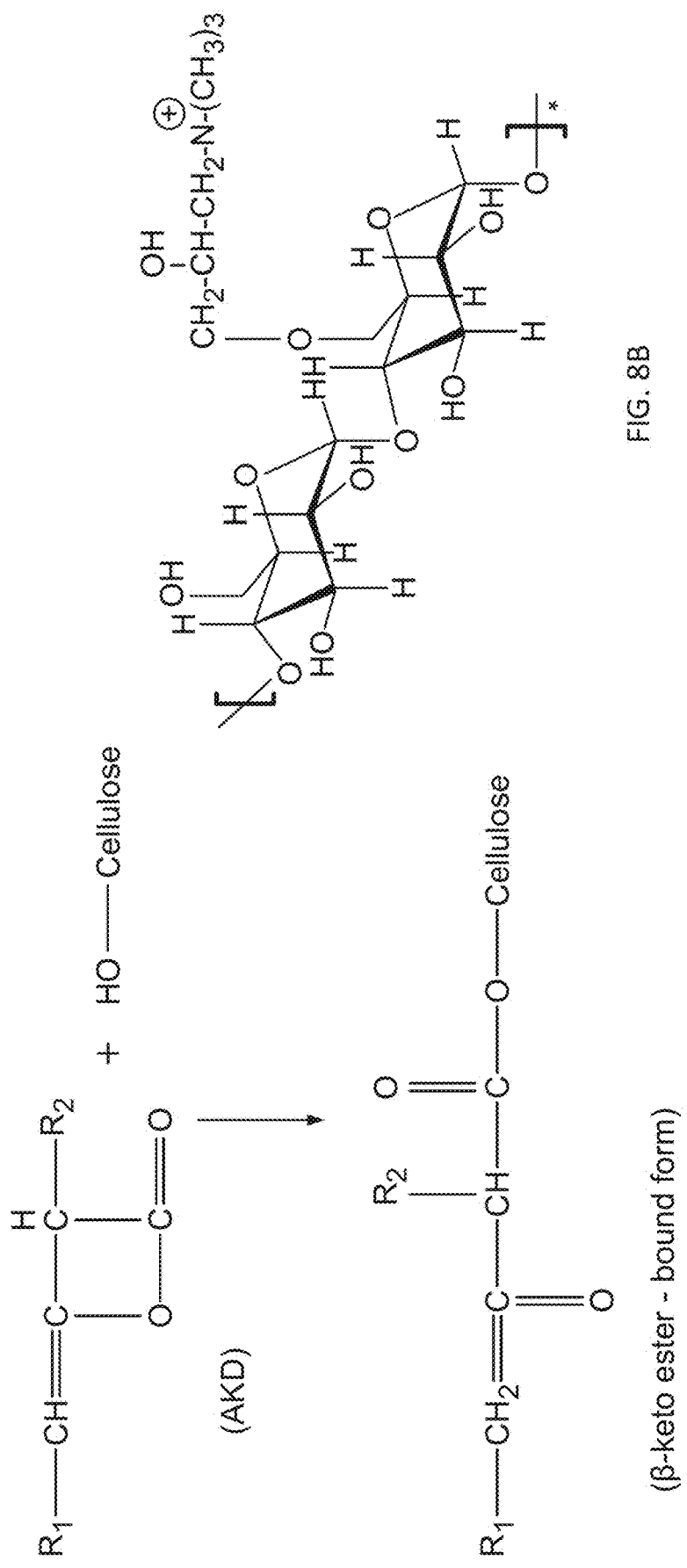
FIGS. 8A and 8B are schematic diagrams showing different approaches to modifying cellulose.

Packaging papers for food applications require barrier properties against water, grease, and oxygen/air to increase shelf life. An aspect of papermaking is the use of chemical additives to modify its barrier and strength properties or improve its production process. Many chemical additives can be used in papermaking, including sizing agents, strength agents (wet and dry), retention and drainage aids, biocides, optical brighteners, and colorants [37]. For example, sizing agents, especially in internal sizing, can increase resistance to water or other liquid penetration and dimensional stability, and reduce ink feathering [38]. An exemplary internal sizing agents is alkyl ketene dimer (AKD) [39]. The diketene molecule in AKD can derivatize hydroxyl groups in cellulose by forming a β-keto ester as shown in FIG. 8A. Another exemplary additive used in papermaking is starch. The retention and adsorption properties of starch can be improved by introducing positive charges, resulting in what is known as cationic starch (see FIG. 8B) [45]. These additives can be used as wet-end additives in papermaking as they can provide benefits like improvement of mechanical strength, better retention of fines and fillers, faster drainage, and reduction of water pollution [40]. The use of carboxymethyl cellulose (CMC) in papermaking has been studied for its ability to increase the paper strength without affecting sheet density [41]. In addition, natural cross-linking agents, such as citric acid, and plasticizers, such as triethyl citrate (TEC), can be used to enhance bonding, flexibility, and stretchability [42, 43].

Prior to the presently disclosed subject matter, little has been described regarding alternative fibers development from waste biomass resources. While fibers development from alternative resources has been reported for household hygiene items such as paper towels, tissue paper and wipes [8], these items do not require the strength for packaging materials. Further, that work focused on utilization of a low amount of alternative fibers (mostly 25%) with conventional wood fibers in the hygiene products. As described herein, sustainable fibers are useful for applications involving higher strength and can be used to provide up to 100% of the cellulosic fibers in a paper product or in the base sheet thereof.

Therefore, according to one aspect of the presently disclosed subject matter is provided the valorization of waste biomass, such as hemp biomass and CPH, through a sustainable fiber development process to make a high value, flexible packaging material, In some embodiments, the presently disclosed subject matter provides alternative fibers for paper-based food packaging applications. In some embodiments, the alternative fibers are provided by a method comprising biomass feedstock screening, chemomechanical pulping, and bleaching. In some embodiments, the pulping and/or bleaching can be accomplished under conditions involving using lower than conventional amounts of chemicals or more environmentally friendly chemicals.

Thus, according to one aspect, the presently disclosed subject matter explores the use of agricultural and/or industrial waste biomass feedstock to generate high-quality papermaking fibers (e.g., for paper development for packaging) through sustainable and green chemistry. To enhance sustainability, chemical-free (autohydrolysis) and mild kappa kraft pulping have been explored for hemp biomass (hemp hurds and hemp mix) and cocoa pod husks (CPH). In some embodiments, the screened pulps were brightened by an elemental chlorine-free (ECF) bleaching process or a peroxidation process to achieve a range of fiber colors from natural to white. The ECF bleaching was performed in a three-step process instead of the typical five steps, while peroxidation was done in a single step to develop high-quality, high yield fibers for packaging application.

As described further herein below, the quality and yield of the fibers were evaluated based on the raw materials screening and refining process. A higher yield of 51.3% of hemp hurds fibers was achieved by mild kraft pulping and hemp hurds-derived fibers with a target brightness of 84.6 were achieved by using conventional bleaching. Fibers developed by autohydrolysis gave a higher yield, which was attained using a simple, chemical-free and low-cost process. On the other hand, fibers obtained via alkali (soda) or mild kraft pulping had relatively lower lignin content, lower surface charges, fewer fines content, and higher fiber length and degree of polymerization (DP). The relatively high yield of sustainable fibers having desirable properties through a green chemical process can provide a substantial economic benefit, since fiber development is a significant cost in the manufacturing of bio-based packaging, especially food packaging.

According to another aspect of the presently disclosed subject matter, an alternative fiber-based paper for flexible packaging development is described. In particular, hemp hurds-derived fibers were used for base paper development. Cocoa pod husks fibers were also studied as a filler/strength aid due to their high level of fines content. The fibers were mechanically refined to evaluate impact on strength and other paper properties. Various chemical additives, such as starch, alkyl ketene dimer (AKD), citric acid, carboxymethyl cellulose, and triethyl citrate, were studied to enhance water and air resistance, strength, and flexibility. Papers using high levels of alternative (i.e., waste biomass-derived) fibers were compared to control papers made from wood-derived fibers The presence of all the additives improved air resistance to a large extent and improved the strength properties. Kraft pulped, ECF bleached/brightened hemp hurds fiber (from hemp hurds sourced from either the United States of America or the Netherlands) showed high tensile, burst, and stretch. Although tear strength of hemp hurds fiber paper was lower than that of wood fiber paper due to the short fiber length of fibers from hemp hurds, the addition of long fibers from hemp mix (which included bast fibers) or softwood improved tear strength. Further, the presence of refined hemp mix fibers provided improved burst strength. The brightness of paper from kraft pulped, ECF bleached/brightened fibers was high; although autohydrolyzed fibers, bleached by either an ECF process or a peroxide only process, provided paper with relatively low brightness and a more natural color due to the presence of considerably high level of lignin.

III. Waste Biomass Paper for Food Packaging

In some embodiments, the presently disclosed subject matter provides a packaging material comprising a paper web prepared from papermaking fibers derived from a waste biomass feedstock. Thus, in some embodiments, the packaging material comprises a bio-based paper made from alternative (i.e., non-wood) fibers and that can combine biodegradability and sustainability. In some embodiments, the packaging material is a food packaging material.

Any suitable waste biomass feedstock can be used as the source of the papermaking fibers. The waste biomass feedstock can be an agricultural waste product (e.g., a crop residue such as wheat or rice straw or corn stover) or an industrial waste product (e.g., a lignocellulosic material byproduct produced during the processing of a plant material, such as hemp hurds, cocoa pod husks or bagasse (i.e., sugar cane and/or sorghum bagasse). In some embodiments, the papermaking fibers are derived from a waste biomass selected from hemp hurds; mixtures of hemp hurds and other hemp materials, such as hemp bast fiber; bagasse; and cocoa pod husks (CPHs). In some embodiments, mixtures of papermaking fibers derived from different waste biomass can be used.

In some embodiments, the sheet or web comprises a paper (e.g., a "base sheet") that has a basis weight of at least about 40 grams per square meter ($g/m^2$). In some embodiments, the sheet has a basis weight of about 40 $g/m^2$ to about 300 $g/m^2$ (e.g., about 40, 50, 60, 70, 80, 90, 100, 110, 120, 130, 140, 150, 160, 170, 180, 190, 200, 210, 220, 230, 240, 250, 260, 270, 280, 290, or about 300 $g/m^2$). In some embodiments, the sheet has a basis weight of about 60 $g/m^2$ to about 200 $g/m^2$ or 60 $g/m^2$ to about 120 $g/m^2$.

In some embodiments, the web comprises papermaking fibers predominantly sourced from one or more waste biomass feedstock. Thus, in some embodiment, at least about 50% (based on total fiber dry mass) of the papermaking fibers in the sheet or web are derived from one or more waste biomass feedstock. In some embodiments, at least about 60% or at least about 70% of the papermaking fibers are derived from waste biomass. In some embodiments, about 70% to about 100% (e.g., about 70%, about 72%, about 74%, about 76%, about 78%, about 80%, about 82%, about 84%, about 86%, about 88%, about 90%, about 92%, about 94%, about 96%, about 98%, or about 99%) of the papermaking fibers are derived from waste biomass. In some embodiments, all of the papermaking fibers are derived from waste biomass (i.e., the packaging material is free of any wood-derived papermaking fiber).

The papermaking fibers can be derived from the waste biomass via any suitable pulping method that can breakdown the waste biomass feedstock to provide discrete fibers that can be dispersed in an aqueous solution. In particular, the core fibers of hemp hurds and other hemp waste can be relatively easy to penetrate because of the fineness of the raw materials, which can make it possible to pulp using a variety of methods [30]. In some embodiments, the pulping method is selected to provide papermaking fibers in an desired yield and/or to provide papermaking fibers having one or more desirable properties, e.g., a desirable lignin content, length, freeness, brightness, kappa number, etc. In some embodiments, the pulping is performed by a chemical pulping method, such as kraft, sulfite, soda or carbonate pulping. Kraft and soda pulping, for example, are the predominant methods for generating fibers with low lignin content suitable for paper products [13]. Kraft pulping, which makes up about 80% of pulping in the papermaking industry, comprises digestion of cellulosic or lignocellulosic feedstocks in an aqueous dispersion comprising sodium hydroxide and sodium sulfide, typically at an elevated temperature and/or pressure [14]. Carbonate ($Na_2CO_3$) and soda (NaOH, KOH or $Ca(OH)_2$) pulping can be performed at ambient temperature (e.g., about 18° C. to about 25° C.) or at an elevated temperature [15, 16, 17]. When performed at an elevated temperature, the pulping time can be reduced. In addition, autohydrolysis, which employs a chemical-free or substantially chemical-free hot water treatment, can be employed. In some embodiments, autohydrolysis can be performed under basic conditions (e.g., to remove pectin). In some embodiments, the pulping can be performed using enzymes (e.g., cellulase). With the exception of kraft pulping, these pulping techniques offer reduced or no emission of sulfur dioxide and odorous gases due to the use of sulfur free chemicals.

Thus, in some embodiments, the papermaking fibers comprise kraft fibers, soda fibers (also referred to herein as "alkali fibers") and/or autohydrolyzed fibers. In some embodiments, the papermaking fibers of the sheet or web comprise fibers are all produced by the same pulping method. However, as the pulping method can impart different properties in the papermaking fibers, even among fibers derived from the same feedstock, in some embodiments, the papermaking fibers comprise a mixture of fibers produced by more than one type of pulping method (e.g., a combination of kraft fibers and alkali/soda fibers or a combination of kraft fibers and autohydrolyzed fibers).

In some embodiments, the kraft or soda pulping of the waste biomass can be performed using a reduced amount of chemicals compared to that typically used in the papermaking industry, resulting in papermaking fibers that are relatively more sustainable and/or environmentally friendly. For example, in some embodiments, the kraft fibers are pulped using a pulping/cooking mixture comprises less than the usual 18% active alkali. In some embodiments, the kraft fibers are pulped using a pulping/cooking mixture comprising about 12% active alkali. In some embodiments, the alkali/soda pulping comprises a pulping/cooking mixture comprising about 8% alkali metal hydroxide (e.g., about 8% NaOH).

Depending, for example, on the desired end use of the packaging material, in some embodiments, at least a portion of the papermaking fibers are bleached and/or refined fibers. As with pulping, in some embodiments, the bleaching can be performed using less than the typical amount of chemicals currently used in the papermaking industry. In some embodiments, the bleaching can be performed using an ECF process involving three steps instead of the more typical five steps or using peroxide only. In some embodiments, the peroxide only bleaching results in a more naturally colored pulp, which can result in a more naturally colored packaging product. In some embodiments, the papermaking fibers can be bleached to provide a brighter appearance and/or an appearance more similar to bleached wood-based paper. In some embodiments, the papermaking fibers have an International Organization of Standardization (ISO) brightness of at least about 80 (e.g., at least 80, 81, 82, 83, 84, or about 85). In some embodiments, the papermaking fibers have an ISO brightness of about 80 to about 85.

In some embodiments, the papermaking fibers have an average length of about 1.2 nm or less. In some embodiments, the papermaking fibers are hemp hurds fibers having an average length of less than about 1.2 nm. In some embodiments, the papermaking fibers (e.g., the pulped and optionally bleached and/or refined fibers) have an average length of about 0.35 nm to about 1.2 nm. In some embodiments, the papermaking fibers have an average length of about 0.35 nm to about 0.70 nm (e.g., about 0.35, 0.40, 0.45, 0.50, 0.55, 0.60, 0.65, or about 0.70 nm). In some embodiments, the refining can be performed to target a particular desired size of papermaking fiber. The refining intensity can be measured using a freeness tester (e.g., targeting a certain freeness number according to the Canadian Standard Method (CSF) test). In some embodiments, refining is targeted to provide papermaking fibers with a Canadian Standard Freeness (CSFreeness) of about 100 mL to about 450 mL. In some embodiments, the papermaking fibers have a CSFreeness of about 200 mL to about 400 mL. In some embodiments, the papermaking fibers have a CSFreeness of about 300 mL to about 350 mL.

In some embodiments, at least about 70% of the papermaking fibers in the sheet or web (based on the total dry weight of the papermaking fibers in the sheet or web) are hemp hurds fibers. In some embodiments, 70% to about 99% of the papermaking fibers (e.g., about 70%, about 75%, about 80%, about 85%, about 90%, about 95%, about 96%, about 97%, about 98%, or about 99% of the papermaking fibers) are hemp hurds fibers. In some embodiments, 100% of the papermaking fibers are hemp hurds fibers. In some embodiments, the hemp hurds fibers are kraft fibers. The remaining papermaking fibers can be from another waste biomass feedstock or feedstocks, from a softwood, from a hardwood or from a combination thereof. In some embodiments, up to about 30% (e.g., about 1%, 2%, 3%, 4%, 5%, 7.5%, 10%, 12.5%, 15%, 17.5%, 20%, 22.5%, 25%, 27.5%, or about 30%) of the papermaking fibers are CPH fibers (e.g., kraft CPH fibers) and/or fibers pulped from a mixture of hemp hurds and hemp bast (e.g., kraft hemp mix fibers) or fibers pulped from hemp whole stalk. In some embodiments, up to about 30% of the papermaking fibers (e.g., about 1%, 2%, 3%, 4%, 5%, 7.5%, 10%, 12.5%, 15%, 17.5%, 20%, 22.5%, 25%, 27.5%, or about 30%) are wood fibers (e.g., hardwood fibers, softwood fibers or a combination thereof). In some embodiments, up to about 30% of the papermaking fibers are softwood fibers (e.g., kraft softwood fibers).

In some embodiments, the sheet or web (e.g., the base sheet) further comprises one or more additives, e.g., one or more additives known in the papermaking field, such as, but not limited to sizing agents, binders, fillers, wet and/or dry strength agents, retention and drainage aids, optical brighteners (e.g., stilbenes or other fluorescent compounds), plasticizers, cross-linking agents, surface sizing agents, biocides and dyes or other colorants. Sizing agents, for example, can include AKD, rosins and rosin derivatives, and alkenyl succinic anhydride. Binders include, but are not limited to, carboxymethyl cellulose (CMC) or a derivative thereof, cationic and anionic hydroxyethyl cellulose (EHEC), modified starch, dextrin, and styrene copolymers such as styrene maleic anhydride copolymer and styrene-acrylate copolymer. Fillers typically used in papermaking include, but are not limited to, calcium carbonate, titanium dioxide, dolomite, clay, and talc. Strength agents include, for example, starches, such as oxidized starch, ethylated starch, enzymatically treated starch, and cationic starches (e.g., starch modified with a quaternary ammonium cation, such as 2,3-epoxypropyl trimethyl ammonium chloride or 3-chloro-2hydroxypropyl trimethyl ammonium chloride), sodium alginate, gaur gum, proteins, soy lecithin proteins, dextrin, and polyacrylamide. Retention and drainage aids include, but are not limited to, calcium carbonate and polyethylenimine. Cross-linking agents include, but are not limited to, polycarboxylic acids, such as acrylic, maleic, polymaleic, succinic, polyitaconic and citric acids. Plasticizing agents include bio-based plasticizers (e.g., citrate esters such as triethyl citrate (TEC), acetyl triethyl citrate (ATEC), acetyl triethyl citrate (ATEC), tributyl citrate (TBC), acetyl tributyl citrate (ATBC), trioctyl citrate (TOC), butyryl trihexyl citrate (BTHC), trihexyl o-butyryl citrate and trimethyl citrate (TMC)), dicarboxylic/tricarboxylic ester-based plasticizers, adipates-based plasticizers, sebacates-based plasticizers, and/or maleates-based plasticizers, as well as glycerol, glycerol triacetate, tributyl citrate, polyethylene glycol, and the like. Representative amounts for such additives can be in the range of about 0.5% by weight to about 30% by weight of the sheet or web, for example. In some embodiments, the additive can used at about 1% by weight to about 10% weight (e.g., about 1%, 2%, 3%, 4%, 5%, 6%, 7%, 8%, 9%, or about 10% by weight) or about 1% to about 5% by weight.

In some embodiments, the sheet or web comprises one or more of a sizing agent, a strength agent, a binder, a plasticizer and a cross-linking agent. In some embodiments, the sizing agent is AKD. In some embodiments, the strength agent is a starch. In some embodiments, the starch is a cationic starch. In some embodiments, the binder is CMC. In some embodiments, the crosslinking agent is citric acid. In some embodiments, the one or more additives comprise citric acid-crosslinked CMC (CA-CMC). In some embodiments, the plasticizer is a citrate ester. In some embodiments, the citrate ester is a trialkyl citrate. In some embodiments, the trialkyl citrate is TEC. Accordingly, in some embodiments, the sheet or web comprises one or more additives selected from the group comprising a starch, a polycarboxylic acid, a dicarboxylic acid, a cellulose, alkyl ketene dimer, and a citrate ester. In some embodiments, the one or more additives are selected from a cationic starch, CA, CMC, AKD, and TEC. In some embodiments, the CA and CMC form a CA-crosslinked CMC.

In some embodiments, the sheet or web (e.g., base sheet) has an air resistance of at least about 100 Gurley seconds (Gs, i.e., the number of seconds for 100 cubic centimeters (cc) of air to pass through 1 square inch of material at 0.176 pounds per square inch pressure (psi)). In some embodiments, the sheet or web has an air resistance of at least about 200 Gs. In some embodiments, the sheet or web has an air resistance of about 500 Gs to about 3200 Gs (e.g., about 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, or about 3200 Gs).

In some embodiments, the sheet or web (e.g., the base sheet) has a tensile index of about 25 N·m/g to about 200 N·m/g (e.g., about 70, 75, 80, 85, 90, 95, 100, 105, or about 110 N·m/g). In some embodiments, the paper sheet or web (e.g., the base sheet) has a burst index of about 1 kPa·m$^2$/g to about 12 kP·m$^2$/g (e.g., about 3.0, 3.5, 4.0, 4.5, 5.0, 5.5, or about 6.0 kP·m$^2$/g).

In some embodiments, the sheet or web (e.g., the base sheet) can be coated with one or more coating material. The coating can be added to improve control of water and water vapor transmission, oil and grease resistance/absorption, and/or air transmission. Coatings can also be used to add antimicrobial properties to the food packaging material. In some embodiments, the coating material(s) can be bio-based, e.g., micro- and/or nano-fibrillated cellulose or chitosan. In some embodiments, the food packaging material can include a stack or lamination comprising two or more layers of the sheet or web.

The food packaging material can be provided in any desirable form, for example, as a sheet (e.g., butcher paper) to wrap food items or as a bag or other container for food, e.g., a box, a carton, a tray, a plate, a bowl, a cup, a lid for a cup or other container, a take-out container, a clamshell container. In some embodiments, the food packaging material can be a packaging material for food for humans. In some embodiments, the food packaging material can be used as a flexible flow wrap for confectionery products such as, but not limited to, chocolate candy bars, gums, fruity confections, and sugar-coated candies. In some embodiments, the food packaging material can be a packaging material for food for pets or other animals (e.g., in farms or zoos). In some embodiments, the food packaging material can be used to provide at least one component of a food packaging item also including one or more additional materials (e.g., a plastic or metal foil component).

IV. Methods of Preparing Food Packaging Material

In some embodiments, the presently disclosed subject matter provides a method of making paper, e.g., a paper-based packaging material, using waste biomass-derived papermaking fibers. In some embodiments, the paper is a paper-based packaging material is suitable for use in packaging food. Thus, in some embodiments, the method relates to providing a food packaging paper material.

In some embodiments, the method comprises: (a) pulping waste biomass to provide waste biomass-derived papermaking fibers; (b) preparing a slurry comprising the waste biomass-derived papermaking fibers; and (c) forming a sheet or paper web of papermaking fibers from the slurry. In some embodiments, the sheet or web has a basis weight of at least about 40 g/m$^2$. In some embodiments, the sheet or web has an air resistance of at least about 100 Gs. In some embodiments, the waste biomass is selected from the group comprising hemp hurds, mixtures of hemp hurds and hemp bast, cocoa pod husks, bagasse, and combinations thereof.

Raw materials classification through screening and removal of over size, over thick and under size chips from accepts can be useful in obtaining a better yield and a more uniform pulp. Raw materials screening can also optimize the usage and interaction with cooking chemicals, resulting in a higher quality fiber. Accordingly, in some embodiments, the waste biomass is classified according to size and/or thickness prior to pulping. Classification can be performed via mechanical screening. In some embodiments, the classification is performed to select raw waste biomass having a particle size of at least about 0.85 mm and less than about 7 mm. In some embodiments, the raw biomass is classified to have a particle size of about 3 mm to about 4 mm. If needed, the raw feedstock can also be reduced in size using a mechanical process, e.g., grinding, chopping, shredding, etc. prior to pulping or prior to screening/classification.

In some embodiments, pulping is performed via kraft pulping, soda/alkali pulping, via autohydrolysis, or via enzymatic treatment. In some embodiments, for kraft pulping, the raw biomass can be pulped in a pulping/cooking solution comprising less than about 18% active alkali. In some embodiments, the kraft pulping is performed using about 12% active alkali to achieve about 25% sulfidity (25% $Na_2S$ and 75% NaOH based on $Na_2O$). The pH of the kraft pulping solution can be between about 11 and about 13. In some embodiments, for soda/alkali pulping, pulping can be performed using about 8% alkali metal hydroxide (e.g., about 8% NaOH). The pH of the soda/alkali pulping/cooking solution can be between about 12 and about 13. In some embodiments, autohydrolysis (e.g., autohydrolysis of hemp hurds) can be performed at higher than neutral pH (e.g., at a pH between about 10 and about 11) to reduce pectin content and/or pulp stickiness.

In some embodiments, the pulping (e.g., the kraft pulping, alkali pulping, or autohydrolysis) is performed at about 160° C. In some embodiments, pulping is performed for about 3 hours. In some embodiments, pulping is performed for about 120 to 170° C. For pulping of hemp hurds or mixtures of hemp hurds and hemp bast, the pulping solution can have a water to solids ratio of about 8:1 or 6:1. For pulping of cocoa pod husks, the water to solids ration can be about 6:1 or 4:1.

After pulping, the pulp can be filtered and washed with water e.g., to remove pulping chemicals. If desired, after pulping and prior to preparing the slurry, the pulp can be refined using one or more suitable refining method or instrument, such as, but not limited to, a disintegrator, a disc refiner, and ac valley beater. After refining, the pulp can be screened, e.g., to classify the pulp by size and/or to remove fines or oversize fibers. In some embodiments, the refining is performed to target a CSFreeness of about 200 to about 450 mL. After refining, the fibers can be passed through a vibrating screen or sieved, which removes larger debris, but allows the desired size fibers to pass through the screen.

In some embodiments, prior to preparing the slurry (e.g., after pulping but before refining), the pulp can be bleached. In some embodiments, the bleaching is performed using an ECF process or a chlorine free process (e.g., using only peroxide). In some embodiments, the bleaching is performed using a three-step ECF bleaching process, wherein the first step of the ECF bleaching comprises contacting the waste biomass-derived papermaking fibers with chloride dioxide, the second step of the ECF bleaching comprises contacting the waste biomass-derived papermaking fibers with hydrogen peroxide and hydroxide, and the third step of the ECF bleaching comprises contacting the waste biomass-derived paper making fibers with chloride dioxide. In some embodiments, all three steps are performed at about 70° C. In some embodiments, one or both of the first and the second steps are performed for about 1 hour. In some embodiments, the second step is performed for about 3 hours. In some embodiments, the total $ClO_2$ charge used in the process can be about 7% to about 9% with a Kappa Factor of about 0.23. For bagasse, the total $ClO_2$ charge can be lower (e.g., about 2% to about 2.5%) with a Kappa Factor of about 0.24. In some embodiments, the $ClO_2$ charge can be split with about 98.75% used in the first step and 1.25% used in the third step. In some embodiments, the second step can involve about 1% hydrogen peroxide and about 4.6% sodium hydroxide.

In some embodiments, the slurry is prepared from papermaking fibers wherein at least about 70% of the papermaking fibers (based on the total dry weight of the papermaking fibers used to prepare the slurry) are hemp hurds fibers. The hemp hurds fibers can be kraft fibers, alkali/soda fibers, autohydrolyzed fibers, or mixtures thereof. In some embodiments, at least about 70% of the papermaking fibers are kraft hemp hurds fibers. In some embodiments, at least about 80%, at least about 90% or at least about 95% of the papermaking fibers are kraft hemp hurds fibers. In some embodiments, about 96%, about 97%, about 98%, or about 99%, of the papermaking fibers are hemp hurds fibers (e.g., kraft hemp hurds fibers). In some embodiments, the hemp hurds fibers are bleached fibers (e.g., ECF bleached fibers). In some embodiments, all of the papermaking fibers are hemp hurds fibers.

In some embodiments, the slurry further comprises cocoa pod husk fibers, softwood fibers, hardwood fibers, bagasse fibers, or fibers pulped from a mix of hemp hurds and hemp bast. In some embodiments, the slurry comprises up to about 5%, up to about 10%, up to about 15%, up to about 20%, up to about 25%, or up to about 30% of one or more of cocoa pod husk fibers, softwood fibers, hardwood fibers, bagasse fibers, or fibers pulped from a mix of hemp hurds and hemp bast. In some embodiments, the cocoa pod husk fibers, softwood fibers, hardwood fibers, bagasse fibers, or fibers for the mix of hemp hurds and hemp bast are kraft pulped fibers. In some embodiments, these fibers are ECF bleached fibers. In some embodiments, all of the papermaking fibers are derived from a waste biomass, i.e., hemp hurds, hemp mix, cocoa pod husks, bagasse, or mixtures of such fibers.

In some embodiments, one or more additives can be added to the slurry. In some embodiments, the one or more additives can be selected from the group comprising sizing agents, binders, fillers, wet and/or dry strength agents, retention and drainage aids, optical brighteners, plasticizers, cross-linking agents, biocides, and dyes or other colorants. Suitable additives include those discussed hereinabove. In some embodiments, the one or more additives are selected from one or more of a sizing agent, a strength agent, a binder, a plasticizer and a cross-linking agent. In some embodiments, the one or more additives are selected from the group comprising a starch, a cellulose, AKD, a dicarboxylic acid, and a citrate ester. In some embodiments, the one or more additives are selected from a cationic starch, CA, CMC, AKD, and TEC. In some embodiments, the CA and CMC form a CA-crosslinked CMC. Representative amounts for the additives can be in the range of about 0.5% by weight to about 30% by weight of the web, for example. In some embodiments, the additive can used at about 1% by weight to about 10% weight (e.g., about 1%, 2%, 3%, 4%, 5%, 6%, 7%, 8%, 9%, or about 10% by weight) or about 1% to about 5% by weight.

In some embodiments, forming a sheet or web of papermaking fibers (i.e., step (c)) is performed using a Fourdrinier paper machine. The sheet or web can be formed or prepared with or without a surface sizing. In some embodiments, the method comprises a calendering step. In some embodiments, the method further comprises forming a packaging material (e.g., a food packaging material). In some embodiments, the method further comprises converting or configuring the sheet or web for use as a packaging material (e.g., a food packaging material).

In some embodiments, the sheet or web forms a substantially planar sheet and step (c) comprises forming a sheet comprising a paper web of the biomass-derived papermaking fibers. In some embodiments, the web (e.g., the sheet) has a basis weight of about 40 g/m$^2$ to about 300 g/m$^2$ (e.g., about 40, 50, 60, 70, 80, 90, 100, 110, 120, 130, 140, 150, 160, 170, 180, 190, 200, 210, 220, 230, 240, 250, 260, 270, 280, 290, or about 300 g/m$^2$). In some embodiments, the web has a basis weight of about 60 g/m$^2$ to about 200 g/m$^2$. In some embodiments, the web has a basis weight of about 60 g/m$^2$. In some embodiments, the sheet or web (e.g., sheet) is pressed (e.g., at about 345 kPa) one or more times. In some embodiments, the sheet or web is dried.

In some embodiments, step (c) comprises forming a sheet or web that is non-planar, e.g., to form a bowl-shaped item. In some embodiments, step (c) comprises forming a substantially planar sheet, pressing the sheet and then molding or stamping the sheet to form a desired shape before drying or after re-wetting the sheet. In some embodiments, a substantially planar sheet of the paper sheet web can be used to form a desired packaging material after drying, e.g., by forming a bag from the sheet or web. Thus, the food packaging paper material can take on a variety of shapes.

In some embodiments, step (c) further comprises coating the formed paper web with one or more coating materials, e.g., to improve control of water and water vapor transmission, oil and grease absorption, and/or air transmission. Coatings can also be used to add antimicrobial properties to the food packaging material. In some embodiments, the coating material(s) can be bio-based, e.g., micro- and/or nano-fibrillated cellulose or chitosan. In some embodiments, step (c) further comprises printing the food packaging paper material.

In some embodiments, the method further comprises packing a food item (a food item for human or animal consumption) with the food packaging paper material.

In some embodiments, the method comprises converting the formed paper web into a flexible flow wrap for confectionery products such as, but not limited to, chocolate candy bars, gums, fruity confections, sugar coated candies, etc.

The converting process can include one or more techniques known in the packaging and/or paper field, including, but not limited to, calendaring, coating, printing, embossing, slitting, sheeting, folding, creasing, wrapping, gluing (sealing), laminating, and the like. Several methods are known for all mentioned converting techniques. For example, in some embodiments, calendering can include supercalender, hardnip calender or hotsoft nip calender. In some embodiments, coating operations can include petro- and/or bio-based polymers coating applications on the paper web using, for instance, a blade coater, a rod coater, a curtain coater, an air knife coater, etc. In some embodiments, coating operations can include aqueous or extrusion coating. In some embodiments, the printing methods can include, but is not limited to, flexography, rotogravure, offset lithography, inkjet, or electrophotographic printing, etc. In some embodiments, the sealing operations can encompass use of cold seal or heat-sealing agents. In some embodiments, the wrapping operation can comprise use of a horizontal form fill seal machine (HFFS) or a vertical form fill seal machine (VFFS), depending on the wrapping needs.

Packaging materials of the presently disclosed subject matter can have the same or similar look and/or feel as packaging materials prepared from conventional packaging materials and/or wood-based paper packaging materials.

In some embodiments, the presently disclosed subject matter provides a method of preparing papermaking fibers from waste biomass (e.g., hemp hurds, mixture of hemp hurds and hemp bast, bagasse, or CPH). In some embodiments, the method comprises pulping the biomass. In some embodiments, the biomass is classified or screened by size prior to pulping, e.g., to provide a higher yield from the pulping. In some embodiments, the pulping is performed using reduced amounts of chemicals compared to conventional pulping (e.g., conventional kraft pulping) or using no chemicals. In some embodiments, the method further comprises bleaching the pulped fibers. In some embodiments, the method comprises refining the pulped fibers.

EXAMPLES

The following Examples are included to further illustrate various embodiments of the presently disclosed subject matter. However, those of ordinary skill in the art should, in light of the present disclosure, appreciate that many changes can be made in the specific embodiments which are disclosed and still obtain a like or similar result without departing from the spirit and scope of the presently disclosed subject matter.

Example 1

Fiber Preparation

Figure 1B:
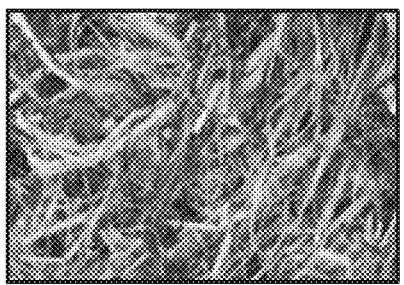
Figure 1C:
Figure 1D:

Materials:

Hemp hurds and hemp mix (bast fibers and hurds) were procured from North Carolina, United States of America, and the Netherlands. See FIGS. 1A and 1B. Cocoa pod husks (small and large chunks) were obtained from South America. See FIGS. 1C and 1D. All chemicals used in pulping (10% NaOH and ~1.0M Na$_2$S) and bleaching (18.0% NaOH and 1.0-3.0% H$_2$O$_2$) were purchased from Thermo Fisher Scientific (Waltham, Massachusetts, United States of America) or prepared in-house preparation (5.8-10.6 gpl ClO$_2$) and used as it is.

Figure 2:
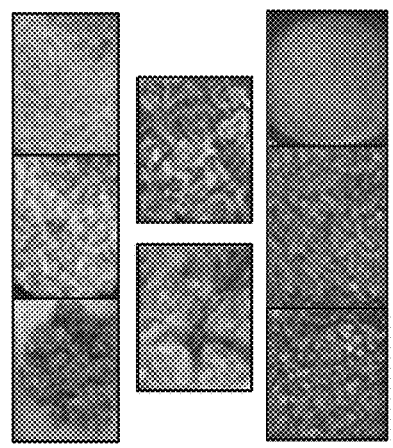
FIG. 2 is a schematic diagram with photographic image inserts showing agriculture residue classification according to size using mechanical screening processes to enhance pulp quality, yield and other properties.
Figure 2:
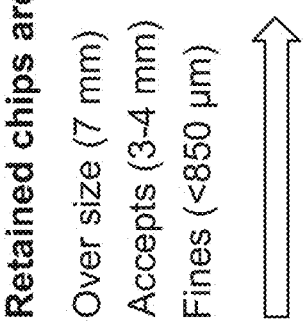
Figure 2:
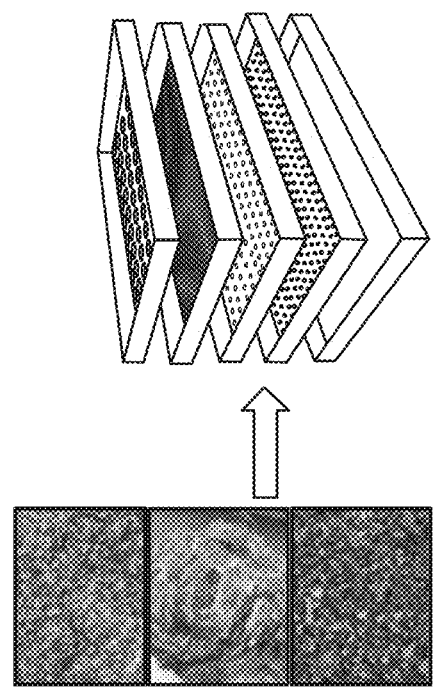

Raw Material Processing:

The hemp hurds and hemp mix raw materials were further processed and classified based on the chips size and thickness. Digestion of different size raw materials causes non-uniform cooking and/or can use more chemicals because oversize raw materials remains uncooked while undersize raw materials get overcooked. Uncooked and overcooked raw materials can affect pulp yield and the quality of the fibers. A laboratory screener was used to classify raw materials according to the sizes and thickness. The screened raw materials were classified as oversize (7 mm long), accepts (3-4 mm) and fines (<1 mm) (see FIG. 2) and digested separately to maintain a uniform digestion and minimum usages of chemicals. The chemical composition of the raw materials, ash content and moisture level was determined according to the guidance of U.S. Department of Energy, National Renewable Energy Laboratory (NREL) analytical procedure TP-510-42618 or the ASTM E1758-01 (2015), ASTM E1690-08 (2016) and TAPPI T 550 om-08 respectively. See Table 1, below. Pectin and hemicellulose content were calculated by subtracting the sum of the cellulose, lignin extractives and ash contents from 100 [14]. For simplicity, the following sample abbreviations are used herein: HH-US (hemp hurds, US), HH-NL (hemp hurds, Netherlands) HM-US (hemp mix, US), CPH-S/L (cocoa pod husk, small/large chunks), AH (autohydrolysis), AL (alkali/soda pulping), HK (kraft pulping), AHP/ALP (peroxide bleaching), AHC/HKC (conventional bleaching).

TABLE 1

Raw material properties and compositions.

| | Properties | HH-US | HH-NL | HM-US | CPH |
|---|---|---|---|---|---|
| | Moisture content (%) | 10.1 | 11.4 | 17.3 | 10.2 |
| | Avg. length (cm) | 1.43 | 1.10 | Bast fiber: 15.14 Hurds: 1.43 | 1.85 |
| | Avg. width (cm) | 0.01 | 0.18 | Long fiber: 0.016 Short fiber: 0.010 | 0.37 |
| | Ash content (%) | 1.1 | 1.4 | 1.5 | 1.2 |
| Compositional Analysis (%) | Cellulose (%) | 43.1 | 43.0 | | 19.0 |
| | Hemicellulose and pectin (%) | 27.0 | 26.9 | | 48.0 |
| | Extractive (%) | 3.9 | 3.7 | | 4.0 |
| | Lignin (%) | 24.9 | 25.0 | | 28.0 |

Figure 3:
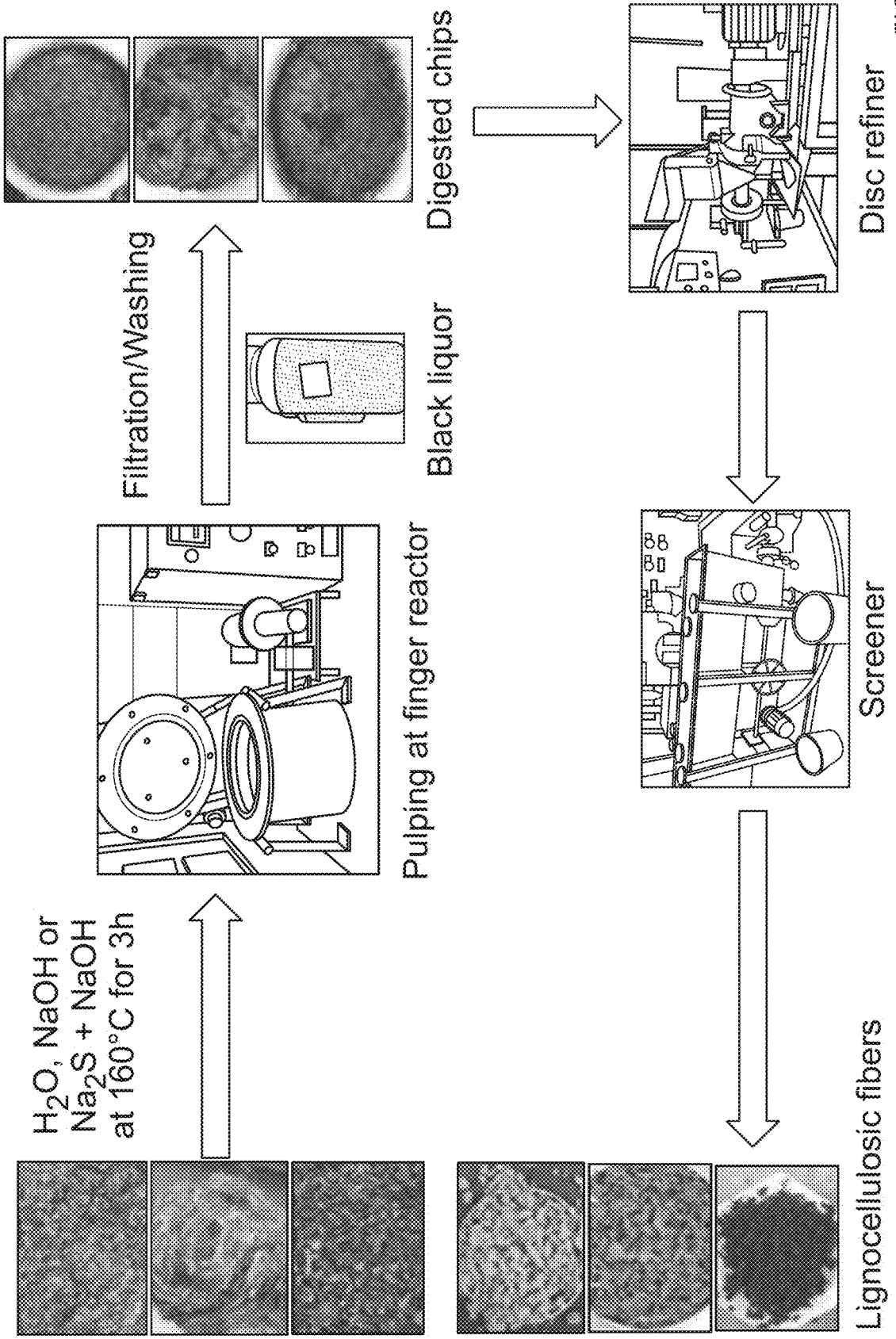
FIG. 3 is a schematic diagram with photographic image inserts showing fiber development from hemp hurds, hemp mix, and cocoa pod husks (top left) using high kappa kraft, soda and autohydrolysis pulping and subsequent processing of the pulped/digested fibers via filtration and washing, refining (e.g. using a disc refiner) and screening.

Defibration/Pulping:

Defibration highlighting the features of autohydrolysis, alkali defibration and mild kraft defibration are shown in FIG. 3. The defibration process conditions are shown in Table 2, below. During defibration by autohydrolysis, alkali or mild kraft pulping, a higher water to solid ratio of 8:1 was used for hemp (hurds and mix) due to its low bulk density compare to hardwood and lower water to solid ratio of 4:1 was used for CPH due to its high bulk density. The autohydrolysis, alkali and mild kraft defibration were conducted using hot water, 8% of NaOH (based on $Na_2O$) and 12% active alkali to achieve 25% of sulfidity ($NaOH+Na_2S$ based on $Na_2O$) respectively. All the defibration reaction was carried out in a stainless-steel reactor under controlled temperature of 160° C. for 3 h with a target H-factor of 1200. The digested raw materials were washed out with tap water and refined using a laboratory disintegrator and disc refiner (The Bauer Bros Co., Springfield, Ohio, United States of America, Model 148-2, rpm 3600) using a disc gap of 0.2 mm and 0.1 mm with two passes for hemp (HH and HM) and one pass at 0.1 mm for CPH. The refined pulp was then passed through a 0.15 mm slotted laboratory screener to separate rejects from pulp. The pulp yield, kappa number, freeness, brightness and fiber quality analysis (FQA) were determined according to the procedures of TAPPI T222, TAPPI T236 om-99 (2006), TAPPI T227 om-99 (1999), ISO and TAPPI T 271 respectively. Results are shown in Table 3, below.

TABLE 2

Different defibration/pulping processes and its conditions.

| Process | Feedstock | pH | Water to solid ratio | Pulping chemicals |
|---|---|---|---|---|
| Autohydrolysis | HH | 7.03 | 8:1 | $H_2O$ only |
| Alkali pulping | HH | 12.7 | 8:1 | 8% of NaOH based on $Na_2O$ |
| | CPH | 12.3 | 4:1 | |
| Kraft pulping | HH & HM | 11.7-12.6 | 8:1 | 12% active alkali (25% $Na_2S$ and 75% NaOH based on $Na_2O$) |

TABLE 3

Unbleached pulp properties generated by autohydrolysis, alkali and kraft pulping processes.

| Sample ID | Kappa number | CSFreeness (mL) | Brightness |
|---|---|---|---|
| AH-HH-NL | 133.6 | 673.0 | 12.7 |
| AL-HH-NL | 115.5 | 695.0 | 20.2 |

TABLE 3-continued

Unbleached pulp properties generated by autohydrolysis, alkali and kraft pulping processes.

| Sample ID | Kappa number | CSFreeness (mL) | Brightness |
|---|---|---|---|
| HK-HH-NL | 53.4 | 341.0 | 28.6 |
| HK-HH-US | 78.0 | 402.0 | 19.6 |
| HK-HM-US | 64.0 | 129.0 | 24.6 |
| HK-CPH | 164.0 | — | 5.0 |
| AL-CPH | 74.7 | 139.0 | 3.9 |

Figure 4:
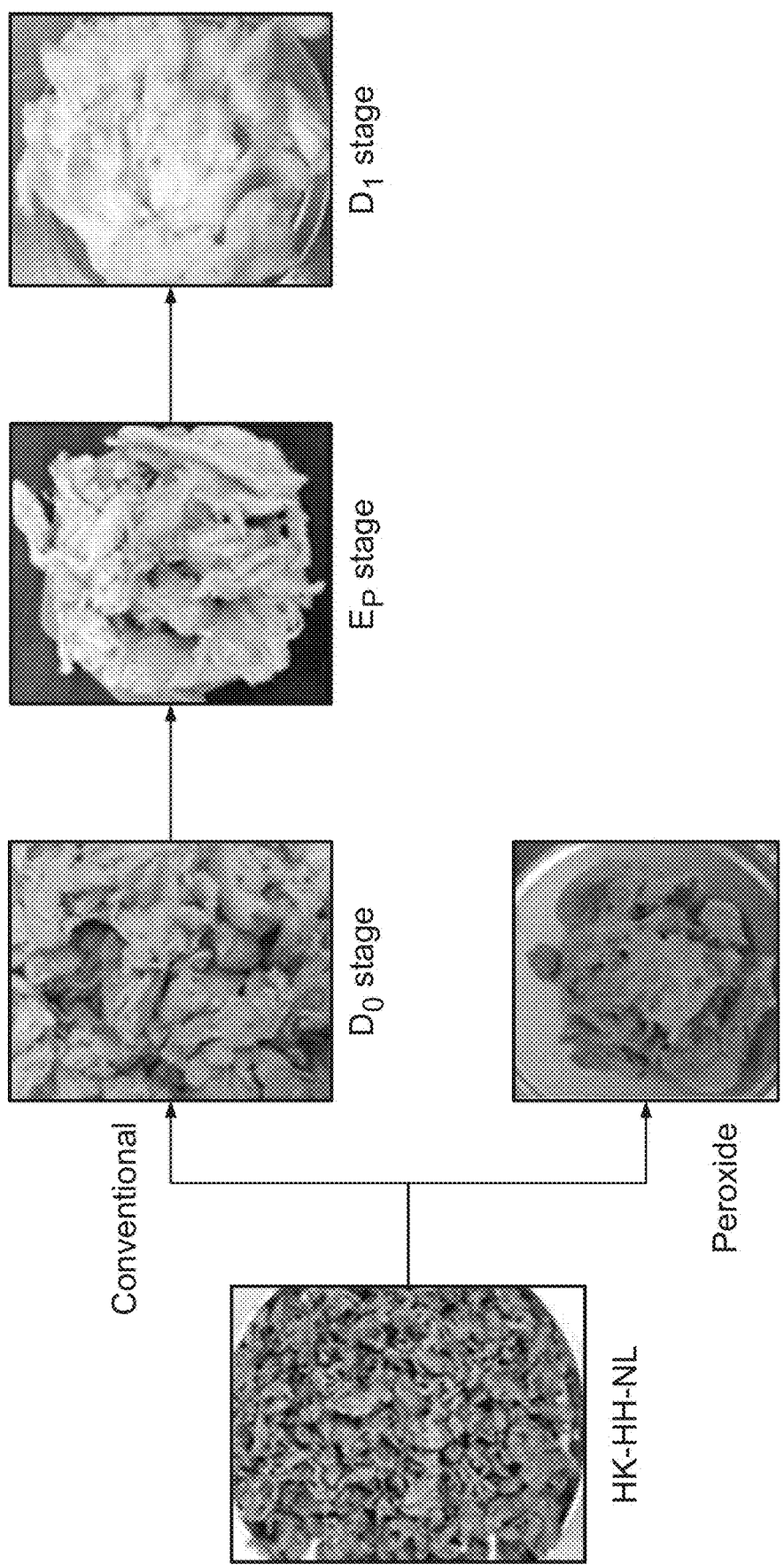
FIG. 4 is a schematic diagram with photographic images of fiber bleaching of kraft hemp hurd pulp from hemp hurds feedstock from the Netherlands (HK-HH-NL) according to methods of the presently disclosed subject matter including (top) a three-step version of a conventional elemental chlorine free (ECF) bleaching using an initial chloride dioxide step ($D_0$ stage), a hydrogen peroxide and sodium hydroxide step ($E_p$ stage) and a second chloride dioxide step ($D_1$ stage) or (bottom) peroxide (i.e., chlorine free) bleaching.

Pulp Brightening/Bleaching:

Bleaching is the treatment of pulp to increase brightness by removing lignin content of fiber. A sustainable bleaching method using peroxide ($H_2O_2$) only was performed to minimize the usage of harsh chemicals. As an alternative, an elemental chlorine free conventional bleaching method was also performed only using 12.0% less $ClO_2$ and 11.4% less NaOH in a three-step process instead of the typical five steps. The minimum utilization of chemicals in conventional bleaching gave a target brightness and quality fibers. See FIG. 4. The fibers properties were measured by determining pulp brightness, kappa number/P-value, surface charge analysis, FQA and degree of polymerization by using ISO brightness, TAPPI T236 om-13, T 237, T 271, and T 230-om-08, respectively. Results are shown in Table 4, below.

TABLE 4

A comparative studies of peroxide and conventional bleached pulp and their properties.

| Sample ID | Kappa number/P-value | CSFreeness (mL) | Brightness |
|---|---|---|---|
| AHP-HH-NL | 111.5 | 452.0 | 25.6 |
| HKC-HH-NL | 1.2 | 341.0 | 84.3 |
| HKC-HH-US | 3.0 | 402.0 | 80.3 |
| HKC-HM-US | 2.2 | 68.0 | 83.6 |
| HKC-CPH | 0.7 | — | 83.2 |
| HW | 2.5 | 349.0 | 84.2 |

Discussion:

Raw Materials Properties: The material properties and chemical compositions shown in the Table 1 indicate that there is a good amount of cellulose present in hemp hurds (both from United States and Netherlands sources) and hemp mix. The amount of cellulose in CPH is lower than in hemp, although CPH contains a good amount of phenolic and pectin compounds, which can be extracted and used for high value products. The average cellulose content in hemp biomass is lower than the hardwood which can ultimately result in lower pulp yields.

Figure 5:
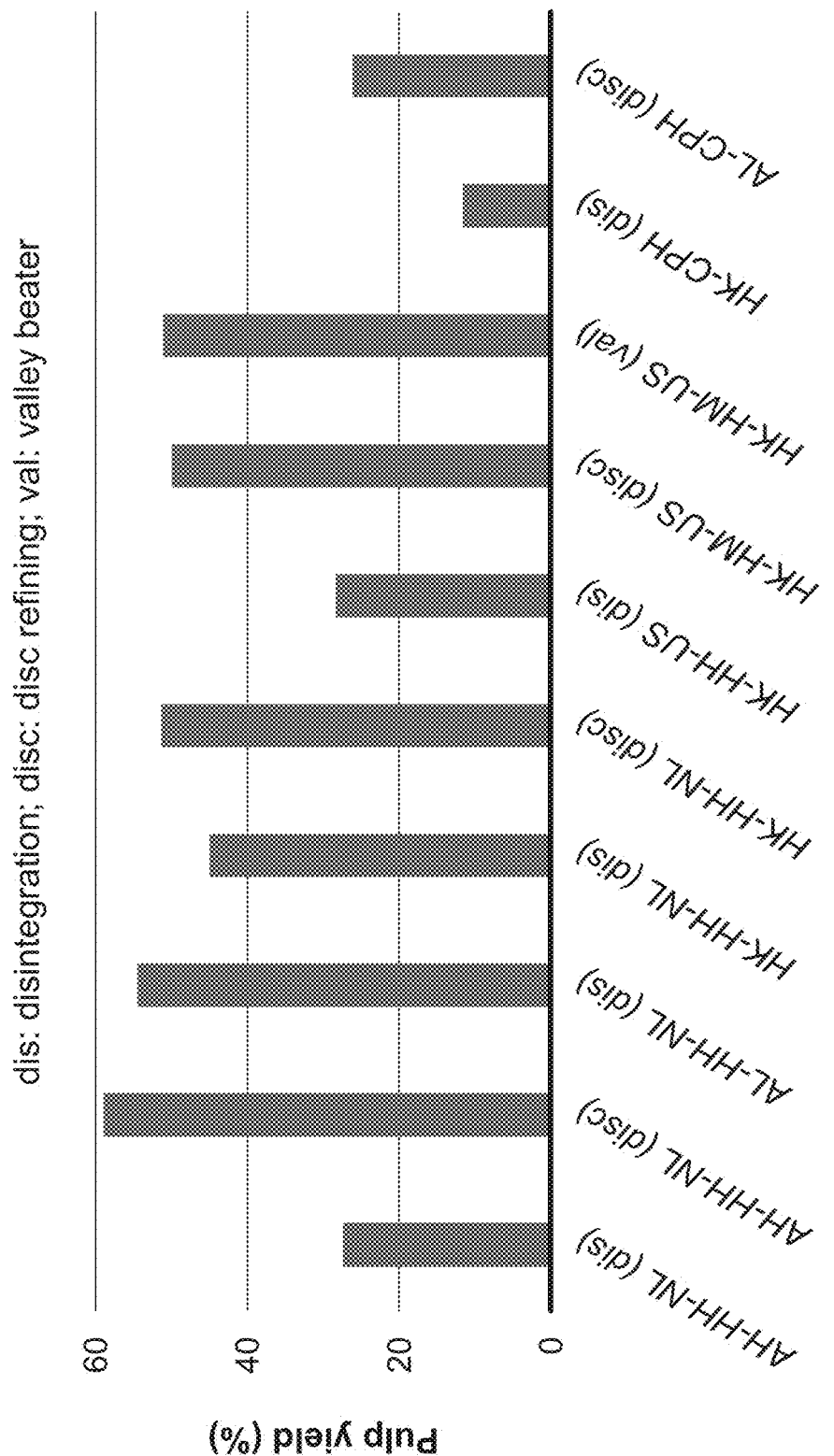
FIG. 5 is a graph showing the effect of pulping and refining processes on pulp yield (measured as a percentage (%) of theoretical yield). Autohydrolysis (AH) with disc refining (disc) gave the highest yield followed by alkali/soda (AL) and kraft pulping (HK). Cocoa pod husk feedstock (CPH) provide the lowest yield due to its low cellulose content. The other feedstocks included hemp hurds from the United States (HH-US) or the Netherlands (HH-NL) and hemp mix (HM). In addition to disc refining, refining processes included disintegration (dis) or use of a valley beater (val).

Pulp Yield and Properties: Pulp yield was calculated for screened pulp only and yield of screened pulp mainly depend on the pulping/defibration processes (autohydrolysis vs. alkali vs. kraft pulping). The pulp yields (total screened pulp wt %) are shown in FIG. 5. The screened pulp yield increased for digestion of a same size chips as it enhances the chance of a uniform cooking. Pulp yield can also depend on pulping processes. The highest yield was achieved for autohydrolysis, the second highest for alkali pulping, and the lowest for kraft pulping. For mild kraft pulping, a good amount of yield for hemp hurds and mix was achieved by using 12.0% active alkali instead of 18.0%, which is ~33.3% less chemicals than the conventional kraft pulping [20]. Pulp yields can also vary depending on refining process. Disc refining gave the highest percent yield for all types of pulp except hemp mix which gave a relatively higher yield for refining through a valley beater. Disc refining gave 12.3% more pulp than disintegration for the same pulping conditions for hemp hurds. It also generated fewer rejects and a moderate number of fines, while disintegration generated a large number of rejects and fines. The length of the fibers and percent of fines can have a direct correlation with freeness, which was measured by Canadian Standard Freeness (CSFreeness) value. The autohydrolyzed and alkali pulping gave a higher value of freeness and took less time to drain water while mild kappa kraft pulping gave relatively low freeness value and took more time to drain water. On the other hand, the hemp mix and cocoa pod husks gave significantly lower freeness values even for mild kappa kraft pulping. Without being bound to any one theory, this is believed to be the result of the sticky nature of CPH, while for hemp mix this is believed to be mainly due to the presence of long fibers which stuck in the pore and interrupt water drainage.

An ecofriendly and sustainable single step peroxide bleaching of the hemp hurds generated fibers with natural color for food packaging applications. See FIG. 4. An elemental chlorine free bleaching of hemp and CPH fibers using less chemicals than typical elemental chlorine free bleaching generated a target brightness of 84.3, 80.3 and 83.6 for hurds, mix and CPH, respectively, which is comparable to wood fibers. See Table 4, above. Bleached pulp had higher brightness but less freeness due to the generation of more fines.

Figure 6:
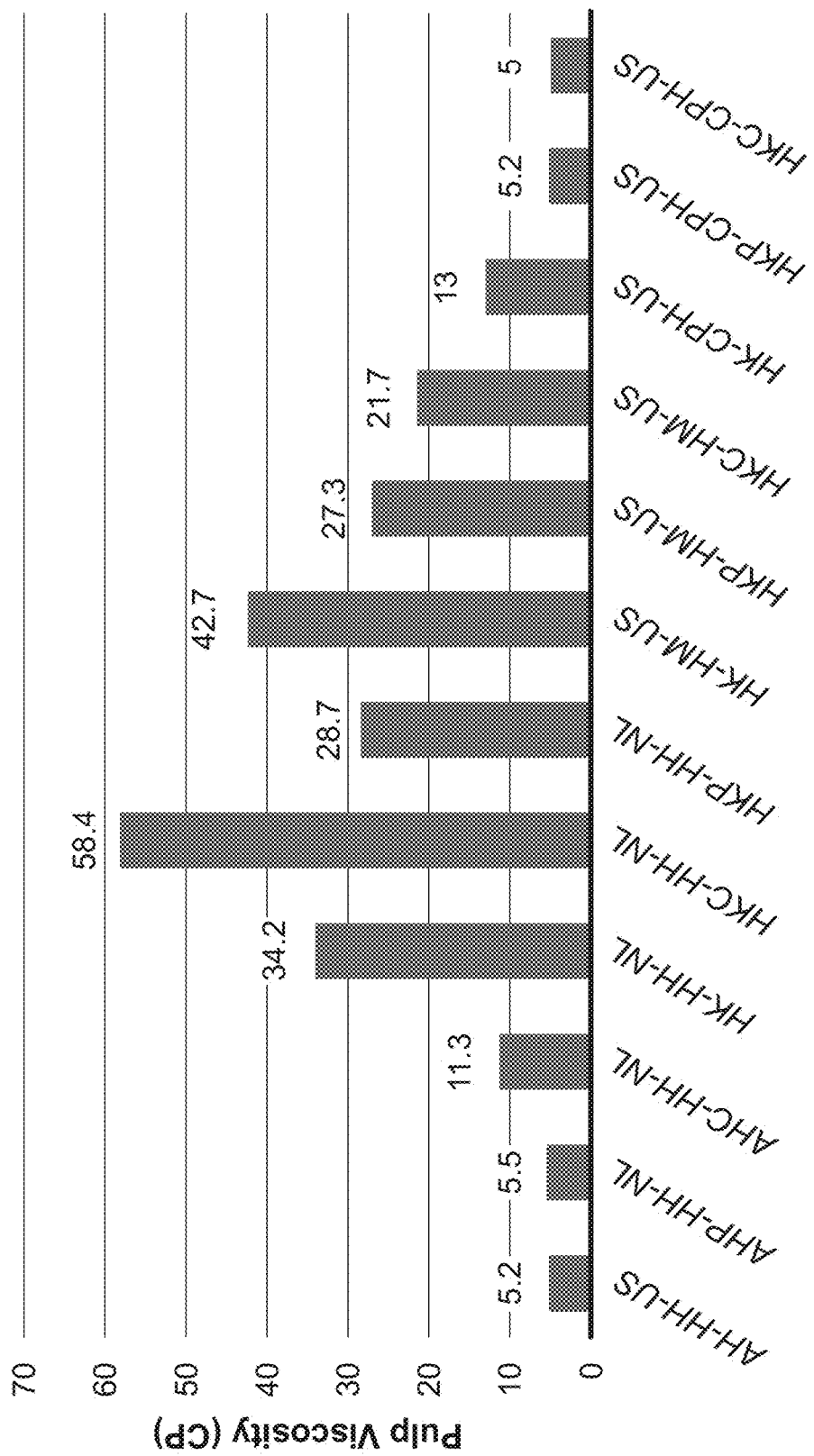
FIG. 6 is a graph showing the effect of pulping and refining processes on pulp viscosity (measured in centipoise (cP)). Kraft pulping (HK) with conventional (i.e., elemental chlorine free) bleaching (C) had the highest viscosity while autohydrolysis (AH) with peroxide bleached pulp (P) had the lowest viscosity. The feedstocks included hemp hurds from the United States (HH-US) or the Netherlands (HH-NL), hemp mix from the United States (HM), and cocoa pod husks from the United States (CHP-US).

The degree of polymerization (DP) in cellulosic fibers was measured indirectly by measuring the viscosity of unbleached and bleached pulp. Higher viscosity indicates a higher average DP in cellulosic fibers that in turn indicates stronger bonds in the pulp. FIG. 6 shows the DP of unbleached and bleached pulp prepared by autohydrolysis or mild kappa kraft pulping. Pulp prepared by conventional pulping and bleaching had the highest DP, while autohydrolysis and peroxide bleached pulp had the lowest DP. Without being bound to any one theory, this is believed to be due to breakdown of the cellulosic chain by hot water and highly oxidative hydrogen peroxide. Hemp hurds fiber bleached using conventional bleaching gave a higher DP while the same fiber bleached with peroxide bleached gave a lower DP. Hemp hurds had the highest DP followed by hemp mix and CPH, which had the lowest DP, likely due to the lower cellulose content compared to hemp. While pulping and bleaching chemicals can have little effect on cellulosic fibers, excessive utilization of harsh chemicals can degrade cellulose fibers.

On the other hand, surface charge is an important parameter for papermaking and plays a role through electronic interactions of charged soluble and particulate interactions [21]. Surface charge also affects the swelling ability of cellulose fibers and provides a driving force for adsorption of sizing agents, retention aids and strength enhancing agents [22,23].

Figure 7:
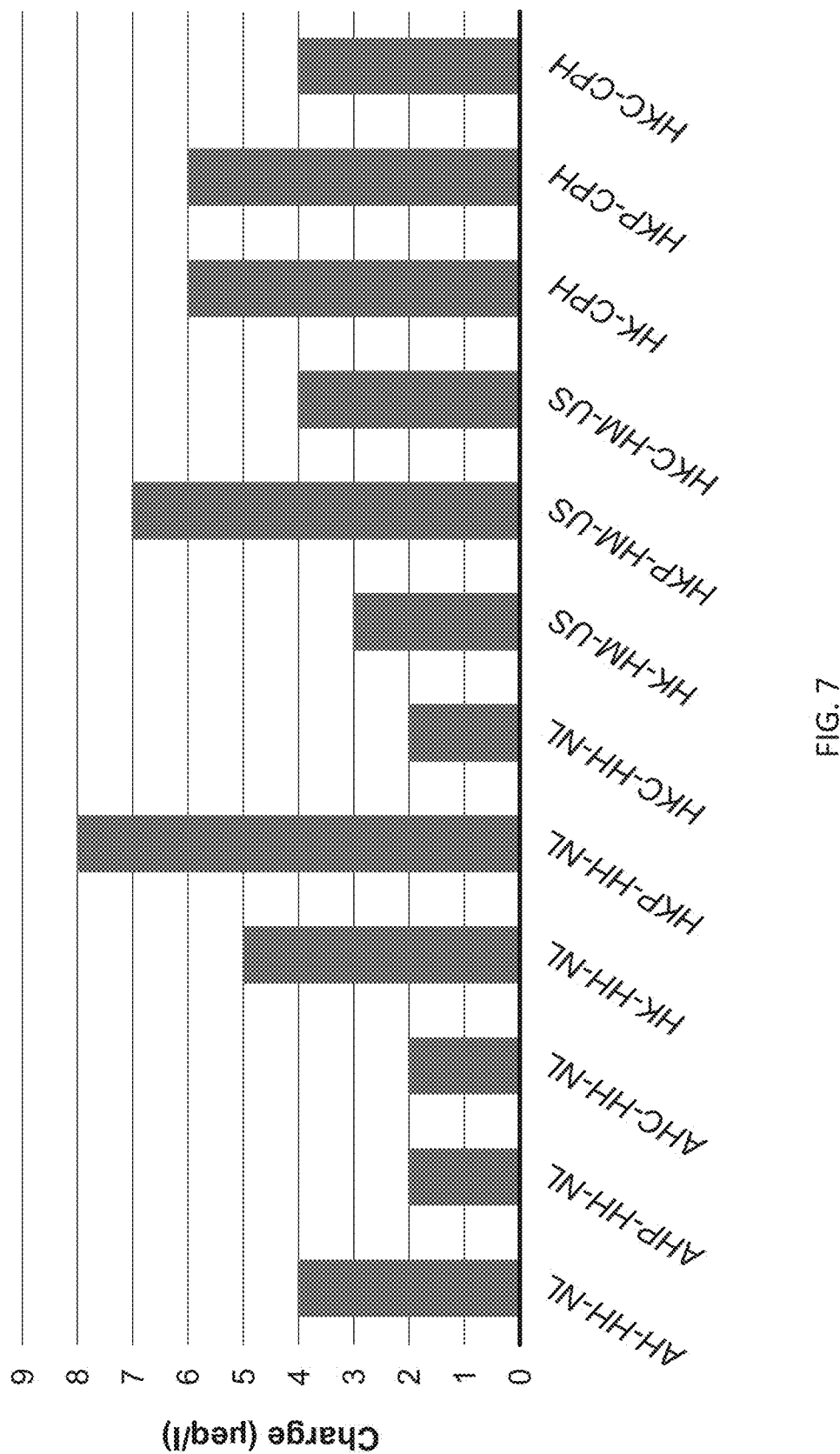
FIG. 7 is a graph showing the effect of different pulping and bleaching on charge content of the pulp. Autohydrolysis pulping (AH) shows a higher number of anionic charges on fiber surfaces than the kraft pulping (HK). The feedstocks included hemp hurds from the United States (HH-US) or the Netherlands (HH-NL), hemp mix from the United States (HM), and cocoa pod husks from the United States (CHP-US). A "C" next to the pulping designation (AH or HK) refers to conventional elemental chlorine free bleaching while a "P" refers to peroxide only bleaching.

The fiber charge can also affect post-processing, such as enzymatic treatment [24]. The surface charge and presence of carboxylate in different fiber preparations are shown in FIG. 7. The surface charge analysis represents almost the opposite results compared to DP. Peroxide bleached pulp has the highest number of anionic charge while conventional bleached pulp has its lowest. Without being bound by any one theory, highly oxidative peroxide can breakdown more phenolic/hydroxyl groups and generate more carboxylate groups, which can ultimately increase the number of anionic charges on fiber surface.

Fiber Morphology: The fiber produced by the two different kinds of pulping (autohydrolysis and kraft pulping) was further investigated to determine its structural morphology. The weighted fiber length, curl, fine content, and kink index were measured by a high quality FQA (fiber quality analyzer). See Table 5, below.

TABLE 5

FQA data of unbleached and bleached pulp with control samples (hardwood and softwood fibers)

| | After Pulping | | | | | After bleaching + refining | | | | |
|---|---|---|---|---|---|---|---|---|---|---|
| Sample ID | Fiber Length Lw (mm) | Fines % | Curl Index | Width, μm | Kink Index | Fiber Length Lw (mm) | Fines % | Curl Index | Width, μm | Kink Index |
| HKC-HH-US | 0.60 | 4.45 | 0.10 | 20.9 | 1.17 | 0.49 | 7.99 | 0.07 | 18.72 | 1.10 |
| HKC-HH-NL (disi) | 0.53 | 10.50 | 0.08 | 22.6 | 1.07 | 0.46 | 16.64 | 0.05 | 21.4 | 0.88 |
| HKC-HH-NL (disc) | 0.52 | 5.51 | 0.07 | 22.9 | 1.21 | 0.44 | 9.67 | 0.07 | 21.7 | 1.90 |
| AHP-HH-NL | 0.46 | 26.67 | 0.25 | 30.3 | 1.85 | 0.44 | 33.46 | 0.13 | 25.3 | 1.49 |
| (HKC-HM-US (vall) | 1.35 | 12.20 | 0.13 | 16.30 | 1.59 | 1.18 | 12.98 | 0.15 | 16.2 | 2.00 |
| HKC-HM-US (disc) | 0.88 | 7.16 | 0.11 | 19.80 | 1.69 | 0.66 | 9.98 | 0.10 | 17.0 | 1.76 |
| HKC-CPH-S | 0.56 | 47.0 | 0.24 | 25.10 | 2.53 | 0.39 | 52.09 | 0.23 | 24.9 | 2.01 |
| HKC-CPH-L | 0.42 | 57.23 | 0.22 | 24.60 | 2.05 | — | — | — | — | — |
| SW (Softwood) | — | — | — | — | — | 2.47 | 5.7 | 0.18 | 27.5 | 1.97 |
| HW (Hardwood) | — | — | — | — | — | 1.24 | 10.69 | 0.15 | 18.9 | 2.06 |

Although fiber morphology largely depends on pulping method and its chemicals, it can also vary depending upon the refining process used. Hemp autohydrolysis generates a relatively large number of fines and in a shorter fiber length, while kraft pulping generates relatively large fibers with less fines. The generation of longer fibers and less fines during kraft pulping can be attributed to higher pH. The higher pH during kraft pulping can result in longer fibers, lower fines, lower coarseness by removal of higher lignin, extractives, and hemicellulose [8,21]. Studies of fiber properties have shown that longer fiber have better strength properties, particularly tearing resistance, because longer fibers with more joints have larger surface area for bonding and are therefore able to create a stronger network than shorter fiber. On the other hand, smaller fiber provides better tensile and burst strength. The length of the fiber does not vary significantly depending on the use of disc refining or disintegration, but the percent of fines can vary depending on refining processes. Disc refining generates almost twice the number of fines compared to disintegration. Curl index represents the maximum elongation of the fiber up to breakage, which indicates the stability of the paper. It also indicates the presence of higher bulk, and porosity of the pulp can cause slow drainage [25]. Hemp hurds fiber was relatively smaller than hardwood fiber, but the hemp mix fiber is larger than the hardwood fiber even after refining. On the other hand, CPH fiber is the smallest fiber and is suitable for thin film preparation, use as a chemical additive, and in coating development. The fines content is also highest for CPH, followed by autohydrolysis. The lowest fines content was observed for kraft pulping. The fiber produced by autohydrolysis has higher fines, and curl with short fiber length which is more suitable for tissue products or paper with low strength and high bulk. On the other hand, pulp produced by kraft pulping has relatively longer fiber length, less fines, and brighter fiber, which is suitable for strong and/or high value packaging products, such as food packaging products.

The presently disclosed fiber development from agricultural and industrial waste biomass highlights the utilization of waste biomass for high value products through a sustainable process and its recyclability for a circular economy. The chemical free pulping (autohydrolysis) and mild kraft pulping of waste biomass can generate fibers for high value food packaging applications. Autohydrolysis gave 7.0% and 12.8% higher yield compared to alkaline and mild kraft pulping respectively in a chemical free pulping process. Although pulp generated by autohydrolysis from hemp biomass had more fines and a shorter fiber length, it is suitable for products with high bulk such as paper towel or tissue paper. On the other hand, a conventional kraft pulping of hemp biomass with 33.3% less chemicals was also studied and gave comparatively good yield with less fines, good amount of curl, and relatively long fiber which is easy to bleach and generate brighter pulps. This long and brighter pulp had good strength and can be used for high value food packaging. Pulp yield can also depend on refining process. For the same kraft pulping, disc refining gave 12.3% higher yield than disintegration. A one-step peroxide bleaching at low temperature generated fibers with natural color for sustainable packaging applications. A three-steps elemental chlorine free bleaching process using 12.0% less chlorine dioxide and 11.4% less sodium hydroxide than the usual five-step process gave a target brightness of 84.6 comparable to hardwood fibers. The pulping of cocoa pod husk generated a higher percent of fine particles, which is suitable for thin films in packaging and surface coating for barrier properties. The mild kraft pulping hemp fibers also had a high degree of polymerization, which is important for fiber-to-fiber bonding and for paper strength. The long fibers have more surface, which provides a strong tearing resistance, while short fiber can contribute to higher tensile and burst strength. The surface charge of the fiber represents the chemical groups on it, and it can be manipulated to control the binding capacity of the fibers and has potential application in antimicrobial packaging applications.

Example 2

Flexible Packaging Paper

Materials:

Hemp hurds, hemp mix, and wood fibers were produced using various pulping and bleaching processes, as described above in Example 1. Table 6, below, summarizes the pulp samples, fiber types, and their processing conditions. Cationic starch was available in powder form. A 1% solution of cationic starch was prepared by mixing 1 gram dry weight of cationic starch with 100 ml water of deionized (DI) water at 90° C. for about 30 minutes. A 1% solution of citric acid-carboxymethyl cellulose (CA-CMC) were prepared by mixing 0.5 gm dry weight of citric acid (CA) and 0.5 gm of carboxymethyl cellulose (CMC) in 100 ml of DI water until it dissolved. The other additives were available in solution form. Table 7, below, shows the additives and their sources.

TABLE 6

Pulp fibers and their processing conditions.

| S. No. | Pulp ID | Fiber source and defiberation process |
|---|---|---|
| 1 | HKC-HH-US | Hemp Hurds from US, High Kappa Kraft Pulping and Conventional Bleaching |
| 2 | HKC-HH-NL | Hemp Hurds from Netherlands, High Kappa Kraft Pulping and Conventional Bleaching |
| 3 | AKC-HH-NL | Hemp Hurds from Netherlands, Autohydrolysis and Conventional Bleaching |
| 4 | AKP-HH-NL | Hemp Hurds from Netherlands, Autohydrolysis and Peroxidation |
| 5 | HKC-HM-US | Hemp Mix from US, High Kappa Kraft Pulping and Conventional Bleaching |
| 6 | HKC-CPH | Cocoa Pod Husks from South America, High Kappa Kraft Pulping and Conventional Bleaching |
| 7 | SW | Market softwood pulp fibers, Kraft pulping, Conventional bleaching |
| 8 | HW | Market hardwood pulp fibers, Kraft pulping, Conventional bleaching |

TABLE 7

Additives and their purpose of using:

| S. No. | Pulp ID | Source |
|---|---|---|
| 1 | Cationic Starch (CS or ST) | National Cato Starch (Industrial Starch)-1% Solution |
| 2 | AKD (Alkyl Ketene Dimer) | Industrial AKD-18% solution |
| 3 | CA-CMC (Citric acid crosslinked Carboxymethyl Cellulose) | Sigma Aldrich (St. Louis, Missouri, United States of America) - 1% solution |
| 4 | TEC | Sigma Aldrich (St. Louis, Missouri, United States of America)- 0.99 gm/ml |

Refining and Homogenizing Process:

The bleached pulp was further refined to achieve desired freeness (300 to 450 mL) and strength properties. The pulp refining was performed a PFI refiner at different revolutions. See Table 8, below. The furnish, refining and additives used in papermaking are also shown in Table 8, below.

TABLE 8

Base sheets furnish composition, refining and additives (1) 5% Cationic Starch + 1% AKD; (2) 5% Cationic Starch + 1% AKD + 1% CA + 1% CMC; (3) 5% Cationic Starch + 1% AKD + 1% CA + 1% CMC + 1% TEC; (4) 1% Cationic Starch + 1% AKD.

| Trial | Sample Id | Furnish condition | Additives | Pre-Processing | PFI Refining |
|---|---|---|---|---|---|
| 1 | HKC-HH-US | 100%-HKC-HH-US | 1 | | 1250rev |
| | | | 2 | | |
| | | | 3 | | |
| | AKC-HH-NL | 100%- AKC-HH-NL | 1 | | 1250 rev |
| | | | 2 | | |
| | | | 3 | | |
| | Wood Fiber | 70% HW + 20% SW + 10% HRSW | 1 | Market pulp | HW-2.5k, SW 5k, HRSW 10k |
| | | | 2 | | |
| | | | 3 | | |
| 2 | HKC-HH-US | 100% HKC-HH-US | 4 | | 1250rev |
| | HKC-HH-NL | 100% HKC-HH-NL | 4 | Disintegrated | |
| | AKC-HH-NL | 100% AKC-HH-NL | 4 | | |
| | AHP-HH-NL | 100% AKC-HH-NL | 4 | | 625 rev |
| | Wood Fiber | 70% HW + 30% SW | 4 | Market pulp | HW2.5k, SW5k |
| 3 | HKC-HH-NL:HKC-HM-US (90:10) | 90% HKC-HH-NL + 10% HKC-HM-US | No additive | Disc refined both pulp | HKC-HH-NL-625 Rev |
| | Wood Fiber | 70% HW + 20% SW + 10% HKC-CPH | 4 No additive | | HW2.5k, SW5k |
| 4 | HKC-HH-NL | 100% HKC-HH-NL | 4 | Disc refined | |
| | HKC-HH-NL:HKC-HM-US(90:10) | 90% HKC-HH-NL + 10% HKC-HM-US | 4 | Disc refined both pulp | |
| | HKC-HH-NL:HKC-HM-US(80:20) | 80% HKC-HH-NL + 20% HKC-HM-US | 4 | Disc refined both pulp | |
| | HKC-HH-NL:HKC-HM-US(70:30) | 70% HKC-HH-NL + 30% HKC-HM-US | 4 | Disc refined both pulp | |
| | Wood Fiber | 70% HW + 30% SW | 4 | Disc refined both pulp | HW2.5k, SW5k |
| 5 | HKC-HH-NL | 100% -HKC-HH-NL | 4 | Disintegrated-HKC-HH-NL | |
| | HKC-HH-NL:SW2.5k (70:30) | 70% HKC-HH-NL + 30% SW | 4 | Disintegrated-HKC-HH-NL | SW2.5k |
| | HKC-HH-NL:SW5k (70:30) | 70% HKC-HH-NL + 30% SW | 4 | Disintegrated-HKC-HH-NL | SW5k |
| | HKC-HH-NL:HKC-HM-US2.5k (70:30) | 70% HKC-HH-NL + 30% HKC-HM-US | 4 | Disintegrated-HKC-HH-NL Disc refined-HKC-HM-US | HKC-HM-US-2.5k |
| | HKC-HH-NL:HKC-HM-US5k (70:30) | 70% HKC-HH-NL + 30% HKC-HM-US | 4 | Disintegrated-HKC-HH-NL Disc refined-HKC-HM-US | HKC-HM-US-5k |
| | HKC-HH-NL:HKC-HMR-US (70:30) | 70% HKC-HH-NL + 30% HKC-HMR-US | 4 | Disintegrated-HKC-HH-NL Disc refined-HKC-HMR-US) | HKC-HMR-US valley beater refined |
| | HKC-HH-NL:HKC-HM-US (70:30) | 70% HKC-HH-NL + 30% HKC-HM-US | 4 | Disintegrated-HKC-HH-NL Disc refined-HKC-HM-US | |
| | HW2.5k(100) | HW-100% | 4 | Market Pulp | HW-2.5k rev |
| | HW2.5k:SW2.5k (70:30) | 70% HW + 30% SW | 4 | Market Pulp | HW-2.5k rev, SW-2.5k rev |
| | HW2.5k:SW5k (70:30) | 70% HW + 30% SW | 4 | Market Pulp | HW-2.5k rev, SW-5k rev |

Fiber Quality Analysis:

The changes in physical properties of the fibers were measured using a high-resolution fiber quality analyzer HiRes FQA, OpTest Equipment Inc. (Hawkesbury, Ontario, Canada). A small amount of pulp from each sample was disintegrated for the fiber quality analysis.

Figure 9:
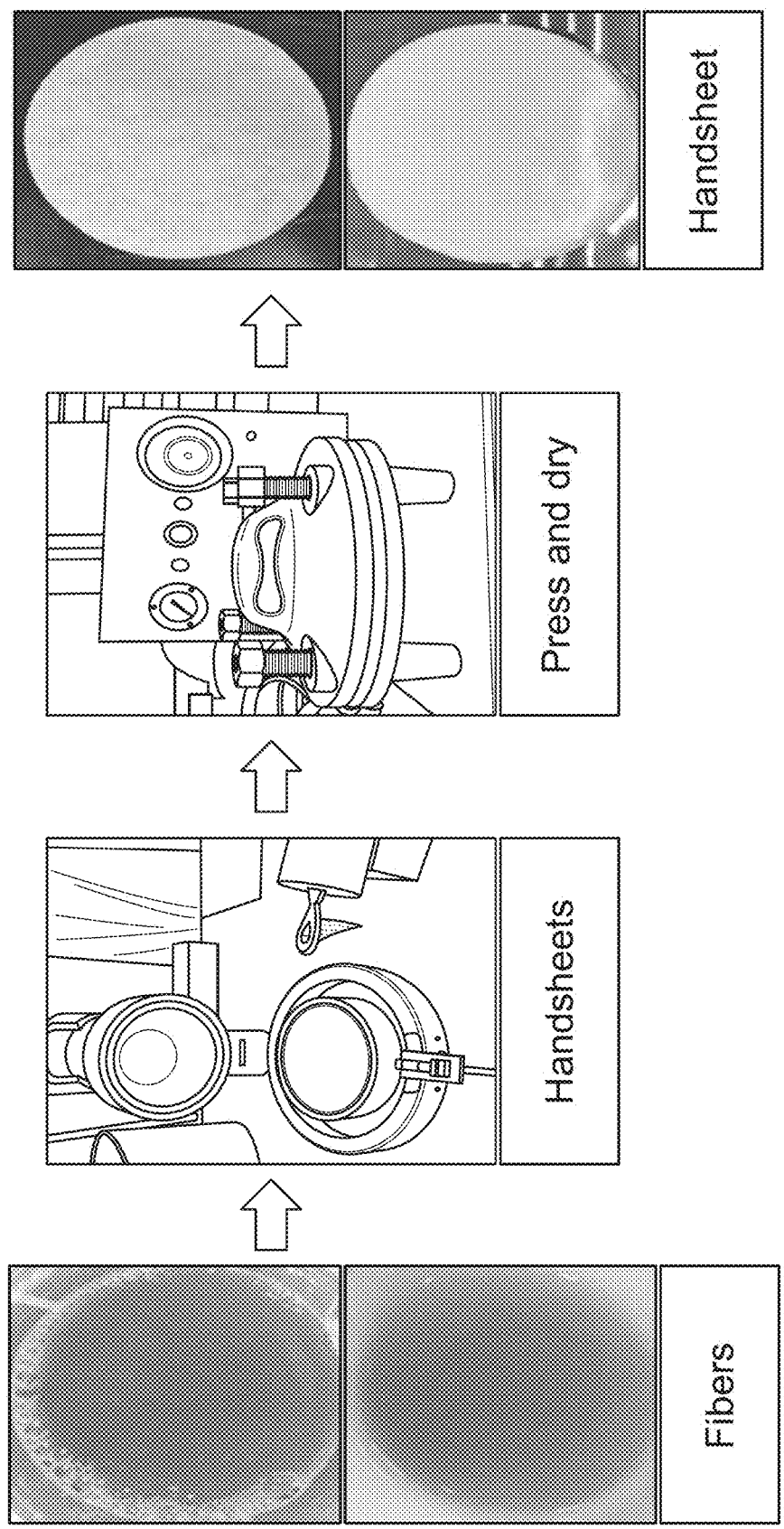
FIG. 9 is a schematic diagram with photographic image inserts showing process for making handsheets from a slurry of papermaking fibers (left) including handsheet forking, pressing and drying.

Preparation and Characterization of Base Sheets:

Handsheets were prepared at a target basis weight of ~60 g/m$^2$ as per the Tappi T205 as shown in FIG. 9. Samples were conditioned for 24 hrs at 23° C./50% RH before testing. Selected samples with crosslinking agents were cured at 150-160° C. for 5 minutes after air drying. The handsheets were then tested for critical properties such as basis weight, caliper, bulk (T258), tensile (TAPPI T494), burst (TAPPI T 403), tear (TAPPI T 414), porosity (TAPPI T547), smoothness (TAPPI T 538) (0-400 SU), brightness and opacity.

Figure 10D:
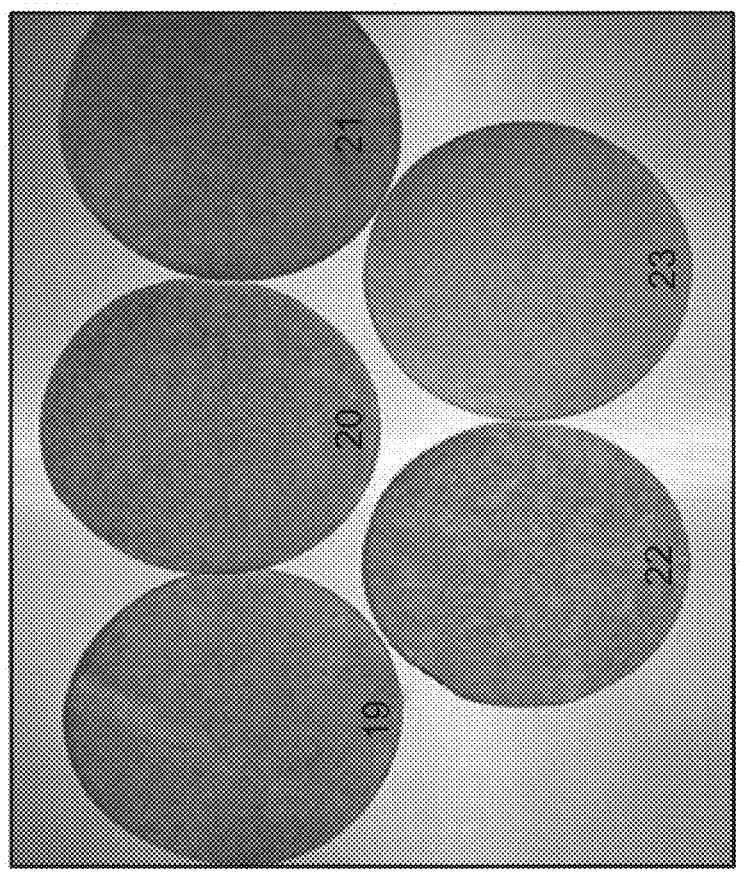
Figure 10C:
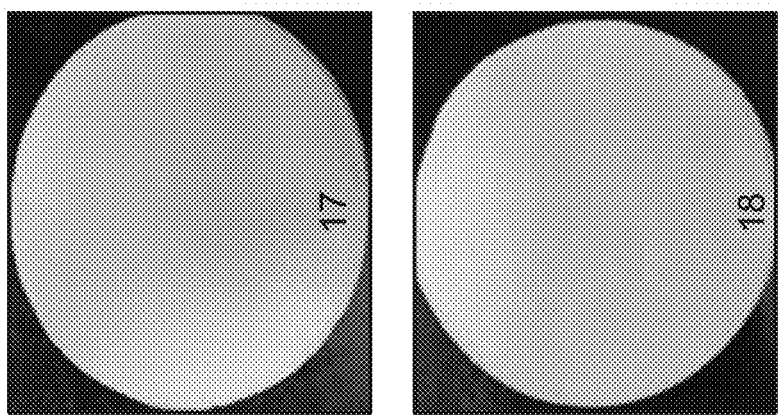
Figure 10C:
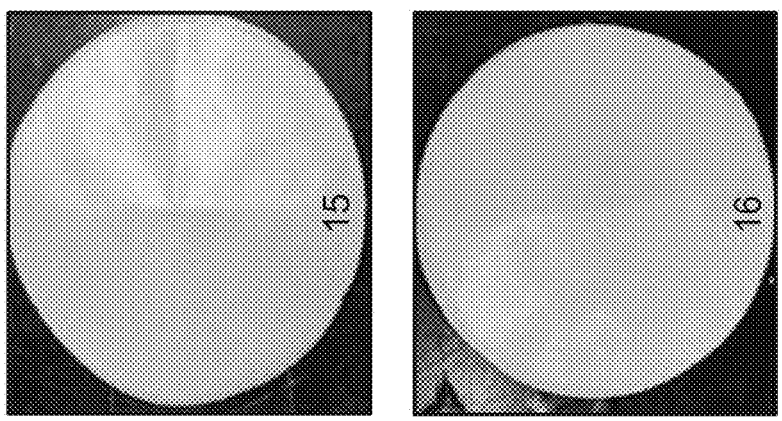
Figure 10E:
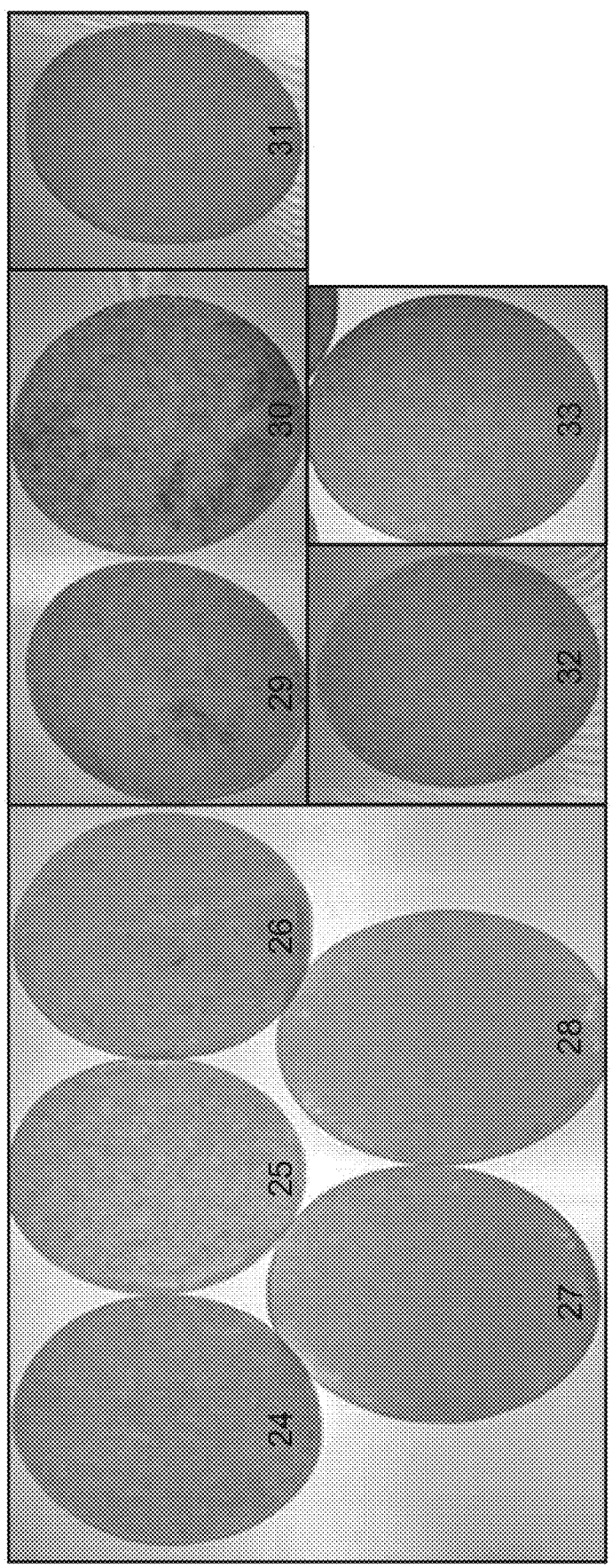

Discussion:

Physical Appearance of Handsheets: FIGS. 10A and 10B show images of handsheets prepared from trial 1 & 2. Handsheets prepared from hemp hurds fibers look uniform with some visible shives. FIGS. 10C-10E show images of handsheets from trials 3, 4, and 5, made after the prescreening of the hemp hurds feedstock before pulping to enhance pulp quality. Overall, the hemp hurds samples look uniform except those containing hemp mix and hemp rejects as the fibers are long and tangled together. The samples with refined hemp mix fibers (See FIG. 10E: 25 and 26) look comparatively uniform compared to the samples with unrefined hemp mix and hemp rejects. See FIG. 10E: 29 and 30.

Refining: The bleached pulp was refined to adjust the target freeness to 300-350 mL to enhance fiber uniformity and strength. Refining improves inter-fiber bonding by increasing the surface area and fiber flexibility while reducing fiber length and creating more fines. The pulp refining was performed by the PFI refiner at different revolutions. The freeness values are given in Table 9, below.

TABLE 9

Freeness of pulp after refining

| Trial | Sample ID | Unrefined CSF Freeness (ml) | Refined CSF Freeness (ml) |
|---|---|---|---|
| 1 | HKC-HH-US (1250 rev) | 402 | 310 |
| 2 | HKC-HH-NL | 341 | Not refined due to low CSF |
| 1 | AHC-HH-NL (1250 rev) | 452 | 117 |
| 1 | AHP-HH-NL (625 rev) | 673 | 147 |
| 1&2 | HW (2.5k) | 671 | 443 |
| 1&2 | SW (5k) | 734 | 430 |
| 1 | SW (10k) | 734 | 67 |
| 1 | HW (70%) (2500 rev) + SW (20%) (5k) + SW (10%) (10k) | | 354 |
| 2 | HW (70%) (2.5k) + SW (30%) (5k) | | 499 |
| 3 | HKC-HH-NL-disc (625 rev) | 480 | 339 |
| 3, 4, 5 | HW (2500 rev) | 671 | 349 |
| 3, 4, 5 | SW (5000 rev) | 734 | 205 |
| 3 | HW (70%) (2500 rev) + SW (20%) (5000rev) + CPHC(10%) | | 255 |
| 3 | HKC-HH-NL (90%) (625 rev) + HKC-HM-US (10%) | | 259 |
| 4 | HKC-HH-NL-disc | 480 | N/A |
| 5 | SW (2.5k) | 734 | 504 |
| 5 | HKC-HH-NL-disintegrated | 362 | N/A |
| 5 | HW (70%) (2.5k) + SW (30%) (2.5k) | | 259 |
| 5 | HKC-HM | 68 | 37 |

Fiber Quality Analysis: As mentioned earlier, refining causes changes in fiber properties. Table 10, below, shows the effect of refining and other processing conditions on fiber quality such as length, fines content, curl and kink indices.

TABLE 10

FQA data of Pulp.

| | | After Pulping | | | | | After bleaching+/refining | | | | |
|---|---|---|---|---|---|---|---|---|---|---|---|
| Trial | Sample ID | Fiber Length Lw | Fines % | Curl Index | Width, um | Kink Index | Fiber Length Lw | Fines % | Curl Index | Width, um | Kink Index |
| 1&2 | HKC-HH-US (1250 rev ) | 0.60 | 4.45 | 0.10 | 20.9 | 1.17 | 0.49 | 7.99 | 0.07 | 18.72 | 1.10 |
| 2 | HKC-HH-NL (unrefined)-dis integrated | 0.52 | 5.97 | 0.06 | 23.2 | 0.56 | 0.48 | 6.59 | 0.05 | 21.4 | 0.08 |
| 1 | AHC-HH-NL (1250 rev)-Trial-1, (no refining)-Trial2 | 0.75 | 11.92 | 0.09 | 27.2 | 1.17 | 0.50 | 14.90 | 0.07 | 23.3 | 1.13 |
| 2 | | | | | | | 0.56 | 11.44 | 0.07 | 25.2 | 0.69 |
| 2 | AHP-HH-NL (650 rev) | 0.75 | 11.92 | 0.09 | 27.2 | 1.17 | 0.48 | 21.69 | 0.15 | 26.1 | 1.79 |
| 1&2 | HW(2.5k) | 1.30 | 13.11 | 0.15 | 18.7 | 2.15 | 1.24 | 10.69 | 0.15 | 18.9 | 2.06 |
| 1&2 | SW(5k) | 2.47 | 5.41 | 0.18 | 26.3 | 1.88 | 2.47 | 5.7 | 0.18 | 27.5 | 1.97 |
| 3 | HKC-HH-NL-625, disc refined | 0.52 | 5.51 | 0.07 | 22.9 | 1.21 | 0.48 | 5.91 | 0.05 | 21.6 | 0.99 |
| 3 | HKC-CPH-unrefined | 0.56 | 47 | 0.24 | 25.1 | 2.53 | 0.39 | 52.09 | 0.23 | 24.9 | 2.01 |
| 3 | HKC-HM-US (PFI unrefined)-disc refined | 0.88 | 7.16 | 0.11 | 19.8 | 1.69 | 0.66 | 9.98 | 0.10 | 17 | 1.76 |

TABLE 10-continued

FQA data of Pulp.

| | | After Pulping | | | | | After bleaching+/refining | | | | |
|---|---|---|---|---|---|---|---|---|---|---|---|
| Trial | Sample ID | Fiber Length Lw | Fines % | Curl Index | Width, um | Kink Index | Fiber Length Lw | Fines % | Curl Index | Width, um | Kink Index |
| 4 | HKC-HH-NL-(disc refined) | 0.52 | 5.51 | 0.07 | 22.9 | 1.21 | 0.44 | 9.67 | 0.07 | 21.7 | 1.90 |
| 4 | HKC-HM-US (disc refined) | 0.8 | 8.98 | 0.1 | 19.4 | 1.49 | 0.59 | 12.52 | 0.13 | 18.6 | 2.03 |
| 3, 4, 5 | HW (2.5k) | 1.3 | 13.11 | 0.15 | 18.7 | 2.15 | 1.2 | 17.8 | 0.19 | 19.1 | 2.49 |
| 3, 4, 5 | SW (5k) | 2.47 | 5.41 | 0.18 | 26.3 | 1.88 | 1.97 | 14.28 | 0.18 | 27.3 | 2.31 |
| 5 | HKC-HH-NL-(disintegrated) | 0.53 | 10.5 | 0.08 | 22.6 | 1.07 | 0.46 | 16.64 | 0.05 | 21.4 | 0.88 |
| 5 | HKC-HM-US (disc refined) (2.5k) | 0.8 | 8.98 | 0.1 | 19.4 | 1.49 | 0.58 | 13.64 | 0.08 | 16.2 | 1.78 |
| 5 | HKC-HM-US (disc refined)(5k) | 0.8 | 8.98 | 0.1 | 19.4 | 1.49 | 0.48 | 14.94 | 0.08 | 16 | 1.77 |
| 5 | SW (2.5k rev) | 2.47 | 5.41 | 0.18 | 26.3 | 1.88 | 2.24 | 10.95 | 0.176 | 27.0 | 2.06 |

Figure 11B:
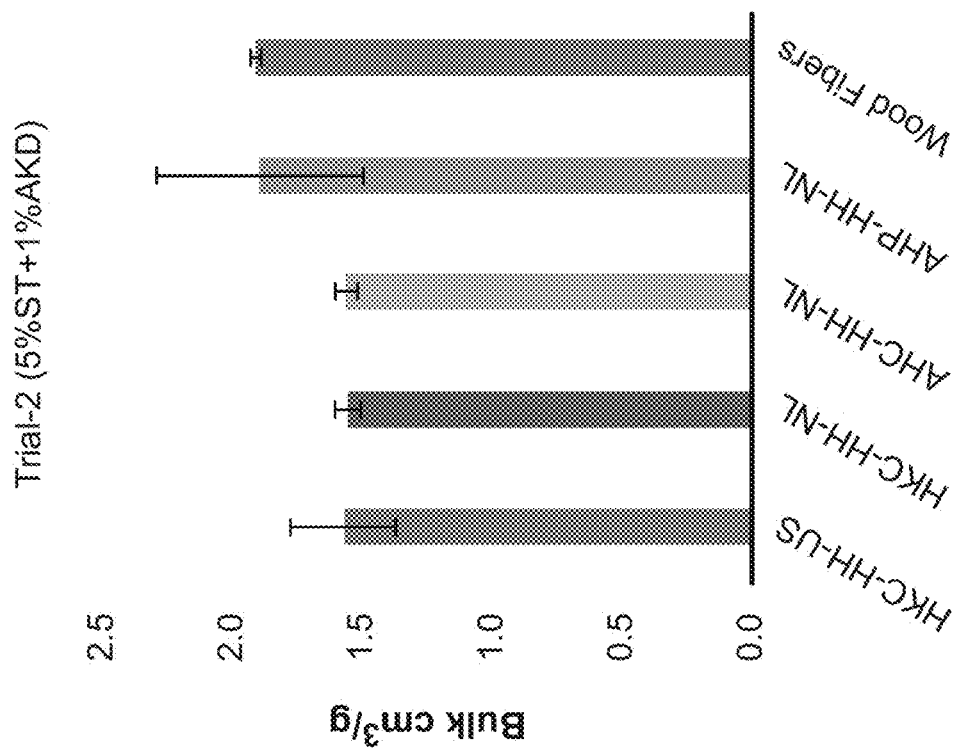
FIGS. 11A-11E are a series of graphs showing the effects of fiber type, furnish, and additive on bulk (measured in cubic centimeters per gram ($cm^3/g$)).
Figure 11A:
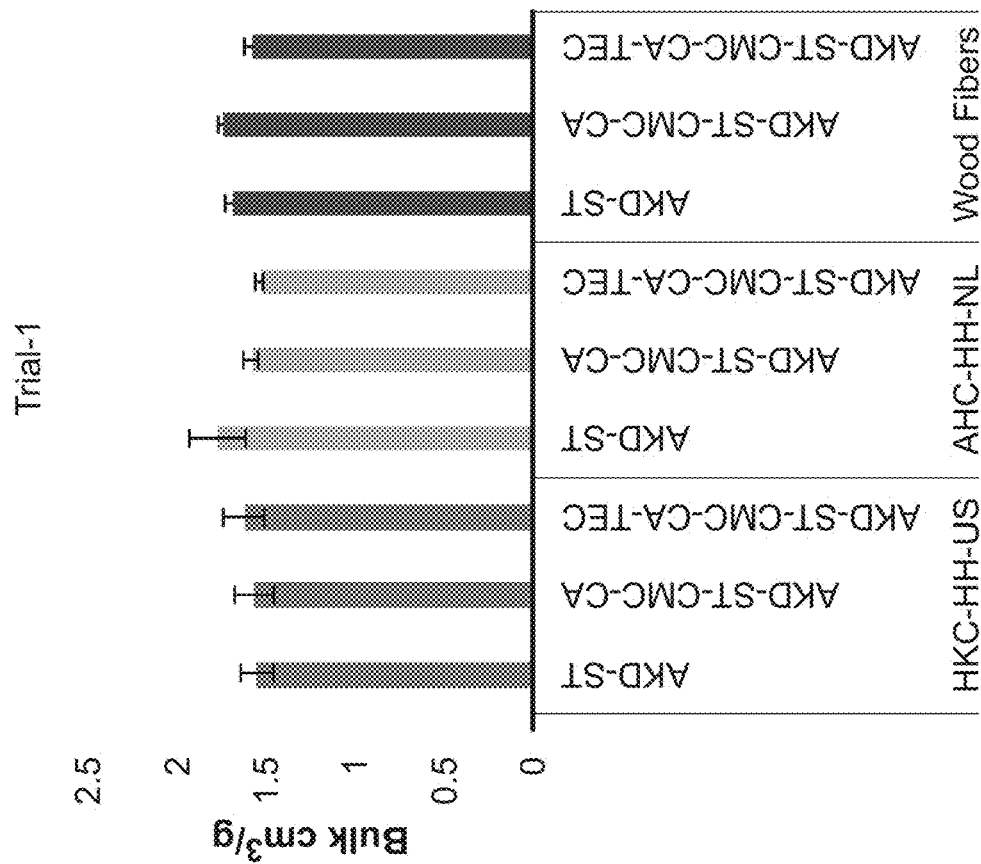
Figure 11C:
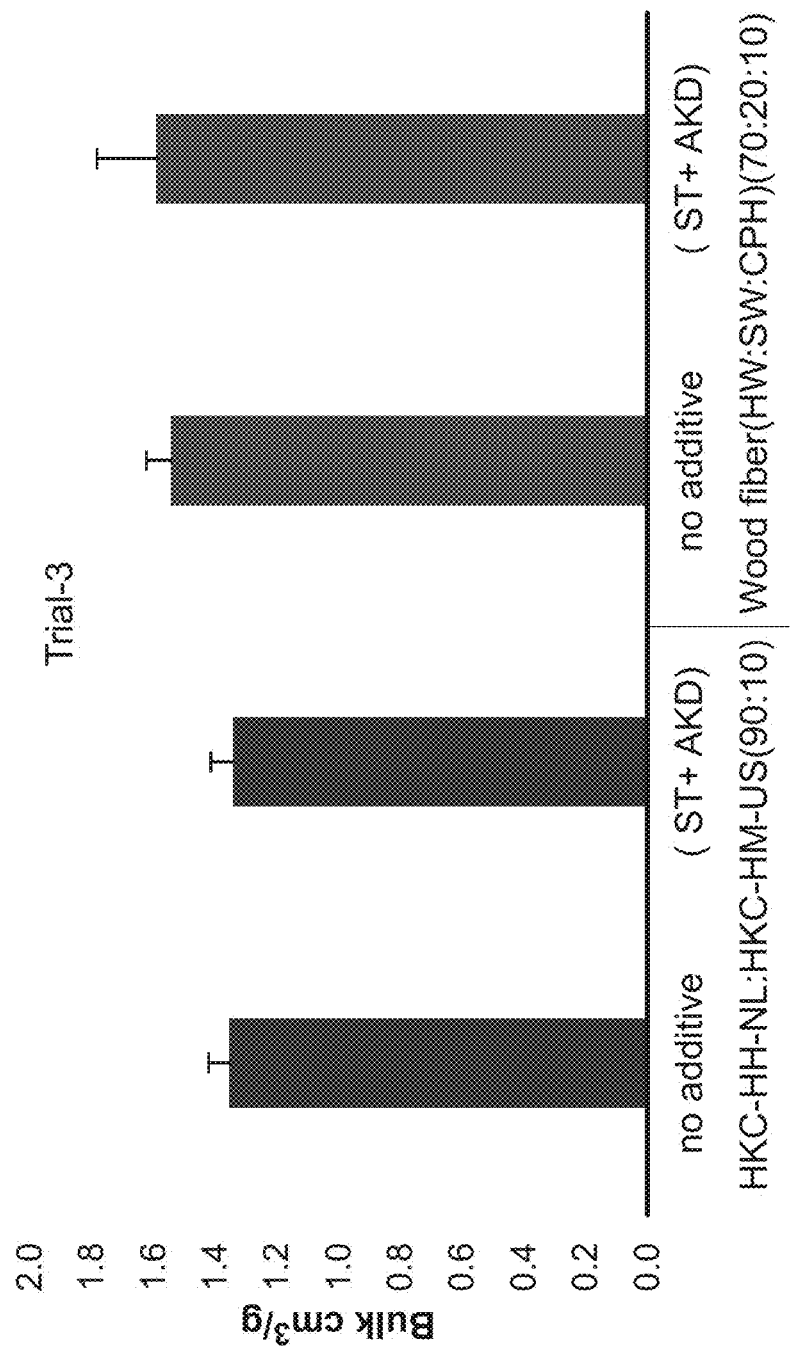
Figure 11E:
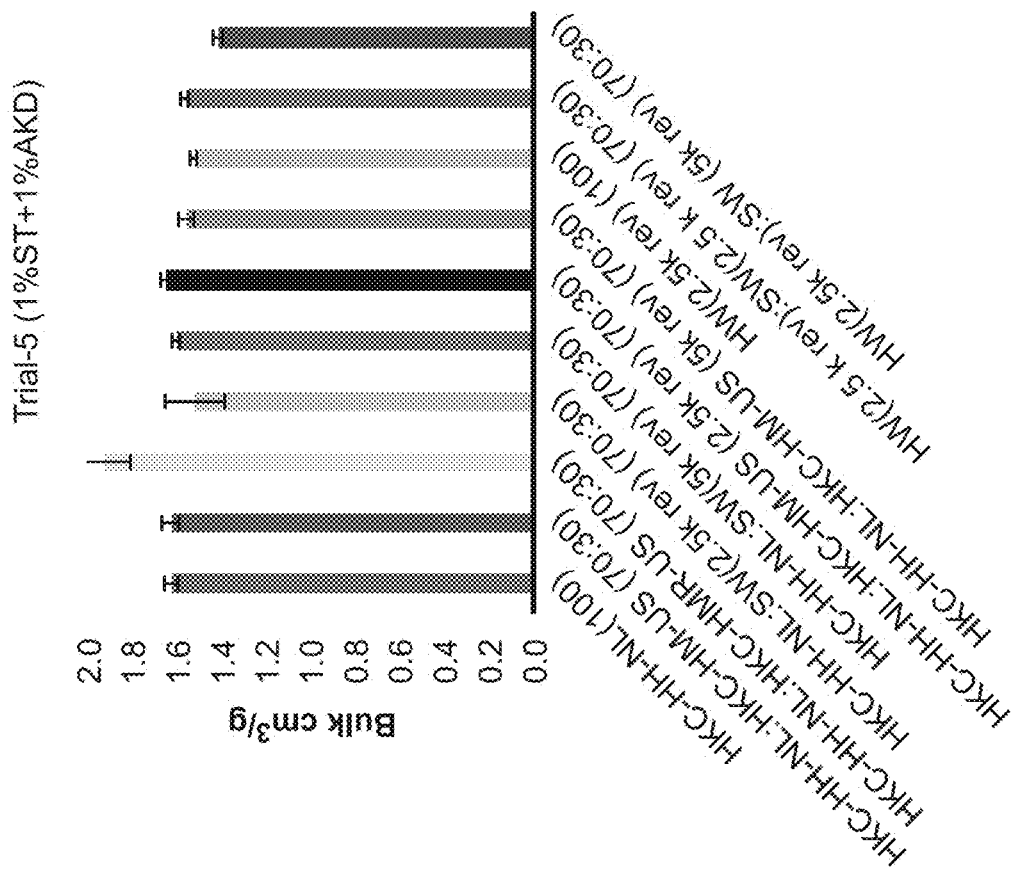
Figure 11D:
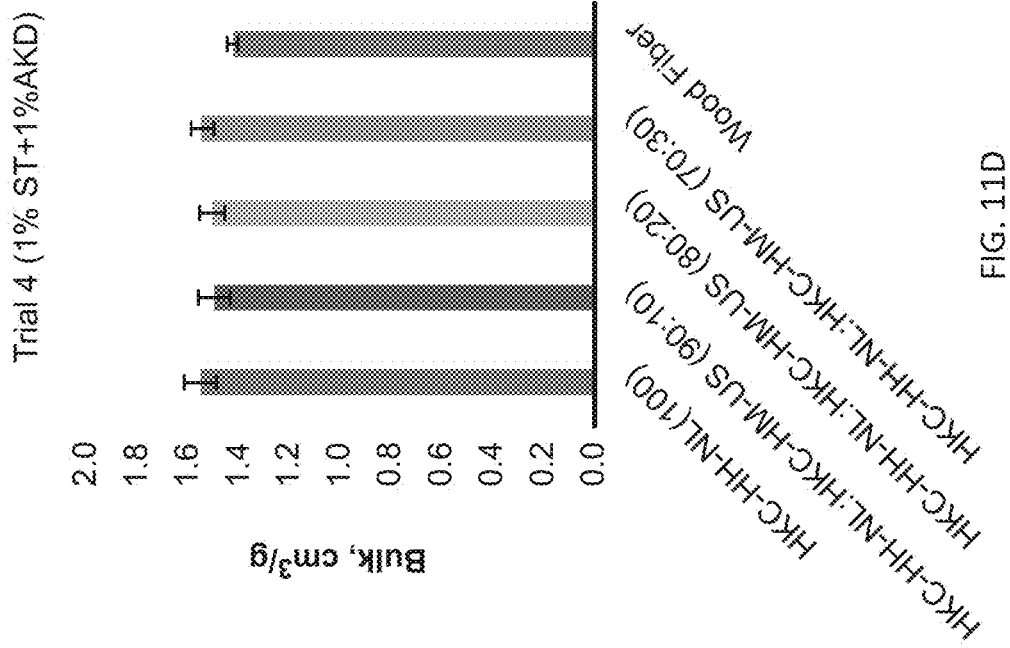

Effects of fiber types and additives on bulk: Bulk is an important property for packaging products. It can affect the porosity, pore-volume, sheet thickness, bending stiffness, z-directional compressibility, liquid absorption, and air/gas permeability [46]. The effects of fiber types, furnish, additives, and refining was studied on the bulk property of handsheets. In trial 1, AKD, Cationic Starch (CS), CA, CMC, and TEC additives were used in three pulps (HKC-HH-US100, AHC-HH-NL100, and HW70:SW30). The additives didn't significantly affect the bulk in trials 1 and 3. See FIGS. 11A and 11C. However, in trial 2 (see FIG. 11B), the AHP-HH-NL pulp showed a higher bulk due to low chemical (autohydrolysis) and mechanical (refining) treatments [34]. In trial 4 (see FIG. 11D), the wood fiber sample had the lowest bulk due to the higher level of refining. In trial 5 (see FIG. 11E), the bulk values were similar since most of the samples were not refined. The hemp sample with 30% hemp rejects had the highest bulk due to long fiber and low refining of rejects.

Figure 12B:
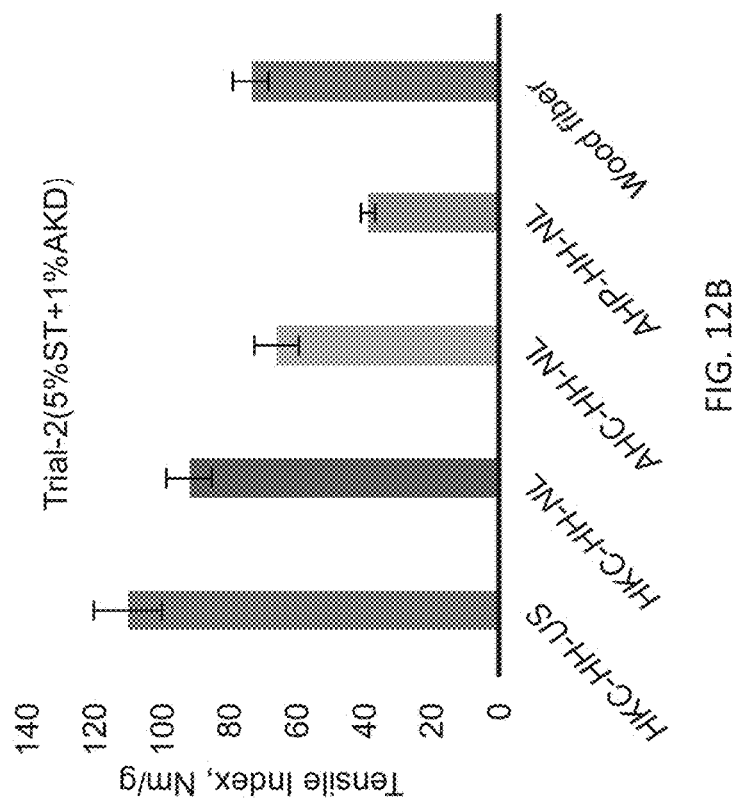
FIGS. 12A-12E are a series of graphs showing the effects of fiber type, furnish, additive, and refining on tensile strength (measured in Newtons times meters per gram, Nm/g)).
Figure 12A:
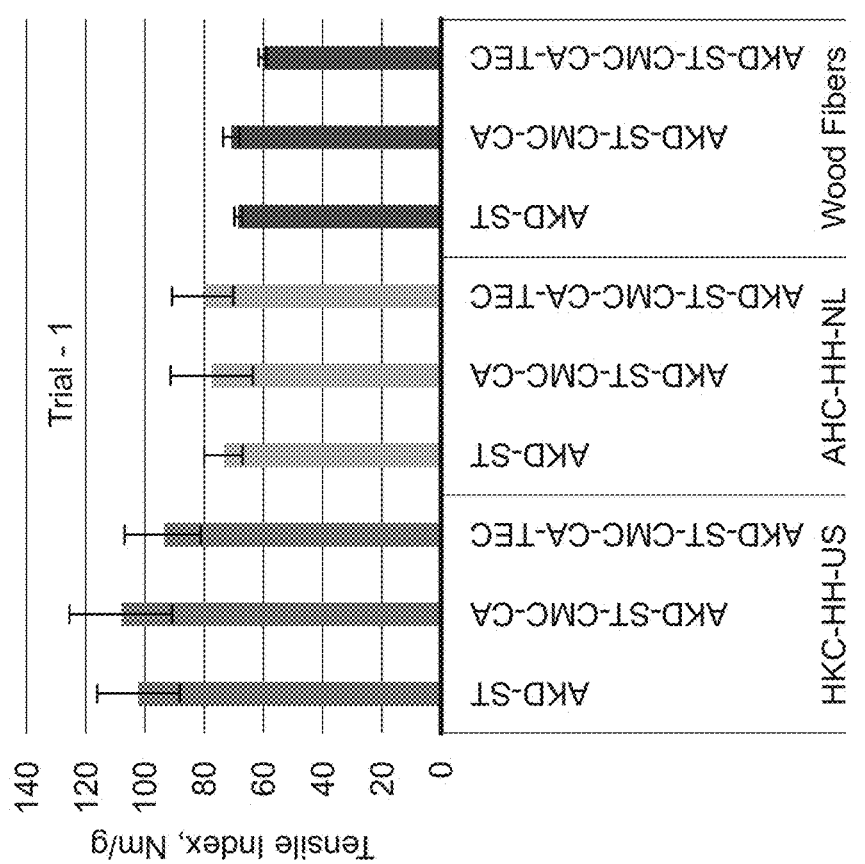

Effects of Fiber Types and Additives on Strength Properties—Tensile Strength:

Strength is an important property for packaging products. As shown in FIG. 12A, the tensile index of the samples from different pulps did not significantly, although it can be observed that the samples containing starch, AKD, CA, CMC have a comparatively high tensile index. As described hereinabove, cationic starch enhances bonding between fibers through enhanced hydrogen bonding. It also helps to retain fines and other additives [47]. CMC acts as a bonding agent, and CA acts as a crosslinking agent of CMC, which improves the bond [48]. Also, it can be observed that, out of the three pulps, the highest strength was observed for HKC-HH-NL, followed by AHC-HH-NL and then wood fiber. In a previous study, it has been observed that hemp hurds showed higher strength than wood fiber due to its flattened morphology resulting in better bonding in fiber [8].

In trial 2 (see FIG. 12B), the additive conditions were kept the same (5% CS+1% AKD), but four different types of hemp hurds pulps (HKC-HH-US, HKC-HH-NL, AHC-HH-NL, and AKP-HH-NL) were used to prepare the samples and compared with a control sample prepared from wood fibers. These four hemp pulps were produced using different pulping and bleaching (see Table 6, table). The HKC-HH-US sample gave the highest tensile index, followed by the HKC-HH-NL, wood fiber, AHC-HH-NL, and AHP-HH-NL samples. HKC-HH-US and HKC-HH-NL were produced from the kraft pulping process under the same condition using different feedstock. The FQA data shows that HKC-HH-US has a slightly higher fiber length and fine content than HKC-HH-NL. The strength also depends on the feedstock, which can cause a higher tensile strength for HKC-HH-US. The autohydrolyzed pulps AHC-HH-NL and AHP-HH-NL had lower strength, presumably due to very low delignification during pulping. Delignification helps remove lignin and fibrillate the fibers, which eventually improves the strength [29]. Here, in the case of AHC-HH-NL, the conventional bleaching or brightening process removed lignin to a certain extent. In contrast, for AKP-HH-NL, the peroxide brightening or bleaching process did not remove as much lignin. Hence, AHP-HH-NL had the lowest tensile index.

Figure 12C:
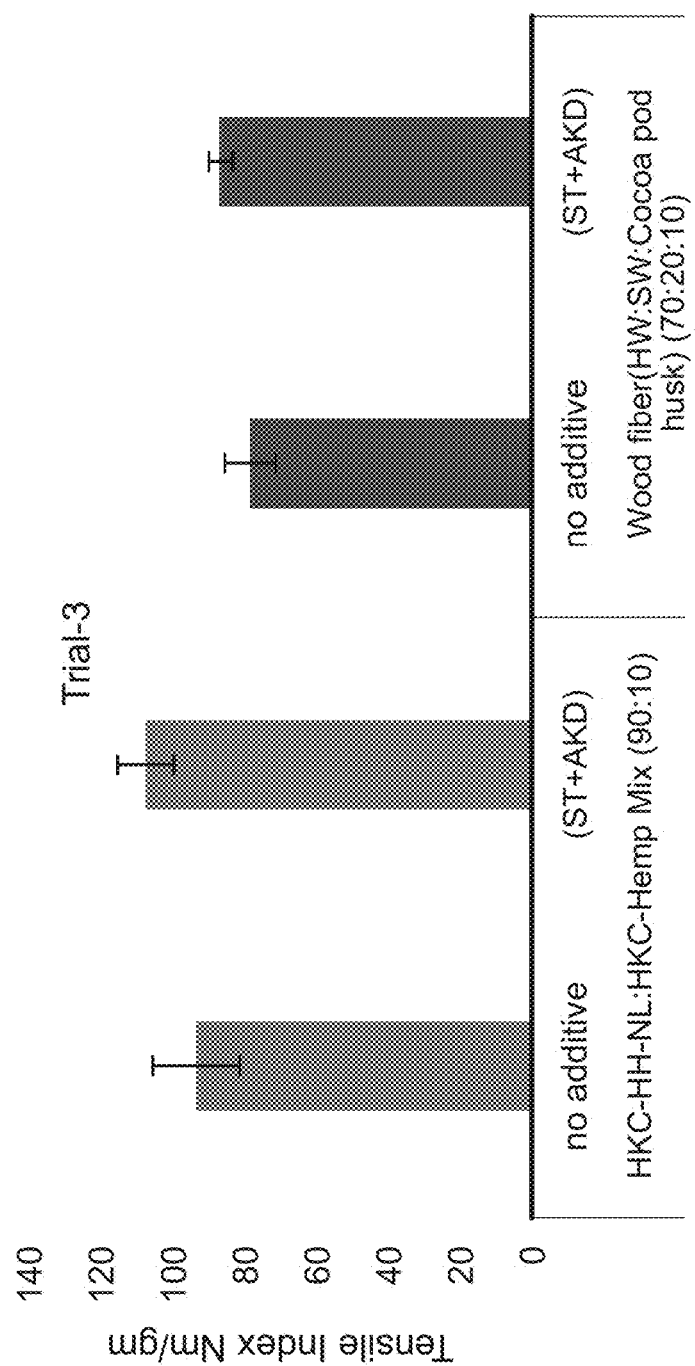
Figure 12E:
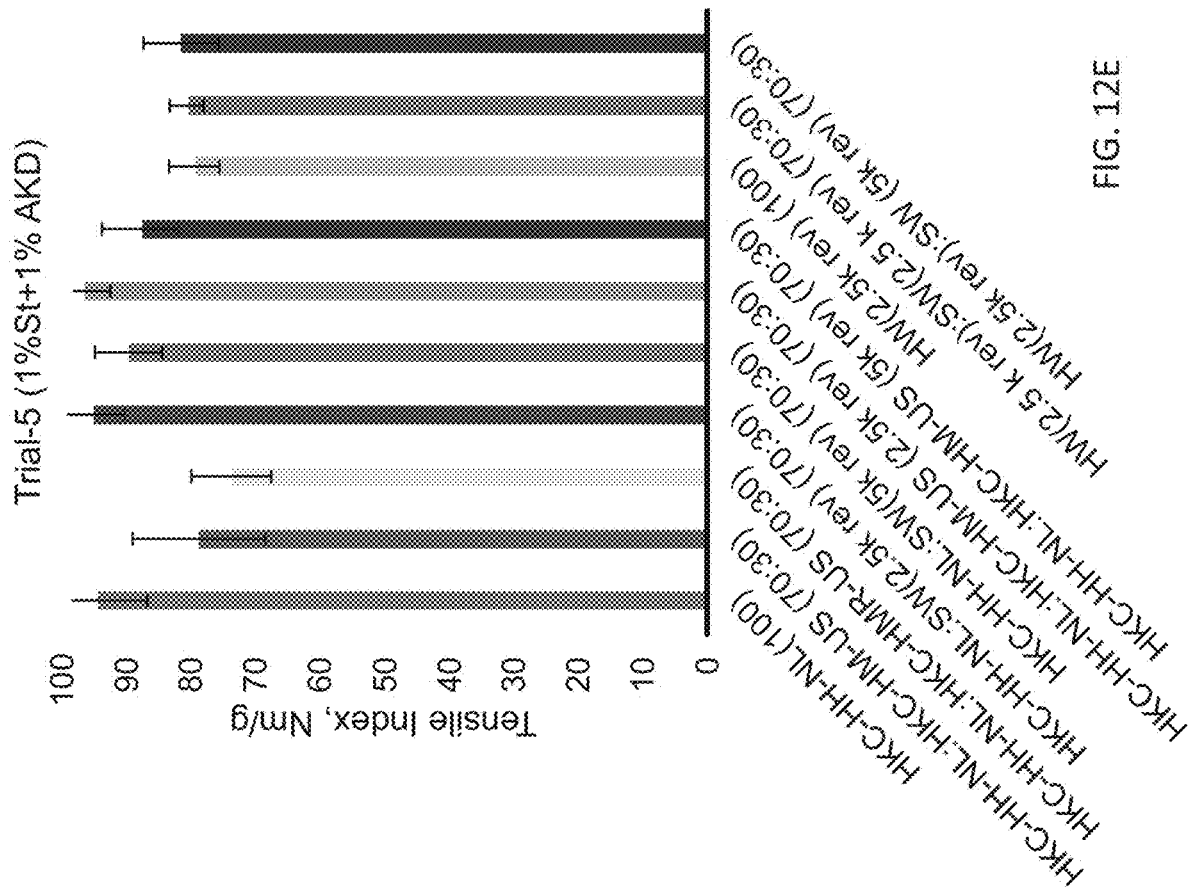
Figure 12D:
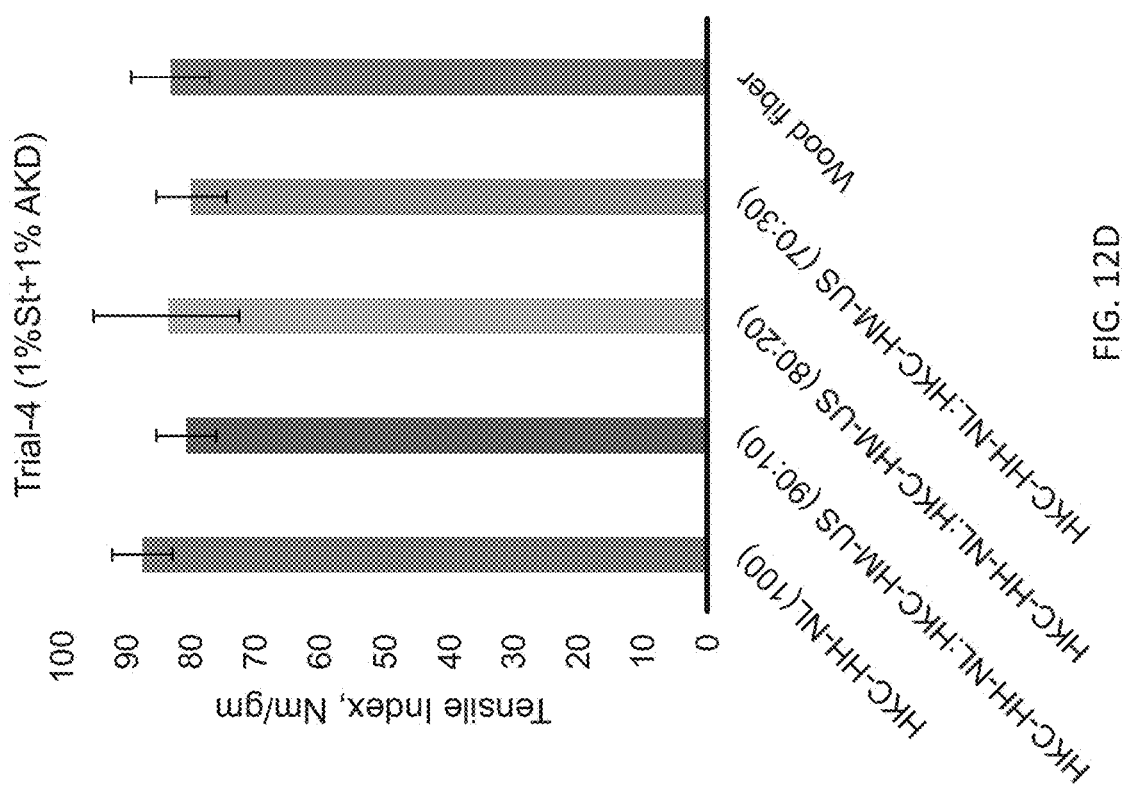

In trial 3 (see FIG. 12C), HKC-HM-US, which has a higher fiber length, was used with HKC-HH-NL (HKC-HH-NL:HKC-HM-US-70:30) and cocoa pod husk with wood fiber (HW:SW:CPHC-70:20:10). Hemp mix has both the long bast fiber and short hemp fiber, where both of these fibers have good strength, hence sample HKC-HH-NL:HKC-HM-US (70:30) with additives had a higher tensile index than other samples. In the case of wood fiber combined with CPHC ((HW:SW:CPHC-70:20:10), the sample had a higher tensile index value compared to the wood fiber sample value from previous trials. Without being bound to any one theory, it is believed to be the result of the presence of a high percentage of fibrillated CPHC. In trial 4 (see FIG. 12D), hemp mix was utilized at different percentages with hemp hurds and all the values were found to be close to each other. In trial 5 (see FIG. 12E), hemp mix and softwood were used at the same percentage with hemp hurds but in different refining conditions (2.5 k rev and 5 k rev). Here, HKC-HH-NL:HKC-HM-US (2.5 k rev) (70:30) and HKC-HH-NL:SW (2.5 k rev) (70:30) samples showed a high tensile index. Both softwood and hemp mix samples had good strength. Further, the refining enhanced bonding between fibers through fibrillation and fine generation [29]. The rejects from hemp mix pulping HKC-HMR-US were also utilized here along with hemp hurds; however, the tensile index was not that high.

Figure 13B:
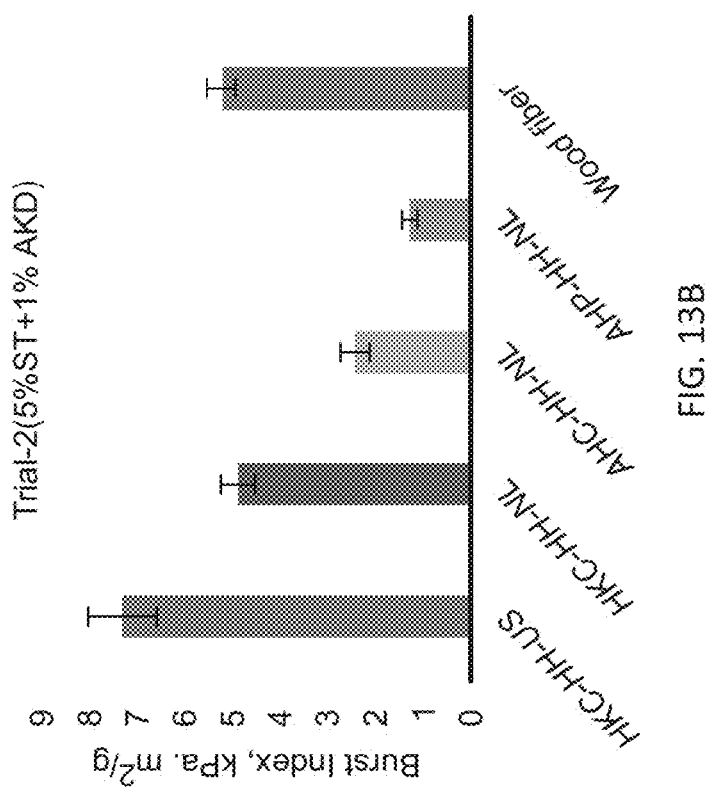
FIGS. 13A-13E are a series of graphs showing the effects of fiber type, furnish, additive, and refining on burst strength (reported as Burst Index, measured as kilopascals (kPa) divided by grammage (grams per square meter (g/m$^2$)), i.e., kPa·m$^2$/g).
Figure 13A:
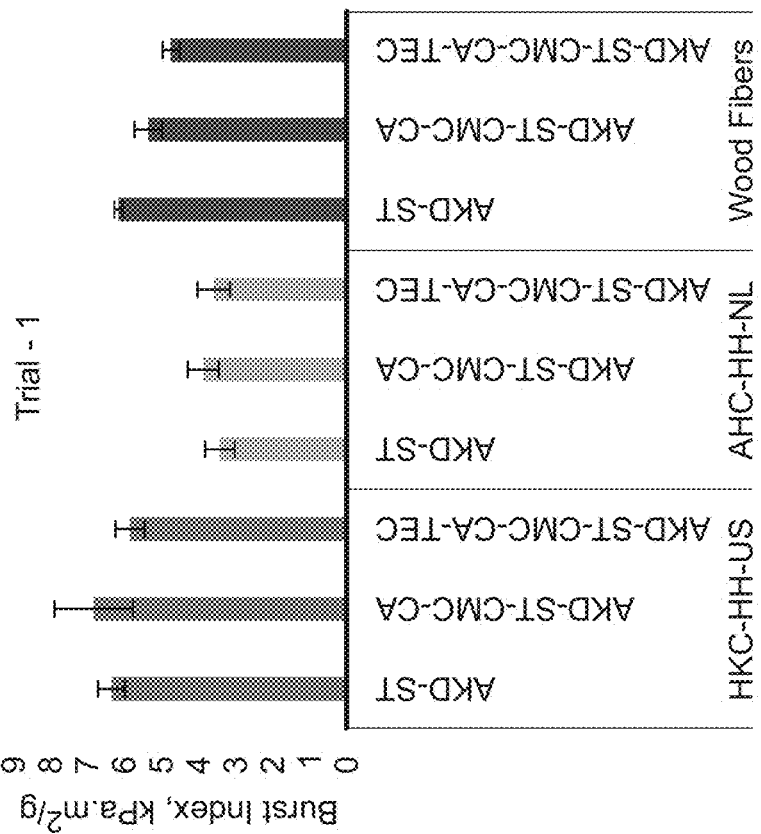

Effects of fiber types and additives on strength properties-Burst Strength: Burst strength is the resistance to paper rupture. Burst index and tensile index are closely related and are influenced by similar parameters. Both burst and tensile index increases with the addition of additives like cationic starch [49]. In trial 1 (see FIG. 13A), it can be observed for HKC-HH-US and AHC-HH-NL pulps that the samples containing starch, AKD, CA, CMC have comparatively high burst index, which is observed in the case of the tensile index as well.

Figure 13C:
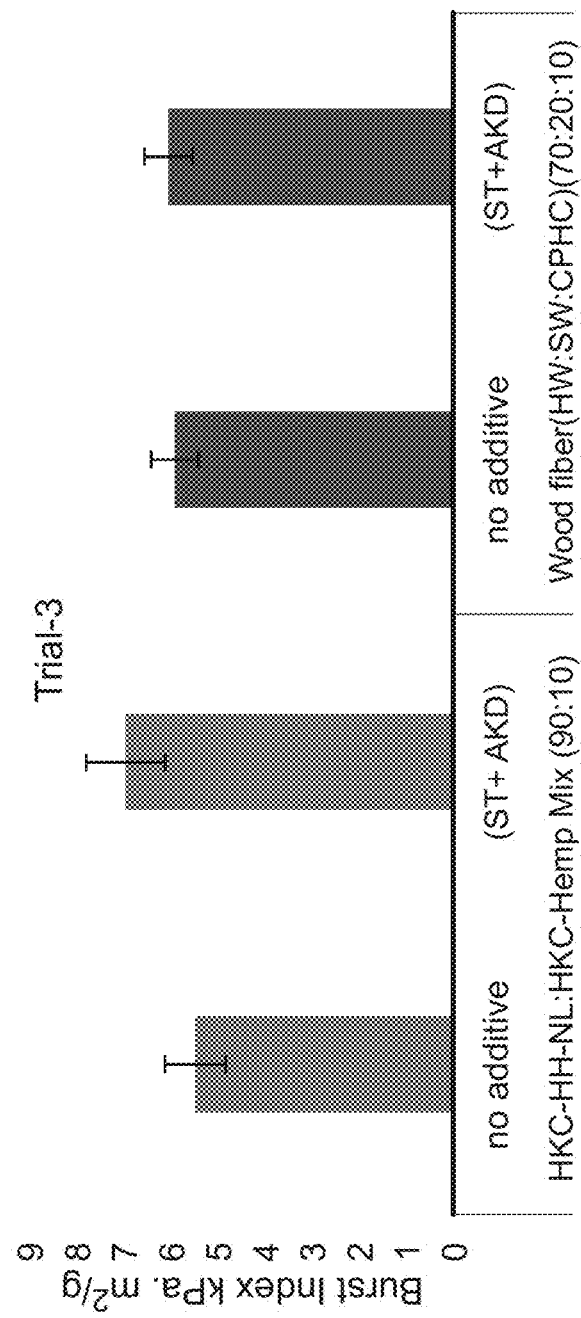
Figure 13E:
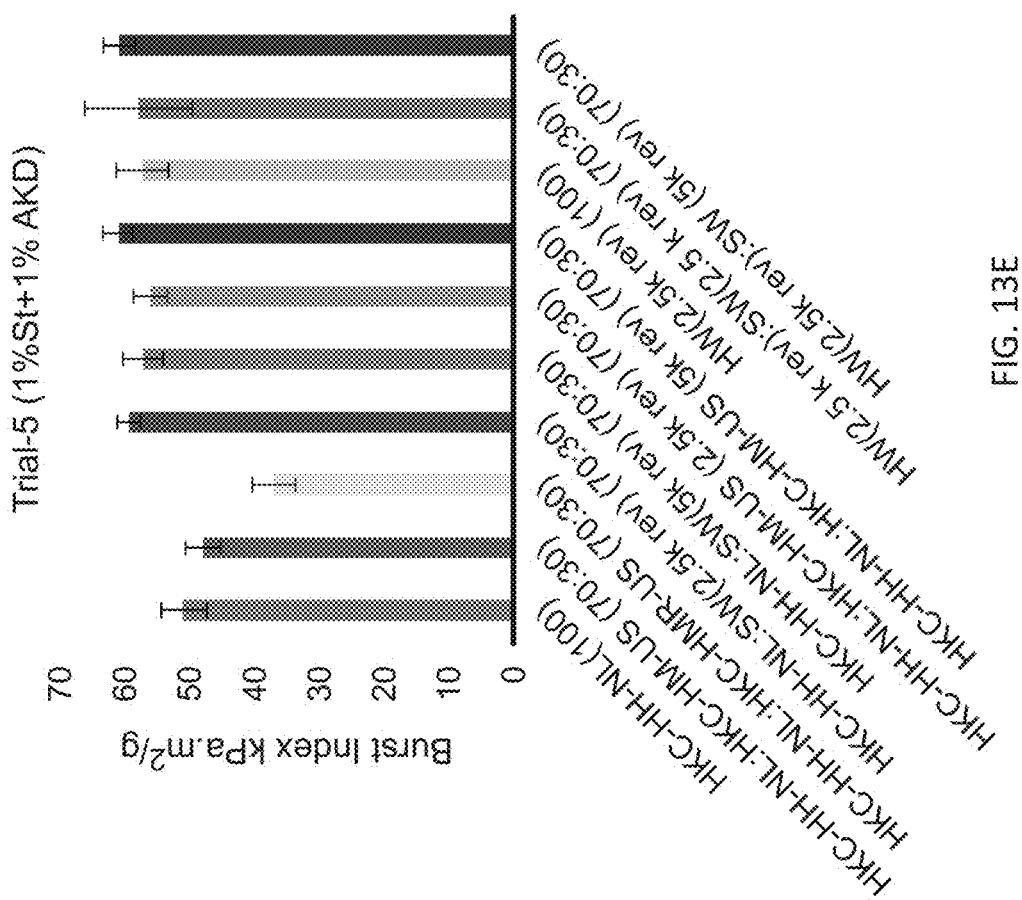
Figure 13D:
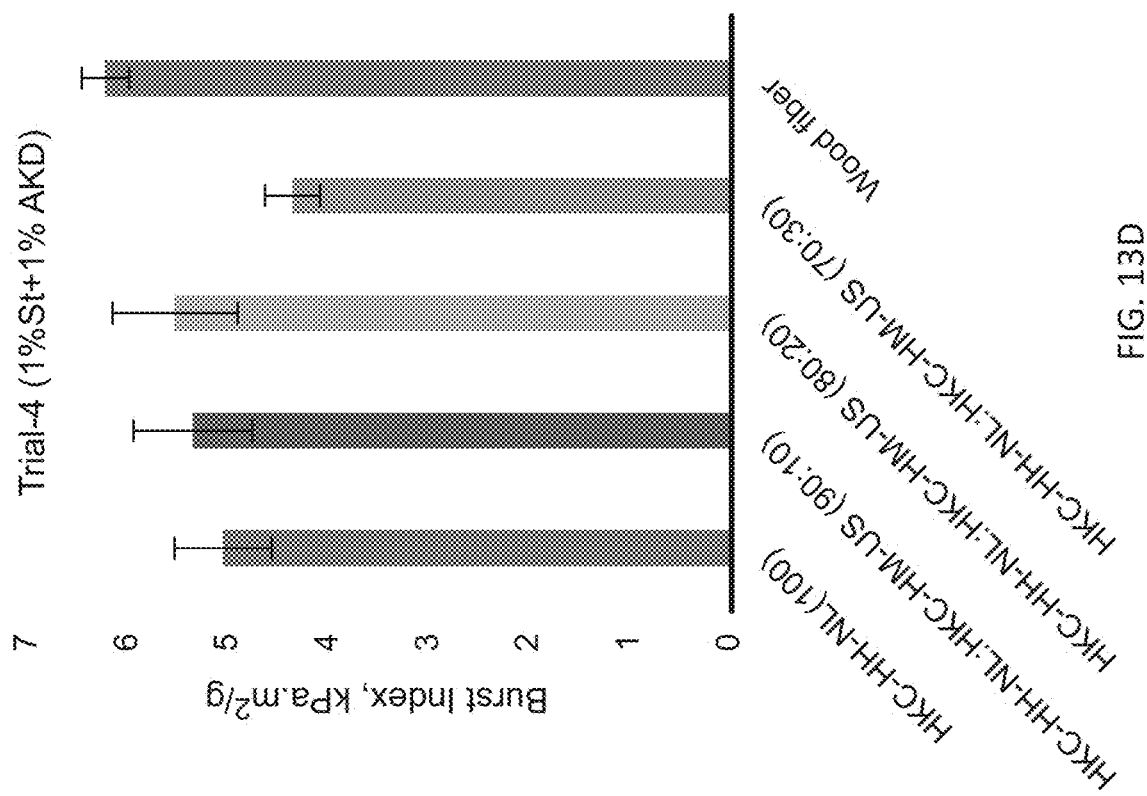
Figure 14B:
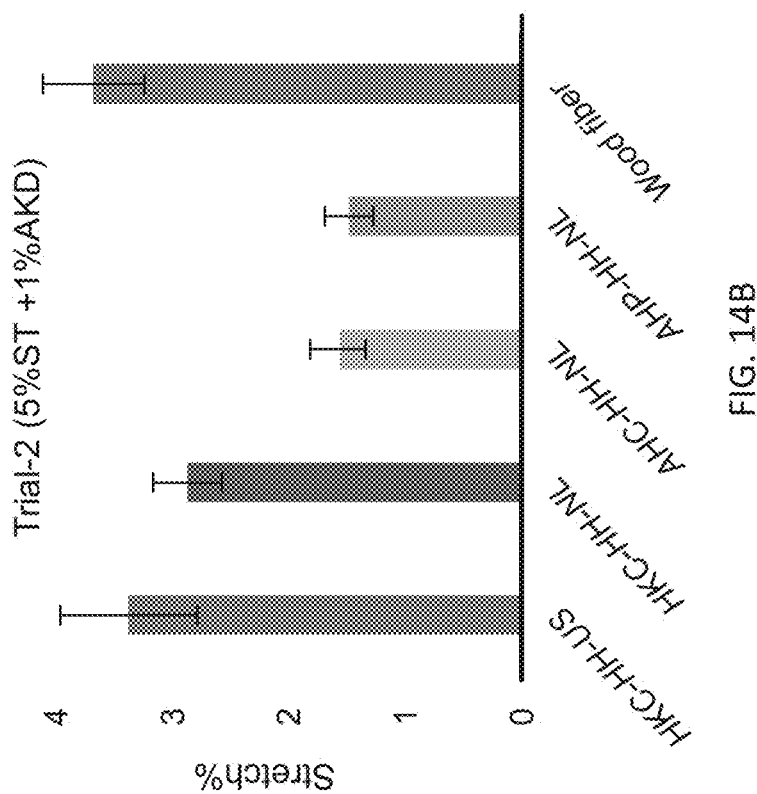
FIGS. 14A-14E are a series of graphs showing the effects of fiber type, furnish, additive, and refining on stretch (measured as a percentage (%)).
Figure 14A:
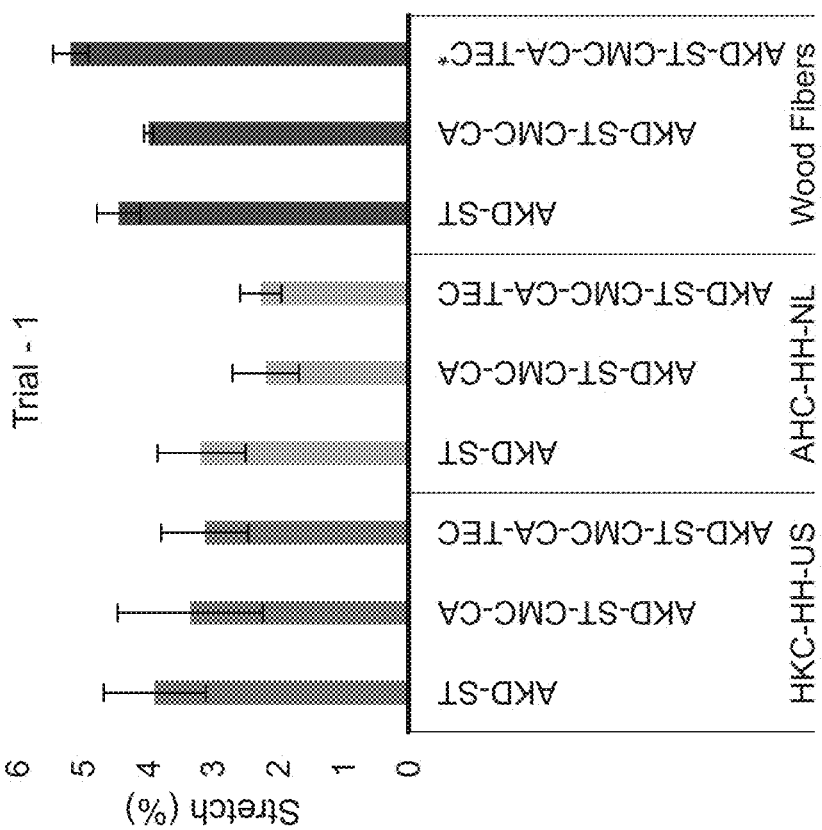
Figure 14C:
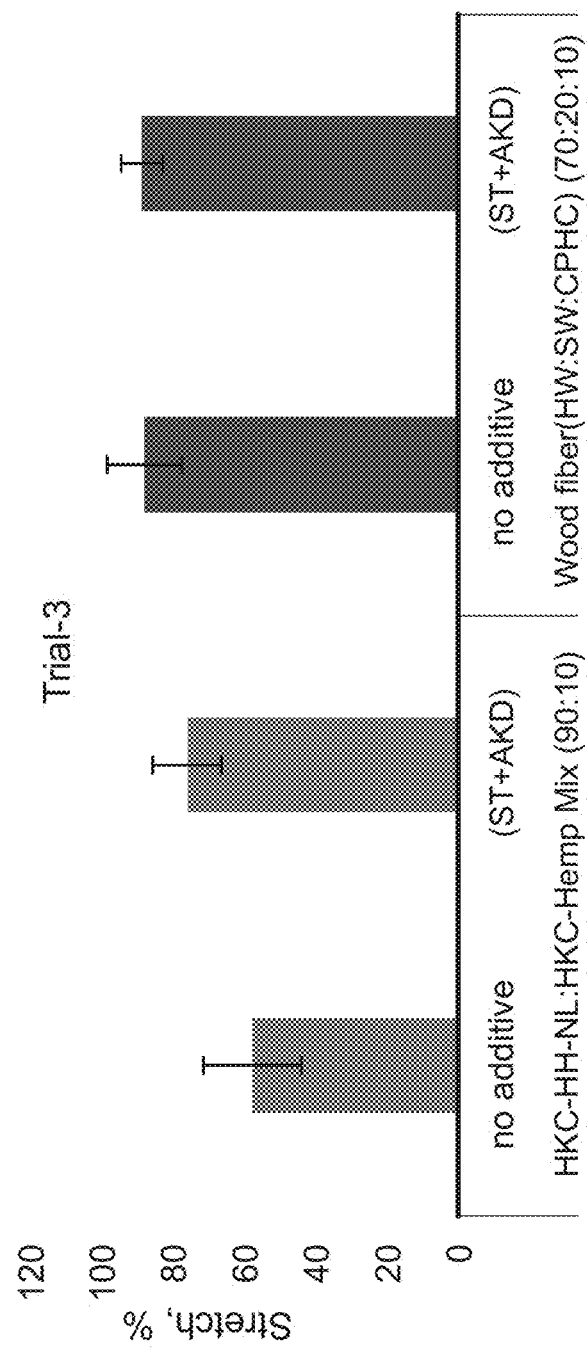
Figure 14E:
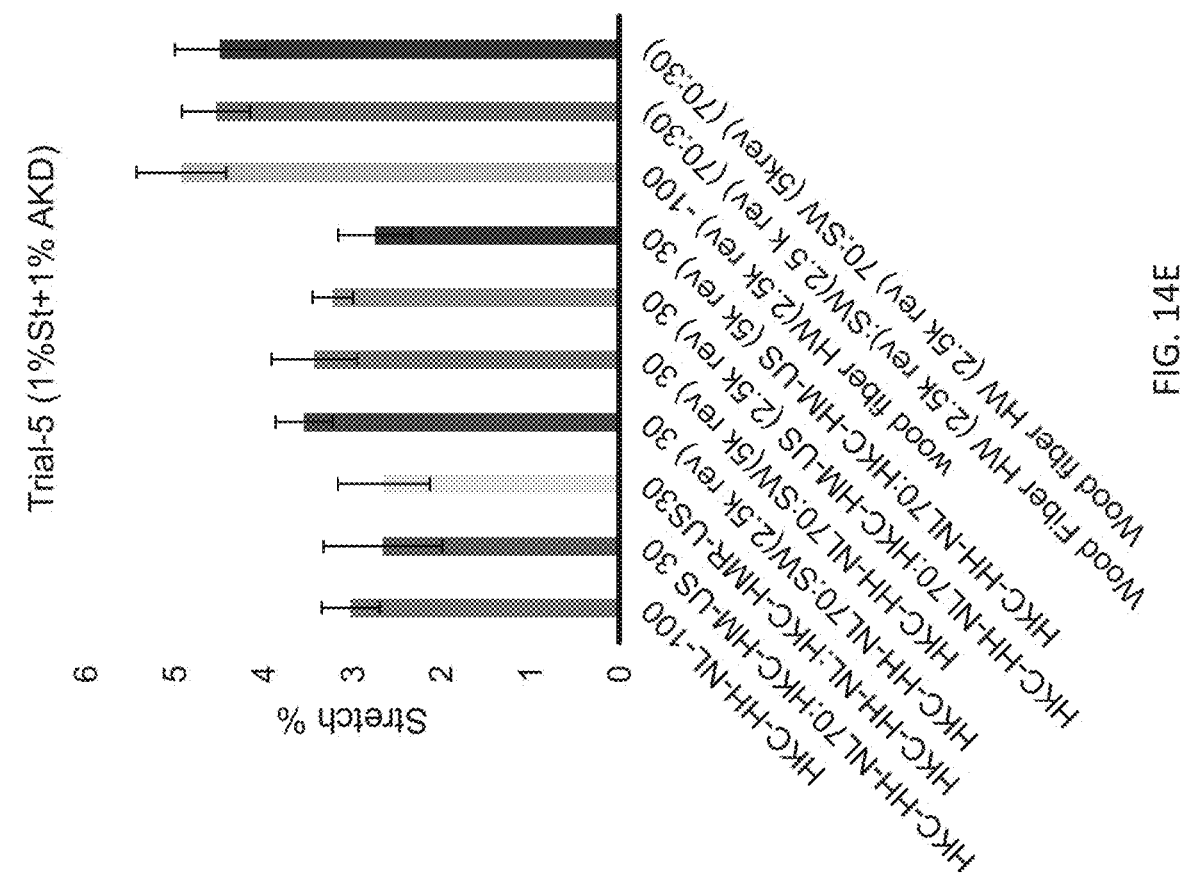
Figure 14D:
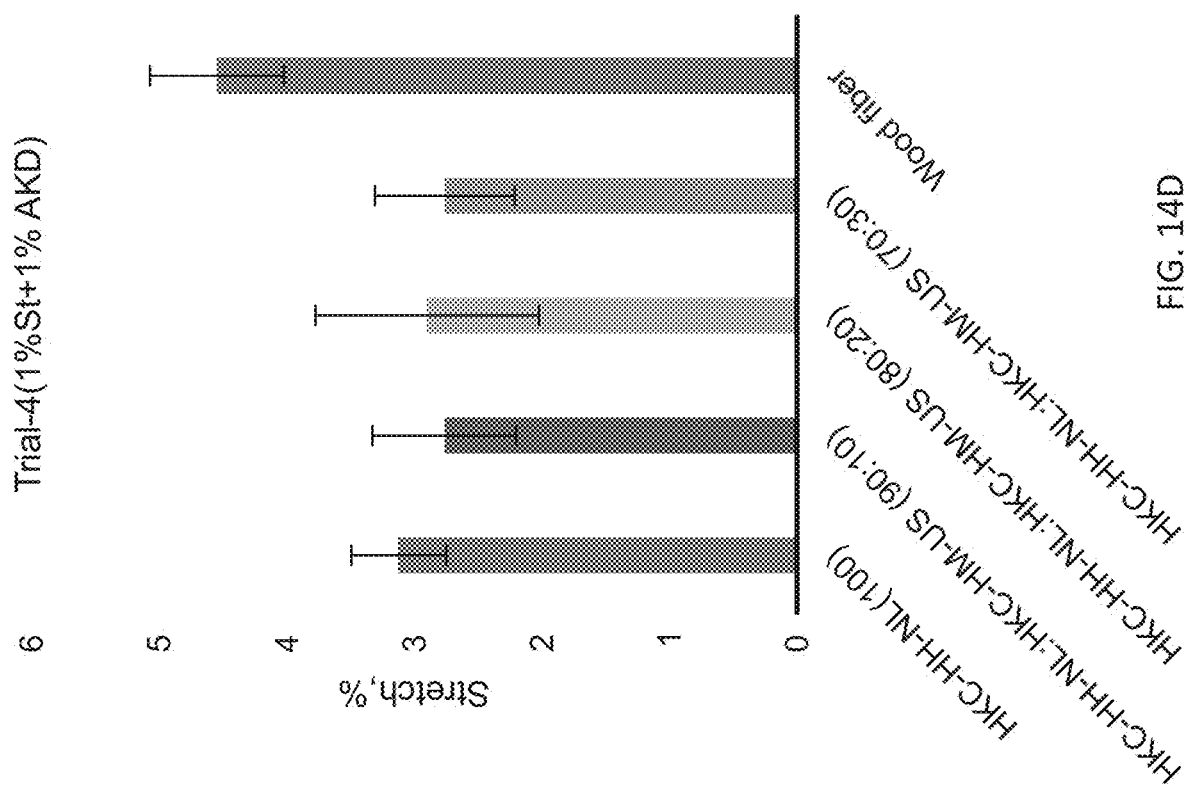

In trial 2 (see FIG. 13B), HKC-HH-US the fiber sample had the highest burst index, followed by wood fiber, HKC-HH-NL, AHC-HH-NL, and AHP-HH-NL. HKC-HH-US showed the highest tensile index, which indicates its high fiber strength bonding ability. Also, morphology plays an important role in burst strength. Fiber length and fines content are accounted for 99.9% and 98.9% variations in the burst index, respectively [50]. In this trial, though wood fiber had comparative fiber length and fine content, wood fiber had a higher burst index followed by HKC-HH-NL. In trial 3 (see FIG. 13C), the burst index values showed a similar trend as the tensile index. In trial 4 (see FIG. 13D), hemp mix was utilized at different percentages with hemp hurds. Here, the HKC-HH-NL:HKC-HM-US (70:30) sample had the lowest burst index. The tensile index was also low for this sample. Besides fines content, fiber width is also an important parameter for burst strength [50]. FQA data shows that HKC-HM-US had lower width fibers than HKC-HH-NL.

HKC-HM-US, which had a higher fiber length, was used with HKC-HH-NL (HKC-HH-NL:HKC-HM-US-70:30) and cocoa pod husk with wood fiber (HW:SW:CPHC-70:20:10). Hemp mix has both the long bast fiber and short hemp fiber, where both of these fibers have good strength, hence the sample HKC-HH-NL:HKC-HM-US (70:30) with additives has a higher tensile index than other samples. In the case of wood fiber combined with CPHC ((HW:SW:CPHC-70:20:10), the sample had a higher burst index value compared to the wood fiber value from previous trials. One reason for this result can be the presence of a high percentage of the fibrillated fibers of CPHC. In trial 5 (see FIG. 13E), the samples HKC-HH-NL:HKC-HM-US (2.5 k rev) (70:30) and HKC-HH-NL:SW (2.5 k rev) (70:30) showed high burst index, which followed a similar trend as the tensile index. Both softwood and hemp mix shad good strength. Further, refining increased the fibrillation and surface area, which improved the burst strength. The rejects from hemp mix pulping HKC-HMR-US was also utilized here, along with hemp hurds. However, the burst index wasn't affected.

Effects of fiber types and additives on strength properties-Stretch: Effects of fiber types, furnish, additive, refining was analyzed on the stretch. It has been observed that wood fiber (HW:SW-70:30) has the highest stretch. The reason can be its high fiber length. In the case of other hemp pulps (see FIGS. 14A-14E), a similar trend was followed as for tensile index. This result is believed to be based on additives and fine content improving the stretch value of paper [47].

Figure 15B:
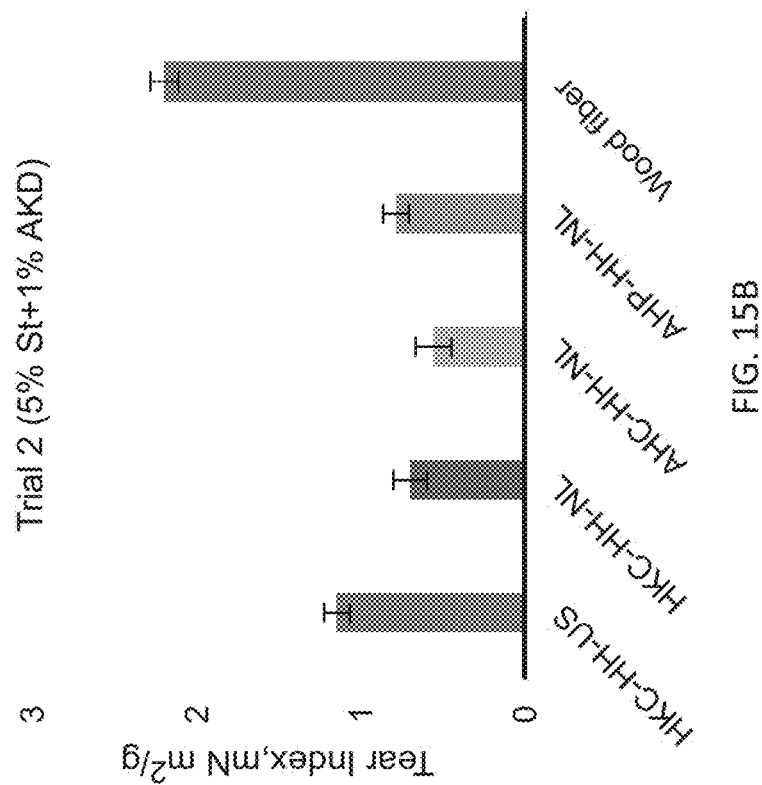
FIGS. 15A-15E are a series of graphs showing the effects of fiber type, furnish, additive, and refining on tear strength (reported as Tear Index (tear strength/grammage), measured in milliNewtons (mN) times square meters per gram (m$^2$/gm).
Figure 15A:
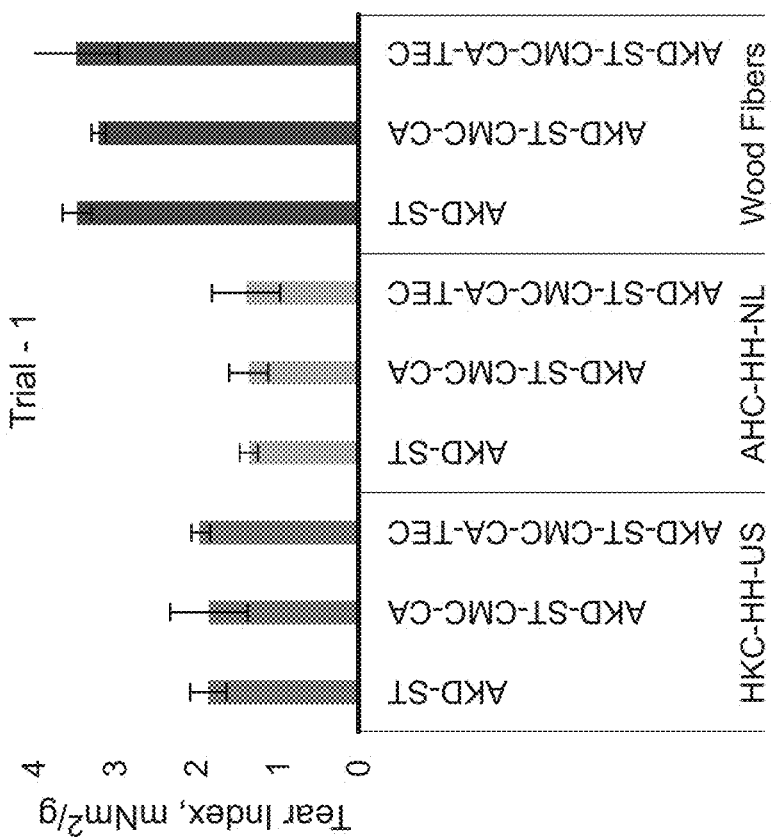
Figure 15C:
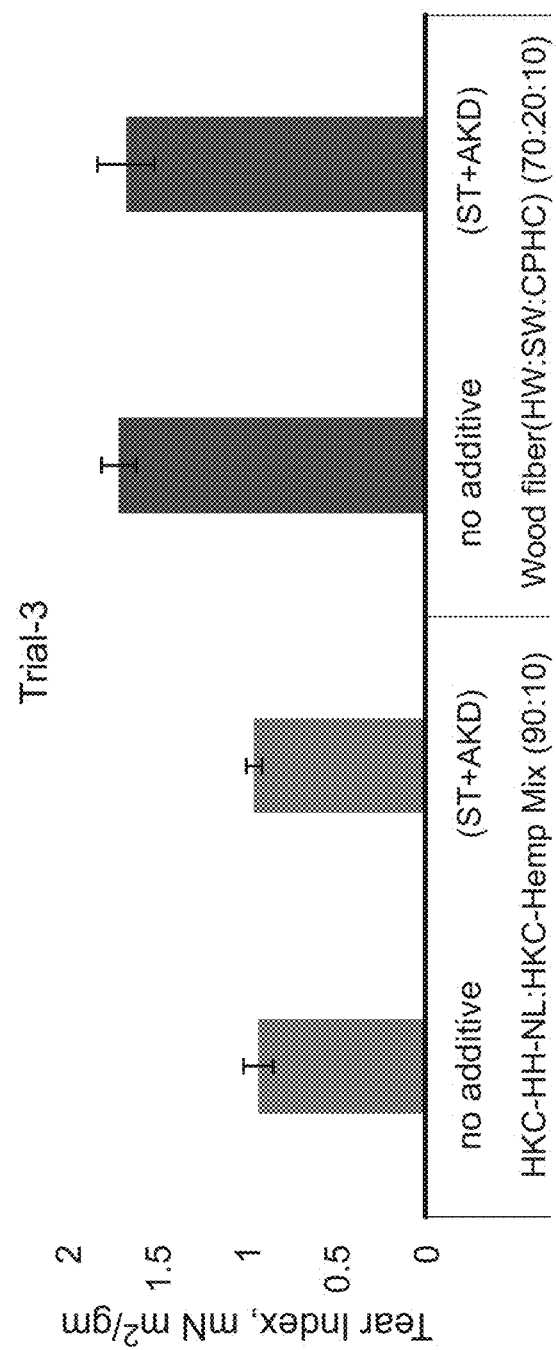

Effects of fiber types and additives on strength properties-Tear Strength: The tear index and the tensile index are inversely related to each other. In the case of tear index, the additives did not play a significant role in trial 1. See FIG. 15A. Hence, trial 2, 3, 4, and 5 were focused here where the additive conditions were kept similar. The tear index is mostly affected by fiber length and fines content. In trial 2 (see FIG. 15B), the tensile index was highest for wood fiber, followed by HKC-HH-US, AHP-HH-NL, HKC-HH-NL, AHC-HH-NL. Without being bound to any one theory, the reason can be attributed to fiber length. The fiber length of wood fiber is highest, followed by HKC-HH-US. In the case of three hemp pulps, even though their tear index and fiber lengths were pretty close, AHP-HH-NL has the highest curl index as it went through the least vigorous pulping and bleaching or brightening process. Hence AHP-HH-NL has a higher tear index [51]. To increase the tear index of the hemp hurds (HKC-HH-NL) sheet, hemp mix long fibers were added in the ratio of 90:10 in trial 3. See FIG. 15C. The tear index of 90:10 hemp hurds and hemp mix furnish increased (0.94 mN g/m$^2$) when compared to trial 2, where 100% HKC-HH-NL (0.68 mN g/m$^2$) was used.

Figure 15E:
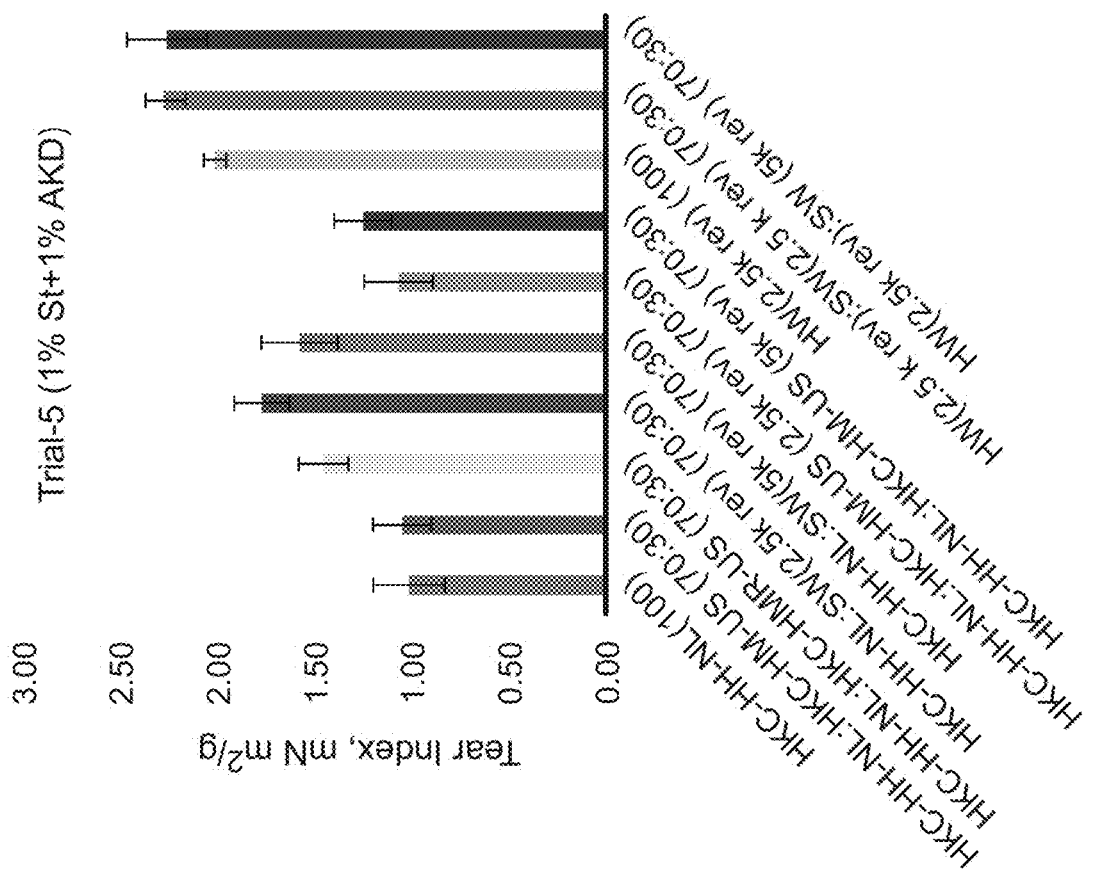
Figure 15D:
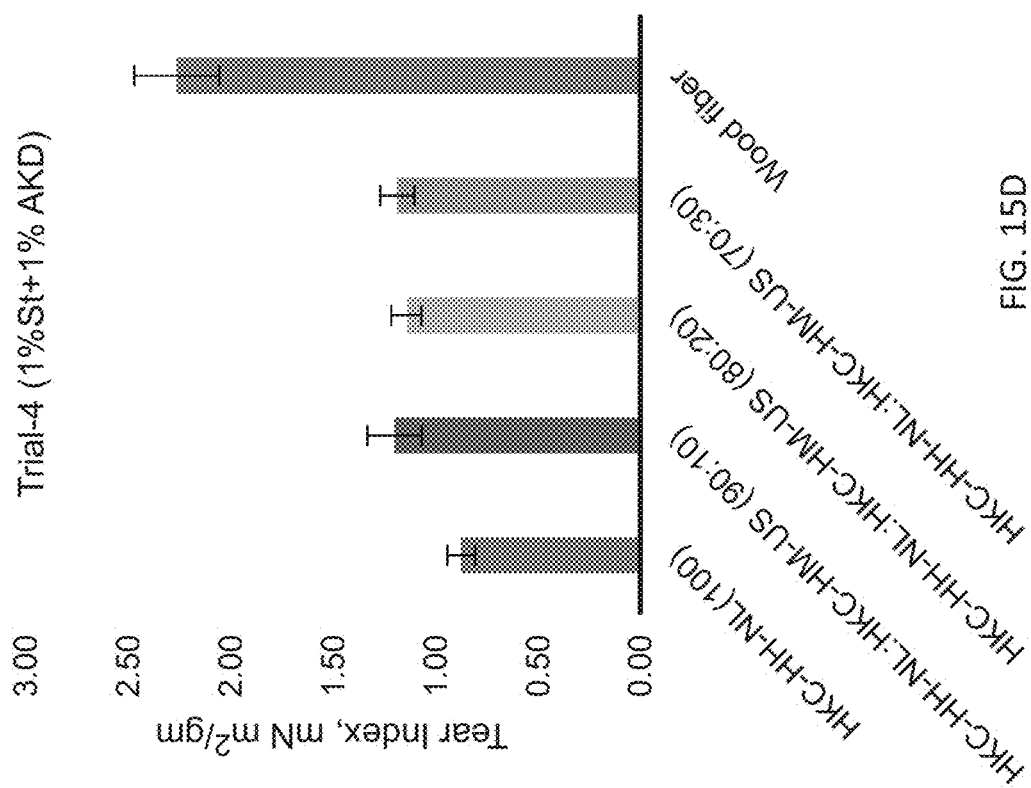

In trial 4 (see FIG. 15D), hemp mix fibers were added at different levels (90:10, 80:20, 70:30). The tear index increased with the addition of hemp mix fibers. However, there was not a significant change in tear index after the 10% hemp mix. Therefore, a higher level of (70:30) hemp mix fibers were used in trial 5. See FIG. 15E. Since the hemp mix and softwood are long fibers, these were refined in PFI refiner at 2.5 and 5 k rev. The sample HKC-HH-NL:SW (2.5 k rev) (70:30) showed the highest tear index, followed by HKC-HH-NL:SW (5 k rev) (70:30), HKC-HH-NL:HKC-HMR-US (70:30), HKC-HH-NL:HKC-HM-US (5 k rev) (70:30), HKC-HH-NL:HKC-HM-US (2.5 k rev) (70:30), HKC-HH-NL:HKC-HM-US (70:30), HKC-HH-NL 100. As mentioned earlier, softwood has the highest fiber length. Increased refining reduces the tear strength. Hence the tear of hemp sample with 2.5 k refined was higher than the hemp sample with 5 k refined. However, a different trend was observed in the case of refined hemp mix. Here, the hemp sample with a 5 k refined hemp mix had a higher tear than the sample with a 2.5 k refined, partly due to very high fiber length of unrefined hemp mix fibers.

Figure 16B:
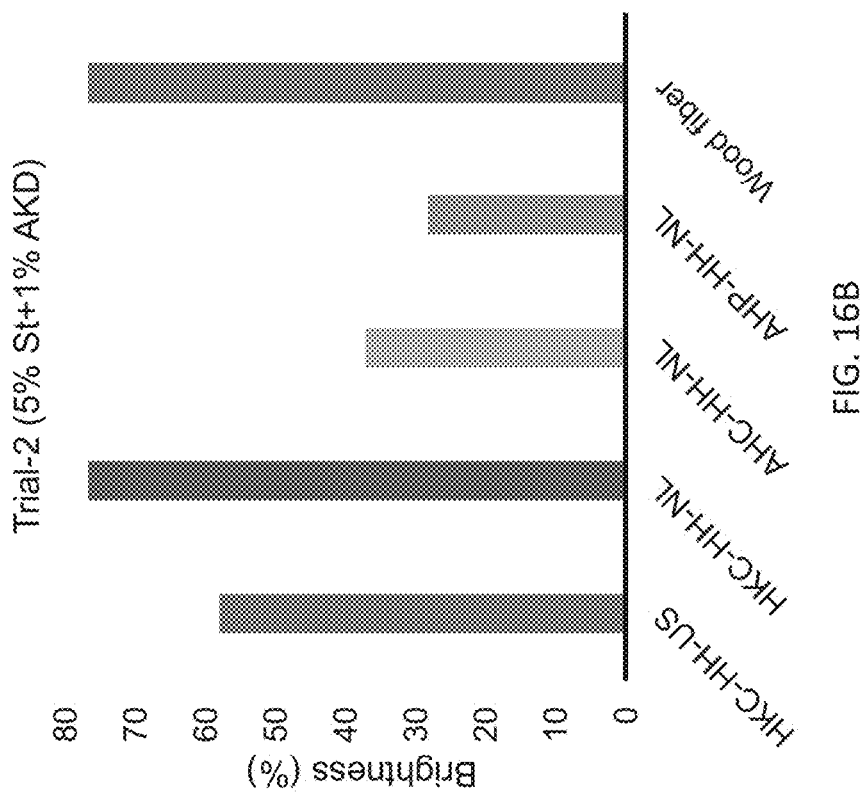
FIGS. 16A-16E are a series of graphs showing the effects of fiber type, furnish, additive, and refining on ISO brightness (measured as a percentage (%)).
Figure 16A:
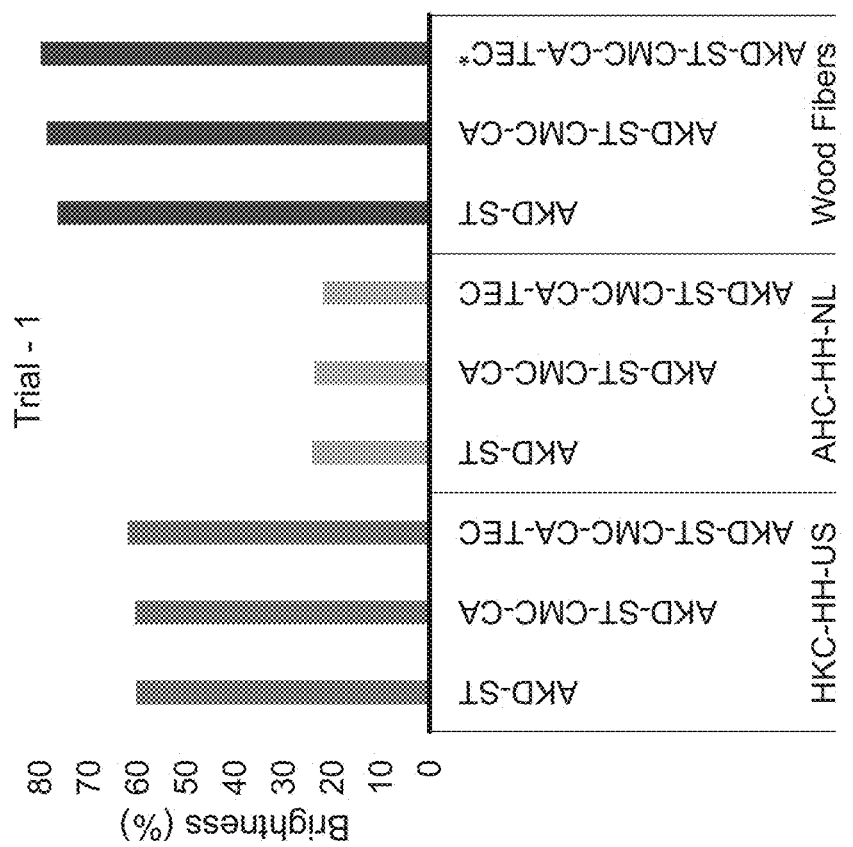
Figure 16C:
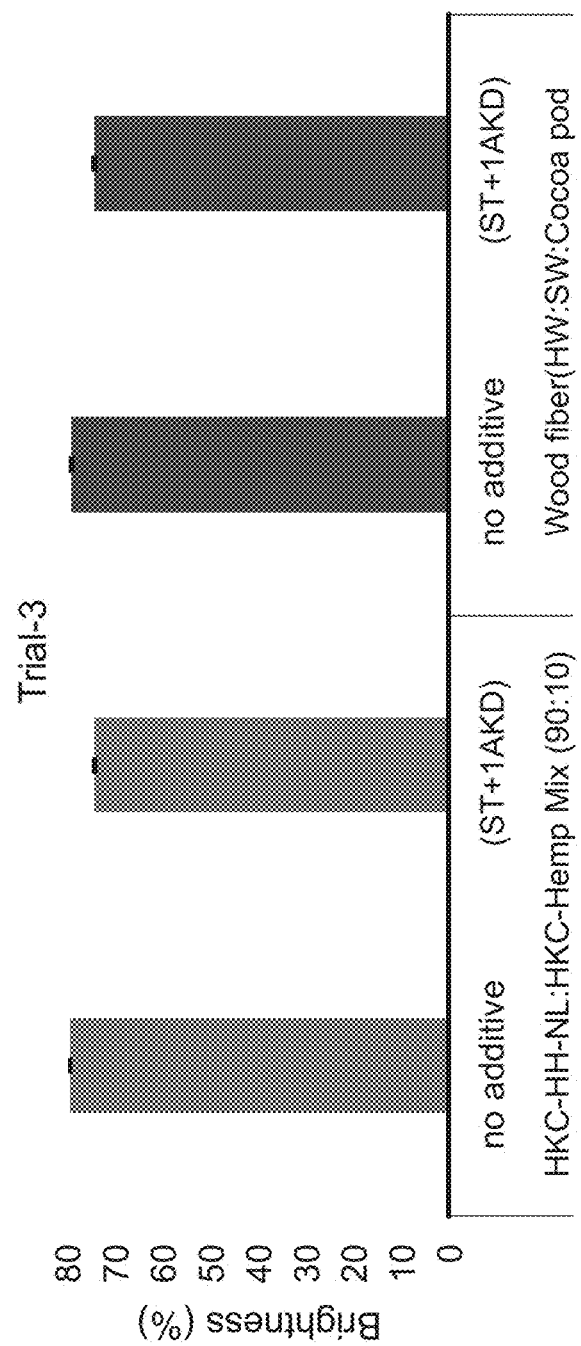
Figure 16E:
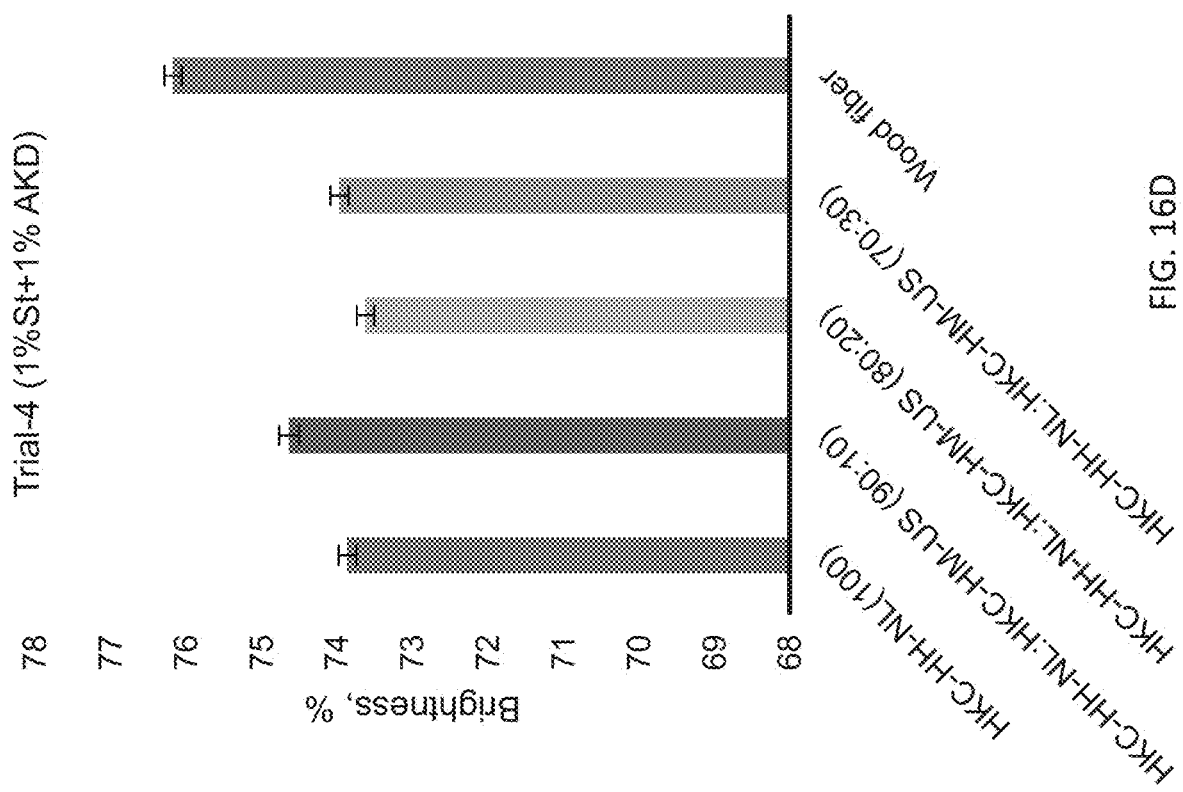
Figure 16D:
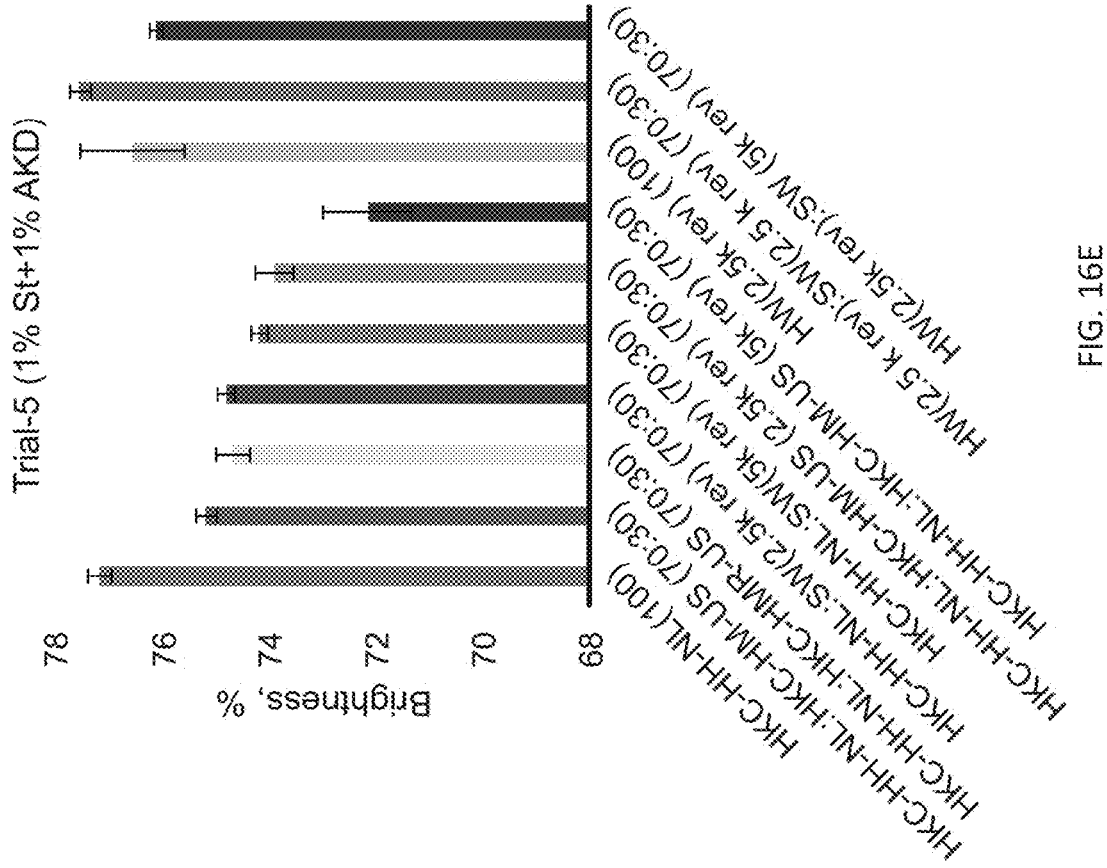

Effects of fiber types and additives on brightness: Here, among trials 1 and 2 (see FIGS. 16A and 16B, AHP-HH-NL had the lowest brightness due to the presence of the highest amount of lignin. In trial 3 (see FIG. 16C), it was been observed both for hemp pulp and wood fiber that the addition of additives caused a reduction of brightness, possibly due to reduction in light scattering due to closing of the sheets. In trial 4 (see FIG. 16D), HKC-HH-NL with additive was disc refined. In contrast, in trial 5 (see FIG. 16E), HKC-HH-NL was disintegrated and the brightness was higher than trial 4. The effect of furnish has also been observed. The addition of hemp mix rejects and softwood caused a reduction in brightness than 100% hemp pulp.

Figures 17A, 17B:
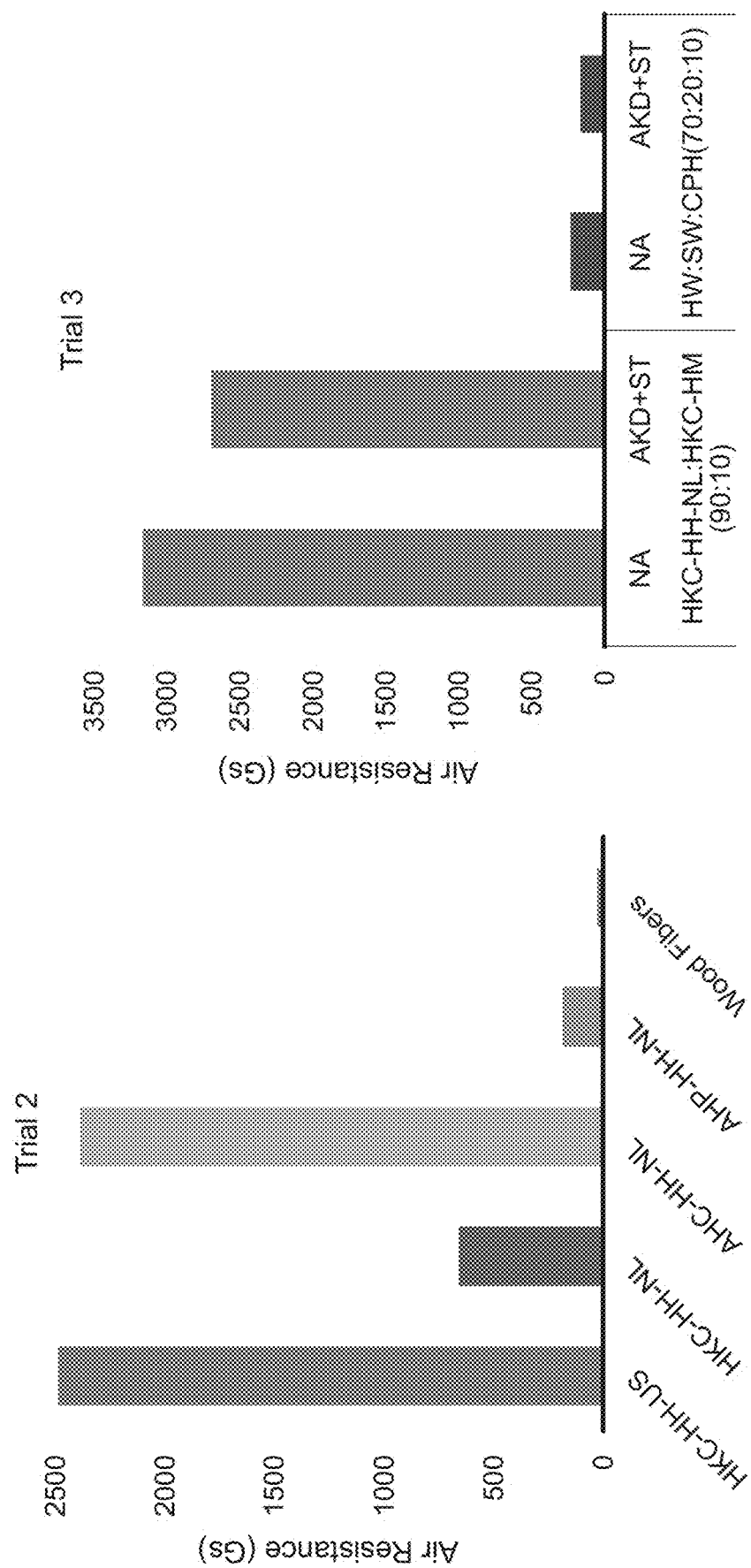
FIGS. 17A-17D are a series of graphs showing the effects of fiber type, furnish, additive, and refining on air resistance (reported in Gurley seconds (Gs)).

Effects of fiber types and additives on porosity: A low porosity or high air resistance can be of interest for packaging papers [52]. Both the fiber properties and additives can affect the porosity of paper. The effect of additives on porosity was analyzed in trial 1. As mentioned earlier, additives such as starch can enhance air resistance to a large extent. In the case of trial 1, except for wood fiber, both the HKC-HH-US and AHC-HH-NL showed very high air resistance. In trial 2, different types and processed fibers were used where HKC-HH-US showed the highest air resistance, followed by AHC-HH-NL, HKC-HH-NL, AHP-HH-NL, and wood fiber. See FIG. 17A. HKC-HH-US was PFI refined; hence, the fibers have good internal fiber bonding due to collapsing and high fines content, which increases the air resistance (i.e., low porosity). As for AHC-HH-NL, even though it is not a kraft pulp, the fines content is very high. The fines content of HKC-HH-NL was comparatively lower than AHC-HH-NL; hence, the air resistance is lower than HKC-HH-NL. AHP-HH-NL has higher fines content than HKC-HH-NL; however, due to autohydrolysis pulping and peroxide bleaching, its internal fiber bonding is low. Hence, low porosity. In the case of wood, the longer fiber length makes the paper structure more porous and causes low air resistance.

Figure 17D:
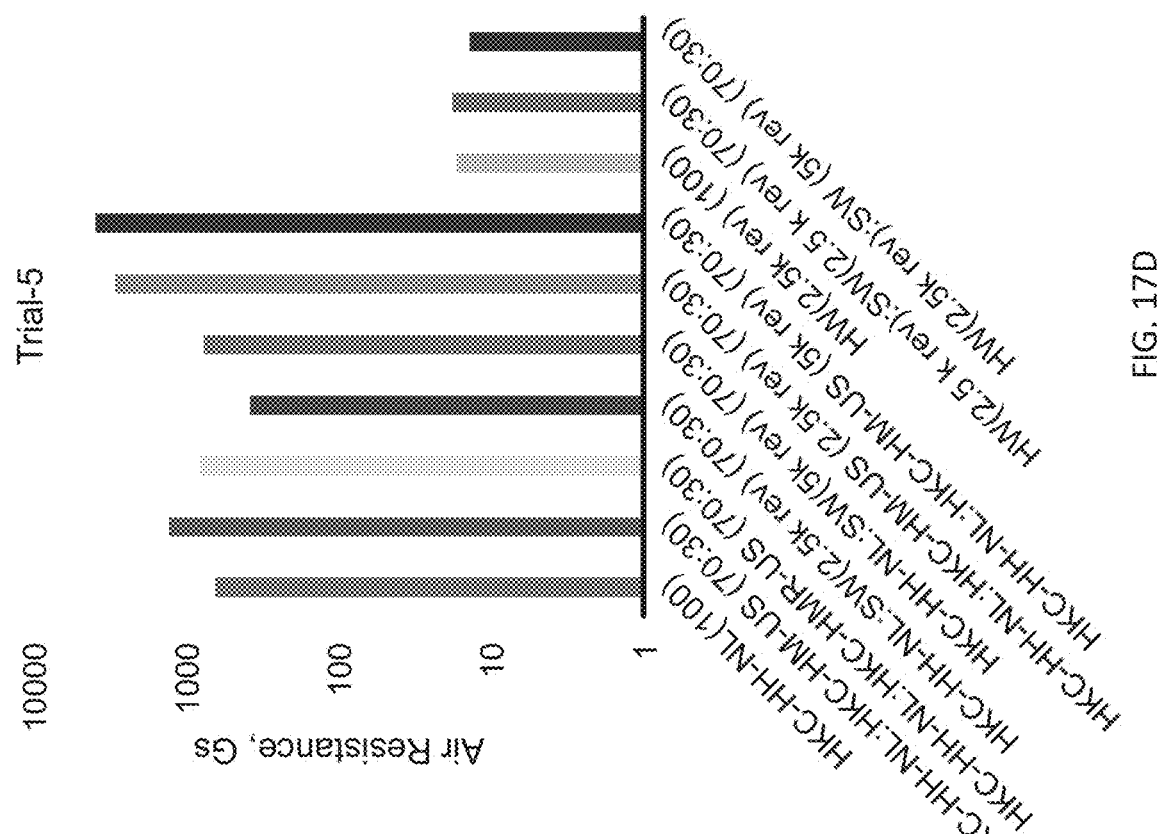
Figure 17C:
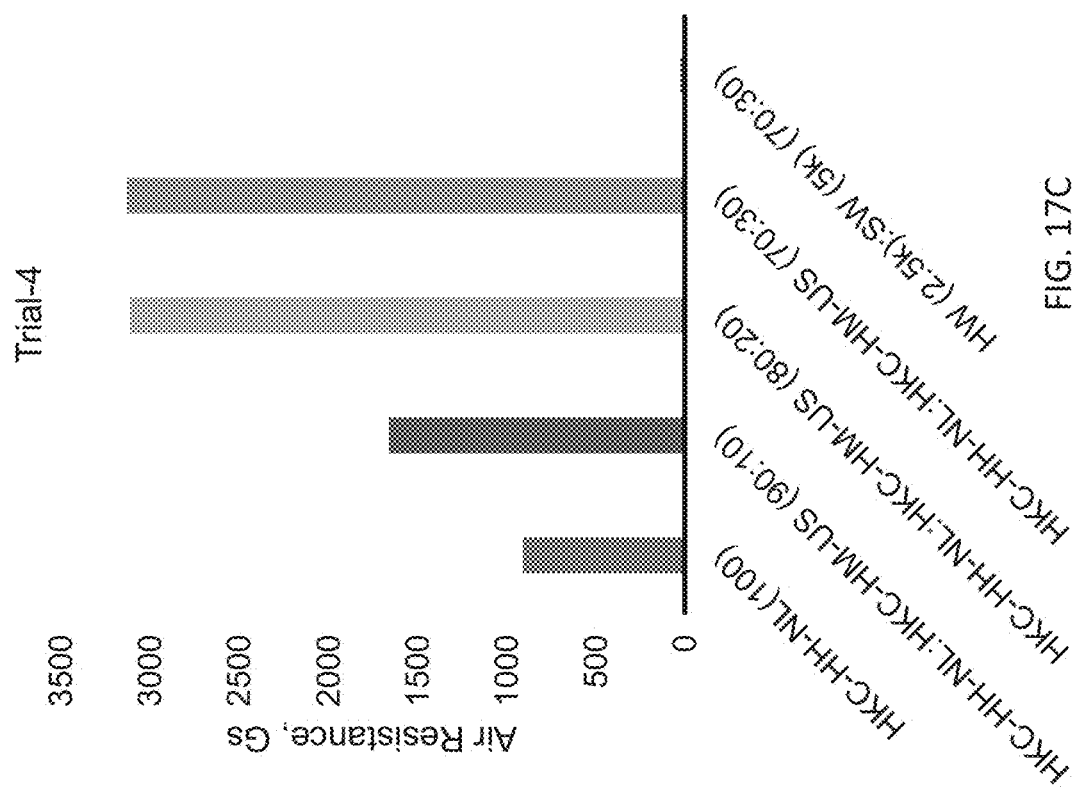

In trial 3, the effect of additives and furnish conditions on porosity was analyzed. See FIG. 17B. Here, 10% hemp mix was used with 90% HKC-HH-NL. Even though hemp mix is a comparatively longer fiber pulp than HKC-HH-NL, its fines content is also high. It has been observed that this furnish condition shows good strength properties due to the improved fiber bonding and hence may provide good air resistance. The presence of additives did not significantly change the air porosity in both the wood and hemp samples. However, the presence of 10% cocoa pod husks did improve the air resistance in the wood fibers since it has a high fines content. In trial 4, different percentages of hemp mix were added with HKC-HH-NL. See FIG. 17C. Here it has been observed that the addition of 30% hemp mix has the highest air resistance. The reason can be attributed to fibrillation and internal fiber bonding.

Since, in trial 4, the hemp sample with 30% Hemp mix showed the highest air resistance, in trial 5, the hemp mix percentage was kept 30% with two refining conditions 5 k and 2.5 k rev in PFI refiner. For comparison, softwood was also mixed in these two refining conditions with hemp hurds at 30% conditions. Here it was observed that samples with 5 k refined hemp and 2.5 k refined hemp mix showed high air resistance due to their better bondability and fine percentage. See FIG. 17D. Samples with softwood were also good; however, due to the long fiber of softwood, their air resistance was not as good as the sample with hemp mix. Sample with hemp rejects showed comparatively good air resistance, but due to their long fiber and low refining, air resistance wasn't as high as the sample with hemp mix.

SUMMARY

Agricultural residues and by-products biomass were evaluated as bioresources for alternative fibers and flexible packaging paper development. High-yield hemp fibers with a range of brightness from high kappa kraft and autohydrolysis (nearly chemical-free) pulping followed by conventional elemental chlorine-free bleaching and peroxidation brightening techniques were used for base paper development. Cocoa pod husks fibers from high kappa kraft and conventional bleaching were also studied as a filler/strength aid due to their high level of fines content. Wood fibers were used as a control. The different fibers were mechanically treated at different levels to achieve the desired strength while maintaining the drainage. Various chemical additives such as starch, AKD, CA, CMC, and TEC were studied to enhance the strength, air resistance, and flexibility of the base sheet.

The presence of additives increased air resistance to a larger extent. 100% high kappa kraft conventionally bleached/brightened hemp fiber both from the United States and the Netherlands, showed excellent tensile index, especially the hemp hurds from the United States, which showed higher tensile index than the ones from the Netherlands. However, hemp hurds gave the low tear strength due to shorter fiber length. This can be improved by adding a small amount of long fibers. The addition of hemp mix and softwood was able to improve the tear index by 56% at 5 k rev and 77% higher at 2 k rev, respectively. Hemp mix, rejects from hemp mix and softwood were also utilized at two different refining conditions to observe the effects on other properties. The presence of refined hemp mix was able to provide a similar tensile index and comparatively better burst index than the 100% hemp hurds. Not only the strength properties but the presence of hemp mix also improved the air resistance. The brightness of the conventionally bleached/brightened sample was relatively close market pulp. However, autohydrolyzed pulp, both conventional and peroxide bleached/brightened samples, had relatively low brightness due to the presence of lignin (37 ISO and 27 ISO, respectively). Overall, these results indicate that hemp-based paper is suitable for packaging.

Example 3

Exemplary Converting Process

Handsheets from selected alternative fibers were used to make packaging materials for chocolate candy bars. First, the hand sheets produced from 100% hemp (hemp hurds: hemp mix; 70:30 or 100% hemp hurds) were trimmed to 8.5"×11" sheets. Then the sheets were printed with a color electrophotographic digital printer. The printed sheet with chocolate candy bar brand images was folded, creased, wrapped over the respective chocolate candy bar and slitted. The packages looked substantially similar to conventional candy bar packages.

REFERENCES

All references listed below, as well as all references cited in the instant disclosure, including but not limited to all patents, patent applications and publications thereof, scientific journal articles, and database entries are incorporated herein by reference in their entireties to the extent that they supplement, explain, provide a background for, or teach methodology, techniques, and/or compositions employed herein.

1. Gutta R, Wan H Da, Kuriger G (2013) Packaging materials selection tool considering environmental sustainability. *IIE Annual Conference and Expo* 2013, 3706-3715.
2. Smithers (2018) Market Value Estimations for Packaging in 2018 and Beyond.
3. MacArthur D., Waugray D, Stutchey M. (2016) The new plastics economy, rethinking the future of plastics. *World Economic Forum,*
4. Jambeck J R, Geyer R, Wilcox C, Siegler T R, Perryman M, Andrady A, Narayan R, Law K L (2015). *Science,* 347 (6223): 768-771.
5. Environment ECD-G (2011) Plastic waste: ecological and human health impacts. *Sci Environ Policy.*
6. Abdul Khalil H P S, Davoudpour Y, Saurabh C K, Hossain M S, Adnan A S, Dungani R, Paridah M T, Mohamed Z I S, Fazita M R N, Syakir M I, Haafiz M K M (2016), *Renewable and Sustainable Energy Reviews,* 64:823-836.
7. Cherney, J. and E. Small, *Industrial Hemp in North America: Production, Politics and Potential.* Agronomy, 2016. 6: p. 58.
8. V. Naithani, P. Tyagi, H. Jameel, L. A. Lucia, L. Pal, *BioResources,* 2020, 15, 706.
9. Edyta M, Piotr P, Marcin D, Kamila B (2015). *Annals of Warsaw University of Life Sciences-SGGW. Forestry and Wood Technology,* 91:134-137.
10. Cruz, G., M. Pirilä, M. Huuhtanen, L. Carrión, E. Alvarenga and R. L. Keiski, 2012. Journal Civil and Environmental Engineering, 2 (2): 1-6.

11. Sanyang, M. L., S. M. Sapuan, and M. Haron, AIP Conference Proceedings, 2017. 1891 (1): p. 020126.
12. Abdul K A, et al.: J Cosmet Dermatol 2016, 15:283-295.
13. E. de Jong, R. J. A. Gosselink, in *Bioenergy Research: Advances and Applications* (Eds: V. K. Gupta, M. G. Tuohy, C. P. Kubicek, J. Saddler, F. Xu), Elsevier, Amsterdam 2014, pp. 277-313.
14. R. R. Gustafson, C. A. Sleicher, W. T. Mckean, B. A. Finlayso, *Ind. Eng. Chem. Process Des. Dev.* 1983, 22, 87.
15. X. Zhang, M. Tu, M. G. Paic, *BioEnergy Res.* 2011, 4, 246.
16. G. Brodeur, E. Yau, K. Badal, J. Collier, K. B. Ramachandran, S. Ramakrishnan, www.hindawi.com/journals/er/2011/787532/abs/(accessed: July 2019).
17. Y. Yamashita, M. Shono, C. Sasaki, Y. Nakamur, *Carbohydr. Polym.* 2010, 79, 914.
18. V. B. Agbor, N. Cicek, R. Sparling, A. Berlin, D. B. Levin, *Biotechnol. Adv.* 2011, 29, 675.
19. Barta, Z., et al., Chemical and Biochemical Engineering Quarterly, 2010. 24: p. 331-339.
20. Sezgi, U., et al., Effects of alkali charge and white liquor sulfidity on rapid displacement heating (RDH) kraft pulping. 1999. 15: p. 3-12.
21. K. Lyytikäinen, E. Saukkonen, I. Kajanto, J. Kayhko, BioResources 2011, 6, 219.
22. Z. Dang, T. Elder, A. J. Ragauska, Ind. Eng. Chem. Res. 2006, 45, 4509.
23. Salem, K. S., et al., Global Challenges, 2020. n/a (n/a): p. 2000065.
24. H. Zhang, C. Zhao, Z. Li, J. Li, Cellulose 2016, 23, 163.
25. O. Joutsimo, R. Wathén, T. Tamminen, Paperi ja puu 2005, 87, 392.
26. Ma X, Soh A K, Wang B (2004) A design database for moulded pulp packaging structure. *Packaging Technology and Science,* 17 (4): 193-204. DOI: 10.1002/pts.658.
27. Gominho J, Fernandez J, Pereira H (2001) Cynara cardunculus L.—A new fibre crop for pulp and paper production. *Industrial Crops and Products,* 13 (1): 1-10. DOI: 10.1016/S0926-6690 (00) 00044-3.
28. Chang C H, Yu S T, Perng Y S (2018) Effects of furnish and refining on properties of household paper. *Cellulose Chemistry and Technology,* 52 (5-6): 433-440.
29. Johansson A (2011) Correlations between fibre properties and paper properties. *Mater thesis in Pulp Technology.*
30. Santos R B, Jameel H, Chang H M, Hart P W (2013) Impact of lignin and carbohydrate chemical structures on kraft pulping processes and biofuel production. *Tappi Journal,* 12 (7): 23-31. DOI: 10.32964/tj12.7.23.
31. Groot B De, Dam J E G van, Der Z R P van, Riet K V. (2009) Simplified Kinetic Modelling of Alkaline Delignification of Hemp Woody Core. *Holzforschung—International Journal of the Biology, Chemistry, Physics and Technology of Wood,* 48 (3): 207-214. DOI: 10.1515/hfsg.1994.48.3.207.
32. Weinstock I A, Atalla R H, Reiner R S, Moen M A, Hammel K E, Houtman C J, Hill C L (1996) A new environmentally benign technology and approach to bleaching kraft pulp. Polyoxometalates for selective delignification and waste mineralization. *New Journal of Chemistry,* 20 (2): 269-275.
33. Mohlin U, Miller J, Mohlin U (1995) Industrial refining-effects of refining conditions on fibre properties. *Proceedings of the 3rd international refining conference,* 4:19-22.
34. Kullander J, Nilsson L, Barbier C (2012) Evaluation of furnishes for tissue manufacturing; wet pressing. *Nordic Pulp & Paper Research Journal,* 27 (5), 947-951. DOI: 10.3183/npprj-2012-27-05-p947-951.
35. Maloney T C, Paulapuro H (1999) The Formation of Pores in the Cell Wall. *Journal of Pulp and Paper Science,* 25 (12): 430-436.
36. Gharehkhani S, Sadeghinezhad E, Kazi S N, Yarmand H, Badarudin A, Safaci M R, Zubir M N M (2015) Basic effects of pulp refining on fiber properties—A review. *Carbohydrate Polymers,* 115:785-803. DOI: 0.1016/j.carbpol.2014.08.047.
37. Ginebreda A, Guillén D, Barceló D, Darbra R M (2012) Additives in the Paper Industry. *Handbook of Environmental Chemistry,* 18 (June 2011): 11-34. DOI: 10.1007/698_2011_109.
38. Liang M, He B, Zhao L (2014) Hydrophobicity of lime sludge filled paper assisted by a cationic starch/CPAM/bentonite retention aids system. *BioResources,* 9 (4): 6440-6452. DOI: 10.15376/biores.9.4.6440-6452.
39. Lindström T, Larsson P T (2008) Alkyl ketene dimer (AKD) sizing—A review. *Nordic Pulp and Paper Research Journal,* 23 (2): 202-209. DOI: 10.3183/npprj-2008-23-02-p202-209.
40. Nachtergaele W (1989) The Benefits of Cationic Starches for the Paper Industry. *Starch-Stärke,* 41 (1): 27-31. DOI: 10.1002/star.19890410108.
41. Duker E, Lindstrom T (2008) On the mechanisms behind the ability of CMC to enhance paper strength. *Nordic Pulp and Paper Research Journal,* 23 (1): 57-64. DOI: 10.3183/npprj-2008-23-01-p057-064.
42. Wojciechowska P (2012) The Effect of Concentration and Type of Plasticizer on the Mechanical Properties of Cellulose Acetate Butyrate Organic-Inorganic Hybrids. *Recent Advances in Plasticizers,* (May). DOI: 10.5772/35350.
43. Vieira M G A, Silva M A Da, Santos L O Dos, Beppu M M (2011) Natural-based plasticizers and biopolymer films: A review. *European Polymer Journal,* 47 (3): 254-263. DOI:/10.1016/j.eurpolymj.2010.12.011.
44. Kumar S, Chauhan V S, Chakrabarti S K (2016) Separation and analysis techniques for bound and unbound alkyl ketene dimer (AKD) in paper: A review. *Arabian Journal of Chemistry,* 9: S1636-S1642. DOI: 10.1016/j.arabjc.2012.04.019.
45. Risberg E (2017) Well functioning wet-end starch—a prerequisite for capacity increase at Smurfit Kappa Piteå.
46. Kartovaara I, Rajala R, Lüukkala M V, Sipi K (1985) Conduction of heat in paper.
47. Strand A, Sundberg A, Retulainen E, Salminen K, Oksanen A, Kouko J, Ketola A, Khakalo A, Rojas O (2017) The effect of chemical additives on the strength, stiffness and elongation potential of paper. *Nordic Pulp & Paper Research Journal,* 32 (3): 324-335. DOI: 10.3183/npprj-2017-32-03-p324-335.
48. Mali K K, Dhawale S C, Dias R J, Dhane N S, Ghorpade V S (2018) Citric acid crosslinked carboxymethyl cellulose-based composite hydrogel films for drug delivery. *Indian Journal of Pharmaceutical Sciences,* 80 (4): 657-667. DOI: 10.4172/pharmaceutical-sciences. 1000405
49. Tajik M, Torshizi H J, Resalati H, Hamzeh Y (2018) Effects of cationic starch in the presence of cellulose nanofibrils on structural, optical and strength properties of paper from soda pulp. *Carbohydrate Polymers,* 194 (September 2017): 1-8. DOI: bagasse 10.1016/j.carbpol.2018.04.026
50. Monga S, Thapliyal B P, Tyagi S, Naithani S (2017) Relationship between Strength Properties and Fiber Morphological Characteristics of E. tereticornis. *International*

*Journal of Science and Research (IJSR)*, 6 (1): 1557-1564. DOI: 10.21275/art20164485

51. Rinaldo E (2020) Non-wood fibers for strength enhancement of paper. Thesis, Department of Engineering and Chemical Science, Karlstad University.

52. Kjellgren H (2005) Barrier properties of greaseproof paper Barrier properties of greaseproof paper. Thesis, Karlstad University.

It will be understood that various details of the presently disclosed subject matter can be changed without departing from the scope of the presently disclosed subject matter. Furthermore, the foregoing description is for the purpose of illustration only, and not for the purpose of limitation.

What is claimed is:

1. A food packaging material comprising a sheet or web comprising papermaking fibers derived from a waste biomass, wherein the waste biomass includes cocoa waste biomass and one or more of milkweed floss, pineapple leaf fibers, or sabai grass, wherein the papermaking fibers comprise autohydrolyzed fibers, and wherein the sheet or web has an air resistance of at least about 100 Gurley seconds (Gs) and basis weight of less than 300 grams per square meter (g/m$^2$), the sheet or web being 100% biodegradable.

2. The food packaging material of claim 1, wherein the waste biomass further comprises one or more additional agricultural residues selected from the group consisting of hemp hurds, a mixture of hemp hurds and hemp bast, and bagasse.

3. The food packaging material of claim 1, wherein at least 50% of the papermaking fibers in the sheet or web are derived from waste biomass.

4. The food packaging material of claim 1, wherein the papermaking fibers comprise at least one of kraft fibers or soda fibers.

5. The food packaging material of claim 1, wherein at least a portion of the papermaking fibers are bleached fibers.

6. The food packaging material of claim 1, wherein the waste biomass in the papermaking fibers in the sheet or web further comprises at least about 70% to about 90% hemp hurds fibers.

7. The food packaging material of claim 6, wherein the hemp hurds fibers are kraft fibers.

8. The food packaging material of claim 6, wherein the hemp hurds fibers have an average length of less than 1.2 mm.

9. The food packaging material of claim 6, where from about 10% to about 30% of the papermaking fibers are cocoa waste biomass, and the cocoa waste biomass comprises cocoa pod husk fibers.

10. The food packaging material of claim 6, where up to about 30% of the papermaking fibers are softwood fibers, hardwood fibers, or a mixture thereof.

11. The food packaging material of claim 1, wherein the sheet or web further comprises one or more additives.

12. The food packaging material of claim 11, wherein the one or more additives are selected from a starch, a dicarboxylic acid, a cellulosic material, alkyl ketene dimer, and a citrate ester.

13. The food packaging material of claim 11, wherein the one or more additives are selected from a cationic starch, citric acid, carboxymethyl cellulose, alkyl ketene dimer, and triethyl citrate.

14. The food packaging material of claim 1, wherein the sheet or web has an air resistance of at least about 200 Gurley seconds (Gs).

15. The food packaging material of claim 1, wherein the sheet or web has a tensile index of about 25 N·m/g to 200 N·m/g.

* * * * *